(12) United States Patent
Kang et al.

(10) Patent No.: US 10,139,077 B2
(45) Date of Patent: Nov. 27, 2018

(54) OPTICAL LENS, LIGHT EMITTING MODULE AND LIGHT UNIT HAVING THE SAME

(71) Applicant: LG INNOTEK CO., LTD., Seoul (KR)

(72) Inventors: Min Soo Kang, Seoul (KR); Kwang Ho Kim, Seoul (KR); Yun Ho Shin, Seoul (KR); Sun Woong Kim, Seoul (KR); Ui Youn Jung, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 208 days.

(21) Appl. No.: 14/991,375

(22) Filed: Jan. 8, 2016

(65) Prior Publication Data

US 2016/0201875 A1    Jul. 14, 2016

(30) Foreign Application Priority Data

Jan. 8, 2015  (KR) .................. 10-2015-0002845
Apr. 29, 2015  (KR) .................. 10-2015-0060399
(Continued)

(51) Int. Cl.
*F21V 5/00*  (2018.01)
*F21V 5/04*  (2006.01)
(Continued)

(52) U.S. Cl.
CPC ................ *F21V 5/04* (2013.01); *G02B 7/022* (2013.01); *G02B 19/0014* (2013.01);
(Continued)

(58) Field of Classification Search
CPC .......... F21V 5/04; F21V 5/048; F21V 23/005; G02F 1/133611; G02F 1/133606;
(Continued)

(56) References Cited

U.S. PATENT DOCUMENTS

2008/0013322 A1   1/2008 Ohkawa
2009/0040769 A1   2/2009 Parkyn et al.
(Continued)

FOREIGN PATENT DOCUMENTS

CN          205749958       11/2016
EP          1 850 166       10/2007
(Continued)

OTHER PUBLICATIONS

Chinese Office Action dated Mar. 27, 2017 issued in Application No. 201610011940.X (English translation attached).
(Continued)

*Primary Examiner* — Y M. Lee
(74) *Attorney, Agent, or Firm* — KED & Associates, LLP

(57) ABSTRACT

An optical lens and a light emitting module having the optical lens is provided. The optical lens may include a bottom surface, a recess upwardly convex at a central region of the bottom surface, a light input surface at a circumference of the recess, a first light output surface having a convexly curved surface at opposite sides of the bottom surface and the light input surface, and a second light output surface at a lower circumference of the first light output surface, wherein the bottom surface includes a first edge adjacent to the recess and a second edge adjacent to the second light output surface, a region of the bottom surface more adjacent to the first edge gradually approaches a first axis that is horizontal to a center of a bottom of the recess, and the first light output surface has a convex central region.

19 Claims, 45 Drawing Sheets

(30) Foreign Application Priority Data

May 26, 2015 (KR) .......................... 10-2015-0072830
Dec. 18, 2015 (KR) .......................... 10-2015-0181914

(51) Int. Cl.
*G02B 19/00* (2006.01)
*G02F 1/1335* (2006.01)
*G02B 7/02* (2006.01)
*F21Y 101/02* (2006.01)

(52) U.S. Cl.
CPC ... *G02B 19/0061* (2013.01); *G02F 1/133603* (2013.01); *G02F 1/133606* (2013.01); *G02F 1/133611* (2013.01); *F21Y 2101/02* (2013.01); *G02F 2001/133607* (2013.01)

(58) Field of Classification Search
CPC ... G02F 2001/133607; G02F 1/133603; G02B 7/022; G02B 19/0014; G02B 19/0061; F21K 9/50
See application file for complete search history.

(56) References Cited

U.S. PATENT DOCUMENTS

| | | | | |
|---|---|---|---|---|
| 2009/0109687 | A1* | 4/2009 | Householder | F21L 4/027 362/327 |
| 2009/0290371 | A1 | 11/2009 | Yagi | |
| 2010/0195335 | A1* | 8/2010 | Allen | F21V 5/048 362/309 |
| 2010/0302785 | A1 | 12/2010 | Zhou | |
| 2013/0229810 | A1 | 9/2013 | Pelka et al. | |
| 2014/0126222 | A1 | 5/2014 | Wang et al. | |
| 2014/0301085 | A1 | 10/2014 | Hwang et al. | |
| 2015/0055347 | A1* | 2/2015 | Kim | H01L 33/58 362/332 |
| 2015/0204509 | A1* | 7/2015 | Pelka | F21V 5/04 362/311.02 |
| 2016/0033108 | A1* | 2/2016 | Ji | F21V 5/04 362/333 |
| 2016/0201875 | A1 | 7/2016 | Kang et al. | |

FOREIGN PATENT DOCUMENTS

| | | |
|---|---|---|
| EP | 2 214 046 | 8/2010 |
| KR | 10-2007-0013469 A | 1/2007 |
| KR | 10-2008-0038669 A | 5/2008 |
| KR | 10-2009-0015854 A | 2/2009 |
| KR | 10-2011-0113705 A | 10/2011 |
| KR | 10-2013-0108019 A | 10/2013 |
| KR | 10-2014-0120683 A | 10/2014 |
| WO | WO 2010/139247 | 12/2010 |
| WO | WO 2013/132313 | 9/2013 |

OTHER PUBLICATIONS

European Search Report dated Jun. 3, 2016 issued in Application No. 16150427.9.

* cited by examiner

OPTICAL LENS, LIGHT EMITTING MODULE AND LIGHT UNIT HAVING THE SAME

CROSS-REFERENCE TO RELATED APPLICATIONS

This application claims priority under 35 U.S.C. § 119 to Korean Application Nos. 10-2015-0002845 filed on Jan. 8, 2015, 10-2015-0060399 filed on Apr. 29, 2015, 10-2015-0072830 filed on May 26, 2015, and 10-2015-0181914 filed on Dec. 18, 2015, whose entire disclosures are hereby incorporated by reference.

BACKGROUND

1. Field

Embodiments relate to an optical lens, a light emitting module having the optical lens, and a light unit having the optical lens and the light emitting module.

2. Background

Light emitting devices, such as light emitting diodes, are a type of semiconductor device that converts electrical energy into light. Light emitting diodes are gaining attention as next generation light sources and as substitutes for existing lamps, such as, e.g., fluorescent lamps and incandescent lamps. As light emitting diodes generate light using semiconductor devices, light emitting diodes consume very low electricity compared to incandescent lamps, which heat tungsten to generate light, or fluorescent lamps, which collide ultraviolet rays generated through high voltage discharge with a fluorescent material to generate light.

As light emitting diodes generate light using potential gaps of the semiconductor devices, light emitting diodes have long lives, rapid response characteristics, and eco-friendly characteristics compared to existing light sources. Thus, many studies that substitute existing light sources with light emitting diodes are being carried out, and use of light emitting diodes as light sources of various lighting devices for indoors and outdoors, such as, e.g., lamps, display devices, electronic display boards, and street lamps, is increasing.

BRIEF DESCRIPTION OF THE DRAWINGS

Embodiments will be described in detail with reference to the following drawings in which like reference numerals refer to like elements, and wherein.

DETAILED DESCRIPTION

Figure 1:
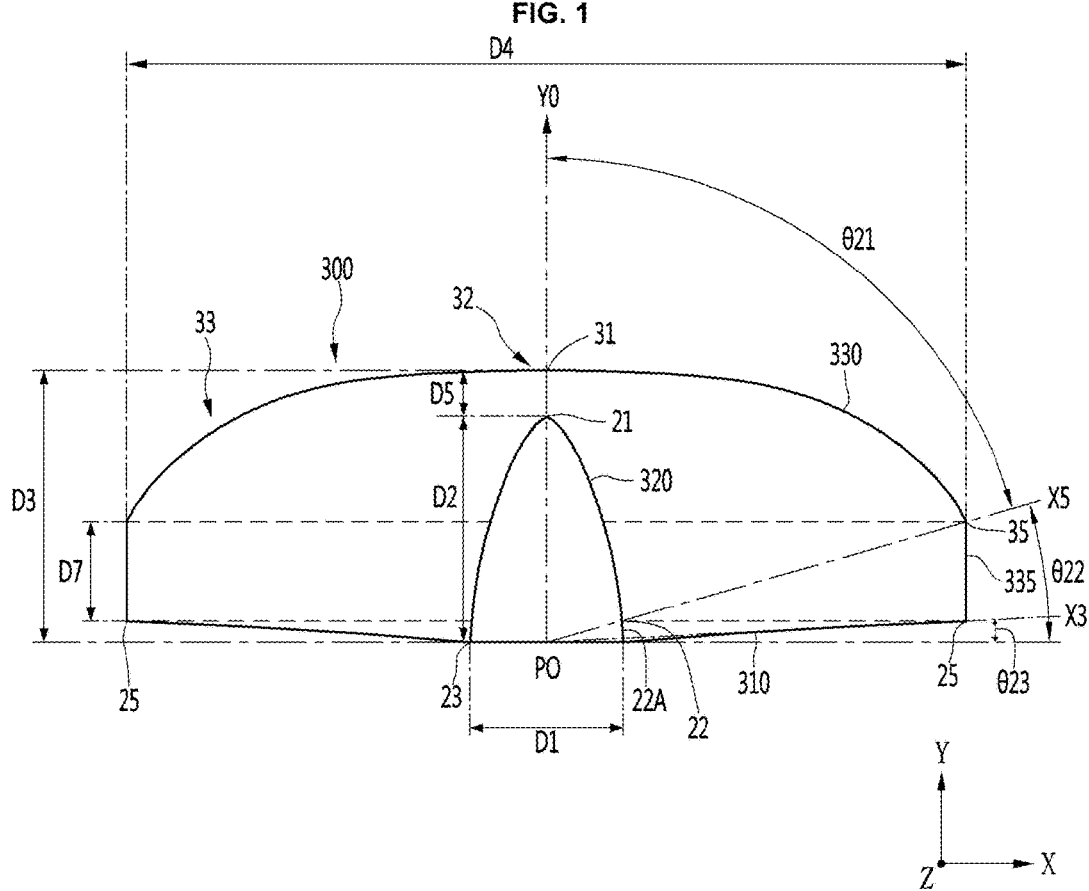
FIG. 1 is a side cross-sectional view of an optical lens according to an embodiment.
Figure 2:
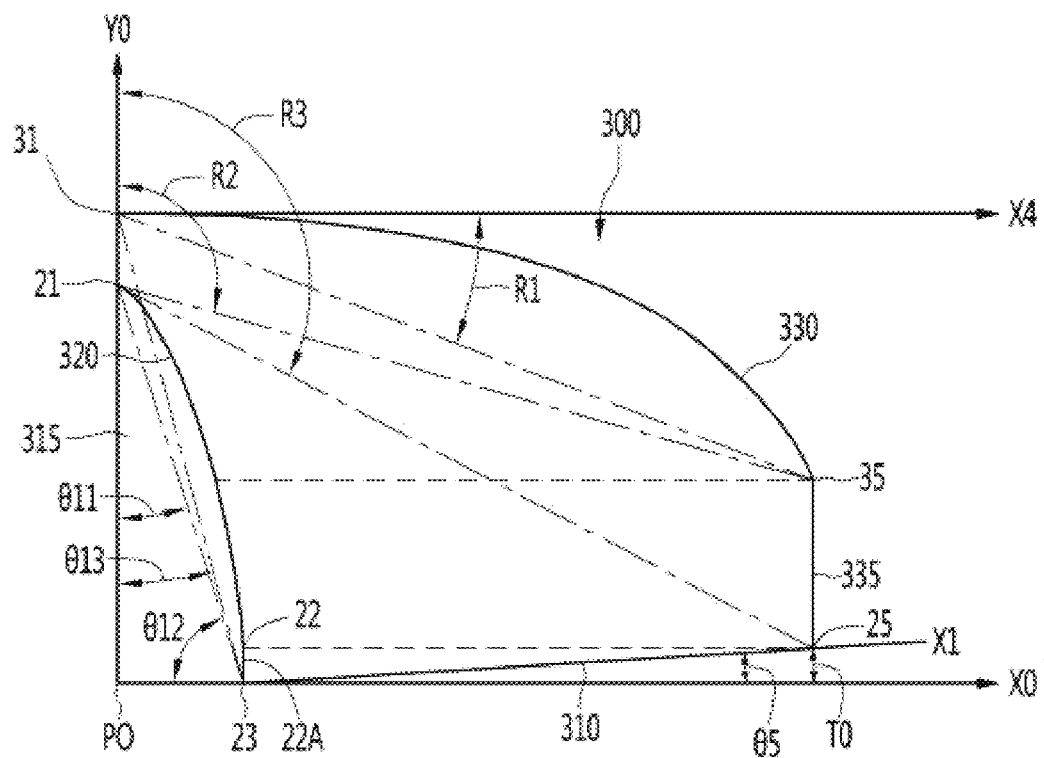
FIG. 2 is a partially enlarged view of the optical lens of FIG. 1.
Figure 3:
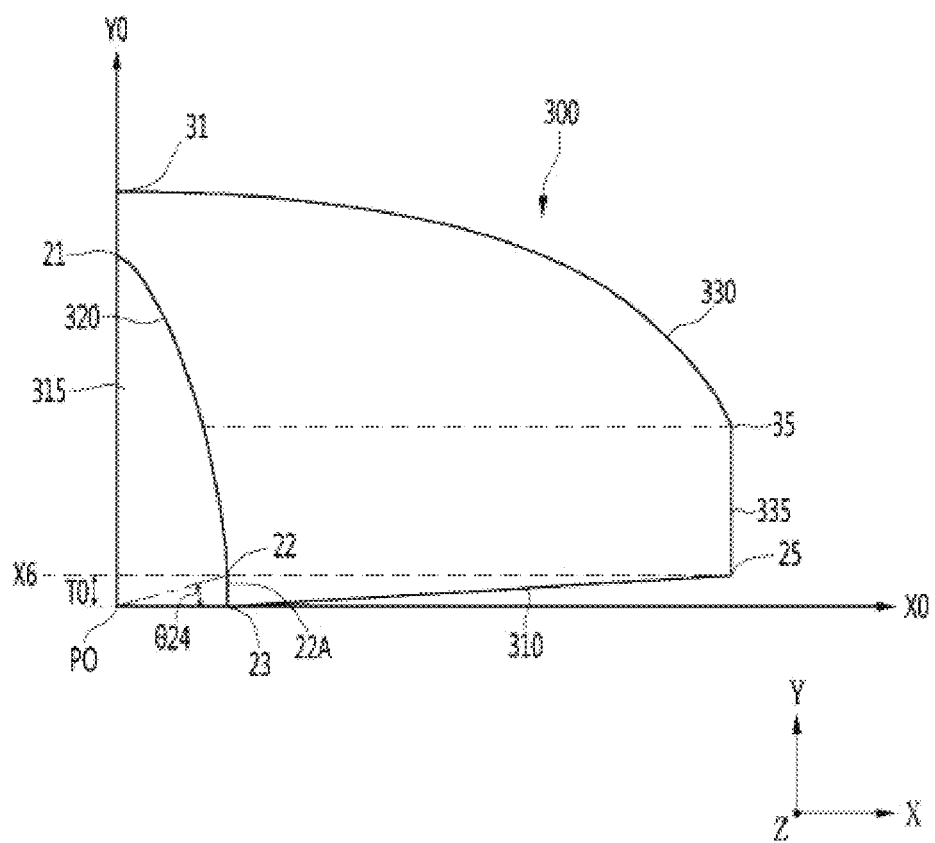
FIG. 3 is a view illustrating a relation between a center of a bottom of a recess and a protruding region in the optical lens of FIG. 2.
Figure 4:
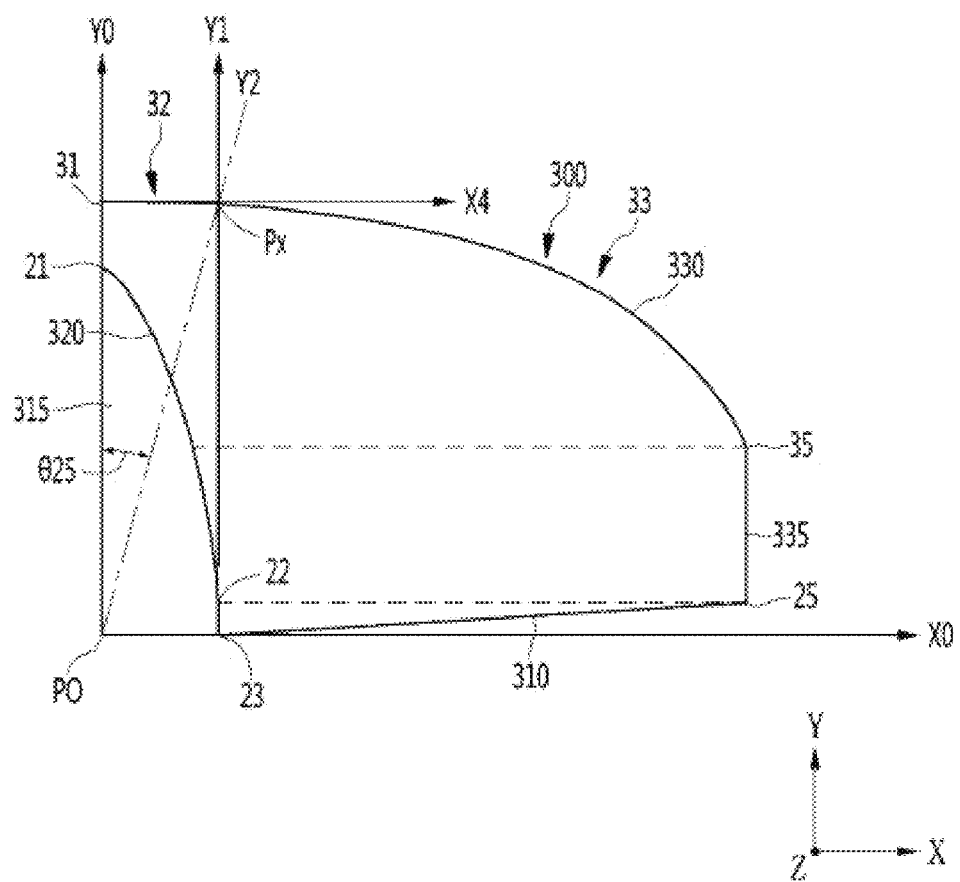
FIG. 4 is a view of a region of a first light output surface corresponding to the recess in the optical lens of FIG. 2.
Figure 5:
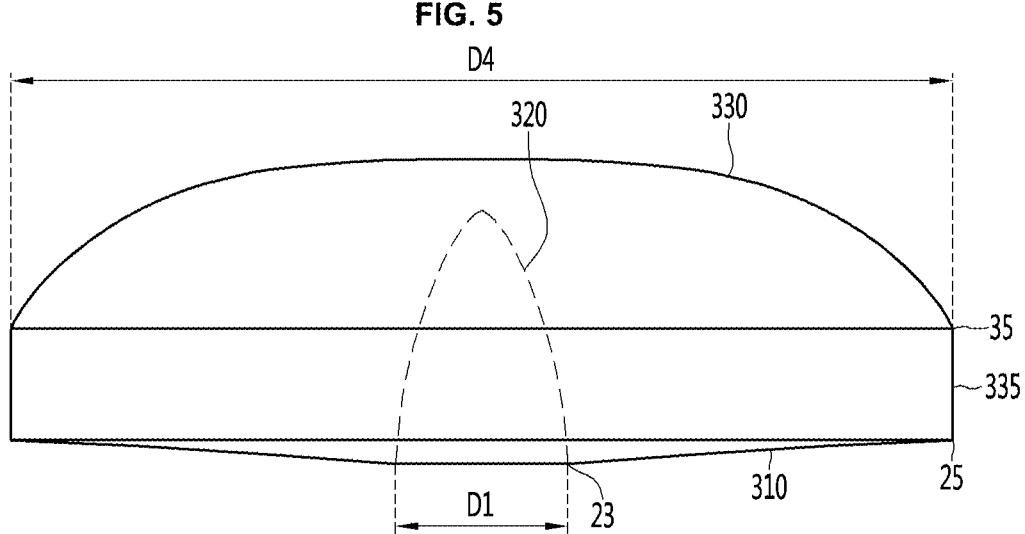
FIG. 5 is a side view of the optical lens of FIG. 1.

FIG. 1 is a side cross-sectional view of an optical lens according to an embodiment. FIG. 2 is a partially enlarged view of the optical lens of FIG. 1. FIG. 3 is a view illustrating a relation between a center of a bottom of a recess and a protruding region in the optical lens of FIG. 2. FIG. 4 is a view of a region of a first light output surface corresponding to the recess in the optical lens of FIG. 2. FIG. 5 is a side view of the optical lens of FIG. 1. Referring to FIGS. 1 to 6, an optical lens 300 may include a bottom surface 310, a recess 315 upwardly convex from the bottom surface 310 at a central region of the bottom surface 310, a light input surface 320 at a circumference of the recess 315, a first light output surface 330 provided at opposite sides of the bottom surface 310 and the light input surface 320, and a second light output surface 335 provided below the first light output surface 330.

In the optical lens 300, an axial direction perpendicular to a center P0 of a bottom of the recess 315 may be defined using a central axis Y0 or an optical axis. An axial direction horizontal with the center P0 of the bottom of the recess 315 may be a direction of a first axis X0, and the direction of the first axis X0 may be a direction orthogonal to the central axis Y0 or the optical axis. The center P0 of the bottom of the recess 315 may be a lower center of the optical lens 300, and may be defined as a reference point. The optical lens 300 may include a light-transmittable material. The optical lens 300 may include at least one of polycarbonate (PC), polymethyl methacrylate (PMMA), silicone or epoxy resin, or glass. The optical lens 300 may include a transparent material with a refraction rate in a range of 1.4 to 1.7.

According to an embodiment, the bottom surface 310 of the optical lens 300 may be provided at a circumference of the recess 315. The bottom surface 310 may include a surface inclined with respect to the first axis X0, a curved surface, or both of the inclined surface and the curved surface. The recess 315 may be recessed vertically upward from the center region of the bottom surface 310.

The bottom surface 310 of the optical lens 300 may include a first edge 23 adjacent to the recess 315 and a second edge 25 adjacent to the second light output surface 335. The first edge 23 is a boundary region between the light input surface 320 and the bottom surface 310, and may include a low point region of the optical lens 300. The first edge 23 may include the lowest point of regions of the bottom surface 310. A position of the first edge 23 may be lower than a position of the second edge 25 with respect to the horizontal first axis X0. The first edge 23 may cover a lower circumference of the light input surface 320. The second edge 25 may become an outer edge region of the bottom surface 310 or a lower region of the second light output surface 335. The second edge 25 may be a boundary region between the bottom surface 310 and the second light output surface 335.

The first edge 23 may be an inner region of the bottom surface 310 or a boundary line with the light input surface 320. The second edge 25 may be an outer region of the bottom surface 310 or a boundary line with the second light output surface 335. The first edge 23 may be an inner corner or include a curved surface. The second edge 25 may be an outer corner or include a curved surface. The first edge 23 and the second edge 25 may be end portions of the bottom surface 310. The first edge 23 may have a circular shape or an oval shape when viewed from the bottom of the optical lens 300, and the second edge 25 may have a circular shape or an oval shape when viewed from the bottom of the optical lens 300.

An interval between the bottom surface 310 and the first axis X0 may gradually narrow as the bottom surface 310 gradually approaches the first edge 23. The interval between the bottom surface 310 and the first axis X0 may gradually widen as the bottom surface 310 becomes farther from the first edge 23. An interval T0 between the bottom surface 310 and the first axis X0 may be the maximum at the second edge 25, and may be the minimum at the first edge 23. The bottom surface 310 may include an inclined surface or a curved surface between the first edge 23 and the second edge 25, or include both of the inclined surface and the curved surface. As the bottom surface 310 becomes gradually farther with respect to the first axis X0 toward the outside, the bottom surface 310 may become a total reflection surface when viewed from the recess 315. For example, when any light source is provided on the bottom of the recess 315 within the recess 315, the bottom surface 310 may provide the inclined surface. As the bottom surface 310 reflects light incident through the recess 315, optical loss may be reduced. Also, light directly incident to the bottom surface 310 without passing through the light input surface 320 may be removed. The optical lens 300 may increase an amount of light incident to the bottom surface 310 through the light input surface 320, and improve a beam spread angle distribution.

Since the bottom surface 310 lowers as the bottom surface 310 approaches the first edge 23 of the recess 315, an area of the bottom surface 310 may widen. An area of the light input surface 320 of the recess 315 may widen as much as the bottom surface 310 lowers. As a depth of the recess 315 becomes a height from the first edge 23, the depth of the recess 315 may deepen. As the area of the bottom surface 310 increases, a reflection area may increase. As the bottom of the recess 315 lowers, an area of the bottom may increase.

The first edge 23 of the bottom surface 310 may be provided on the first axis X0 horizontal with the bottom of the recess 315, and the second edge 25 may be spaced a predetermined interval T0 apart from the first axis X0. The interval T0 between the second edge 25 and the first axis X0 may be a distance capable of providing an inclined surface to reflect light incident to a lower region 22A of the light input surface 320. The lower region 22A of the light input surface 320 may be a region between a lower point 22 of the light input surface 320 passing a horizontal line at the second edge 25 and the first edge 23. The interval T0 between the second edge 25 and the first axis X0 may be 500 μm or smaller, e.g., 450 μm or smaller. The interval T0 between the second edge 25 and the first axis X0 may be in a range of 200 μm to 450 μm. When the interval T0 is smaller than the range, a low point position of the second light output surface 335 may lower, and thus, an interference problem may occur in light emitted to the second light output surface 335. When the interval T0 is greater than the range, a high point position of the second light output surface 335 may heighten. Thus, a curvature of the first light output surface 330 may change, and a thickness D3 of the optical lens 300 may increase.

The bottom surface 310 may be formed with a curved surface having a Bezier curve. A curve of the bottom surface 310 may be implemented with a spline, such as, e.g., a cubic spline, a B-spline, and a T-spline. The curve of the bottom surface 310 may be implemented with the Bezier curve. The bottom surface 310 of the optical lens 300 may include a plurality of supporting protrusions. The plurality of supporting protrusions may protrude downward from the bottom surface 310 of the optical lens 300 and support the optical lens 300.

A shape of the bottom of the recess 315 may include a circular shape. The shape of the bottom of the recess 315 may also be an oval shape or a polygonal shape. A shape of a side cross section of the recess 315 may include, for example, a bell shape, a shell shape, or an oval shape. The width of the recess 315 may gradually narrow toward a top of the recess 315. The recess 315 may gradually converge from the first edge 23 at a circumference of the bottom of the recess 315 toward a first vertex 21 of an upper end. When the recess 315 has a circular shape when viewed from the bottom, a diameter of the recess 315 may gradually decrease toward the first vertex 21. With respect to the central axis Y0, the recess 315 may be provided in a rotationally symmetric shape. The first vertex 21 of the light input surface 320 may be provided in a dot shape.

A width D1 of the bottom of the recess 315 may be a width into which a light source, for example, a light emitting device, may be inserted. The width D1 of the bottom of the recess 315 may be three times a width of the light emitting device or smaller, such as, e.g., 2.5 times the width of the light emitting device or smaller. The width D1 of the bottom of the recess 315 may be in a range of 1.2 to 2.5 times the width of the light emitting device. When the width D1 of the bottom of the recess 315 is smaller than the range of 1.2 to 2.5 times the width of the light emitting device, inserting the light emitting device may be difficult. When the width D1 of the bottom of the recess 315 is greater than the range of 1.2 to 2.5 times the width of the light emitting device, optical loss or light interference through a region between the light emitting device and the first edge 23 may be reduced.

The light input surface 320 may have a curved surface that may be upwardly convex from the central region of the bottom surface 310, and may be a circumferential surface or an inner surface of the recess 315. The light input surface 320 may become farther from the center P0 of the bottom of the recess 315 toward the top. As the light input surface 320 may be provided with the convex curved surface, the light input surface 320 may refract light in all regions. The lower region 22A of the light input surface 320 may be provided lower than the second light output surface 335 to directly or indirectly receive light. The lower region 22A of the light input surface 320 may receive light reflected from the bottom of the recess 315. The light input surface 320 may be formed with a rotary body having the Bezier curve. The curve of the light input surface 320 may be implemented with a spline, such as, e.g., a cubic spline, a B-spline, and a T-spline. The curve of the light input surface 320 may be implemented with the Bezier curve.

The optical lens 300 may include the first light output surface 330 and the second light output surface 335. The first light output surface 330 may be an opposite surface of the light input surface 320 and the bottom surface 310. The first light output surface 330 may include a curved surface. A point of the first light output surface 330 corresponding to the central axis Y0 may be a second vertex 31, and the second vertex 31 may be the highest point of a lens body. The first light output surface 330 may include a curved surface that is upwardly convex. All regions of the first light output surface 330 may be formed with curved surfaces, for example, curved surfaces having curvatures of different magnitudes. The first light output surface 330 may have an axially symmetrical shape, such as, e.g., a rotationally symmetrical shape, with respect to the central axis Y0. In the second light output surface 335, regions between the second vertex 31 and the second light output surface 335 may not have a negative curvature. In the second light output surface 335, the regions between the second vertex 31 and the second light output surface 335 may have radii of curvatures of different magnitudes.

A distance between the first light output surface 330 and the center P0 of the bottom of the recess 315 may increase as it becomes farther from the central axis Y0. In the first light output surface 330 as it approaches the central axis Y0, or the second vertex 31, the first light output surface 330 may have a fine slope or no slope with a straight horizontal line X4 coming into contact with the second vertex 31. That is, a central region 32 of the first light output surface 330 may be a gently curved line or may include a flat straight line. The central region 32 of the first light output surface 330 may include a region vertically overlapping the recess 315. A side region 33 of the first light output surface 330 may have a steeper curved surface than the central region 32. As the first light output surface 330 and the light input surface 320 have convexly curved surfaces, the first light output surface 330 and the light input surface 320 may be able to diffuse light emitted from the center P0 of the bottom of the recess 315 in a side direction. In the first light output surface 330 and the light input surface 320, a light refraction angle may be greater as it becomes farther from the central axis Y0 within a range of an angle θ21, which may be within about 70°±4°.

A radius of curvature of the central region 32 of the first light output surface 330 may be greater than a radius of curvature of the light input surface 320. A slope of the first light output surface 330 may be smaller than a slope of the light input surface 320. In the first light output surface 330 of the optical lens 300, a monotone may increase as a distance becomes farther with respect to the central axis Y0 within the beam spread angle. The second light output surface 335 includes a region deviated from the beam spread angle distribution of light, and a monotone in the second light output surface 335 may be the same or decrease as a distance becomes farther with respect to the central axis Y0.

The light refraction angle may decrease, for example, within an error range of 2° or less, in a boundary region between the first light output surface 330 and the second light output surface 335. The light refraction angle may gradually decrease since a surface of the first light output surface 330 close to the second light output surface 335 may approach a tangential line or be provided as a perpendicular surface. The second light output surface 335 of the optical lens 300 may be provided higher than the first axis X0. The second light output surface 335 may be a flat surface or an inclined surface, and may be defined by a flange, but is not limited thereto. The second light output surface 335 may be provided to be perpendicular or inclined with respect to the first axis X0. The second light output surface 335 may perpendicularly extend or obliquely extend from an outer edge line of the first light output surface 330. The second light output surface 335 includes a third edge 35 adjacent to the first light output surface 330, and the third edge 35 may be at the same position as the outer edge line of the first light output surface 330 or be provided more inward or outward than the outer edge line of the first light output surface 330.

A straight line X5 connecting the third edge 35 of the second light output surface 335 to the central axis Y0 may be provided at an angle within a range of 74°±2° from the central axis Y0. The third edge 35 of the second light output surface 335 may be provided at 20° or less, for example, within an angle θ22 of 16°±2°, from the first axis X0 with respect to the center P0 of the bottom of the recess 315. With respect to the center P0 of the bottom of the recess 315, an angle between the second edge 25 and the third edge 35 of the second light output surface 335 may be 16° or less, for example, an angle of 13±2°. The angles θ21 and θ22 with respect to the straight line X5 passing through the third edge 35 of the second light output surface 335 may be outer angles of the optical lens 300. The second light output surface 335 may refract and radiate light incident on a region spaced apart from the first axis X0. The light refracted by the second light output surface 335 may be radiated in a smaller angle than an angle before the refraction with respect to the central axis Y0. Thus, the second light output surface 335 may be able to suppress the refracted light from being radiated in a direction of a horizontal axis or a direction lower than the horizontal axis, and prevent the refracted light from interfering with an adjacent optical member or a loss of the refracted light.

An angle θ23 between a straight line X3 crossing the central axis Y0 and the second edge 25 of the bottom surface 310 and the first axis X0 may be 5° or less, for example, in a range of 0.4° to 4°. The angle θ23 may vary in accordance with a distance from the central axis Y0 and the height of the second edge 25. When the angle θ23 deviates from the above range, a thickness of the optical lens may change and the optical loss may increase. As the second light output surface 335 refracts light deviating from a half-valued angle from the central axis Y0 with respect to the center P0 of the bottom of the recess 315, the optical loss may be reduced.

A width D4 of the optical lens 300 may be greater than the thickness D3 thereof. The width D4 may be equal to the length thereof when the optical lens 300 is a circular shape.

The width D4 may be 2.5 times the thickness D3 or greater, e.g. three times the thickness D3 or greater. The width D4 of the optical lens 300 may be 15 mm or greater, e.g. in a range of 16 mm to 20 mm. As the width D4 of the optical lens 300 is greater than the thickness D3, the luminance distribution may be uniform throughout a lighting device or a light unit. Also, since a region covered within the light unit is improved, a number of optical lenses may decrease, and a thickness of the optical lens may be decreased.

A depth D2 of the recess 315 has an interval from the center P0 of the bottom thereof to the first vertex 21. The first vertex 21 may be a vertex of the light input surface 320 or a top point of the recess 315. The depth D2 of the recess 315 may be the same as a bottom width D1 of the light input surface 320 or greater. The depth D2 of the recess 315 may be 75% of the thickness D3 of the optical lens 300 or greater, for example, 80% of the thickness D3 of the optical lens 300 or greater. The depth D2 of the recess 315 may be 80% or greater of a distance between the second vertex 31 of the first light output surface 330 and the center P0 of the bottom of the recess 315 or the first edge 23. As the depth D2 of the recess 315 is deep, light may be diffused in the side direction even from regions adjacent to the first vertex 21 of the light input surface 320 even when the central region 32 of the first light output surface 330 does not have a total reflection surface or a negative curvature. As the recess 315 has the depth D2, which may be deep, the light input surface 320 may refract light incident from a region close to the second vertex 31 to a region around the first vertex 21 in the side direction.

A minimum distance D5 between the recess 315 and the first light output surface 330 may be an interval between the first vertex 21 of the light input surface 320 and the second vertex 31 of the first light output surface 330. The distance D5 may be ½ of a width D7 of the second light output surface 335 or smaller. The distance D5 may be, for example, 1.5 mm or smaller, in a range of 0.6 mm to 1.5 mm, or in a range of 0.6 mm to 1.2 mm. The distance D5 may be greater than the interval T0 as long as it is three times the interval T0 or smaller. When the distance D5 between the first vertex 21 of the light input surface 320 and the second vertex 31 of the first light output surface 330 is 1.5 mm or greater, a difference between amounts of light traveling to the central region 32 and the side region 33 of the first light output surface 330 may increase, and light distribution may not be uniform. When the distance D5 between the first vertex 21 of the light input surface 320 and the second vertex 31 of the first light output surface 330 is smaller than 0.6 mm, a stiffness at the center of the optical lens 300 may weaken. As the distance D5 between the recess 315 and the first light output surface 330 is within the above range, a path of light may be diffused outward even when the central region 32 of the first light output surface 330 does not have a total reflection surface or a negative curvature. As the first vertex 21 of the light input surface 320 approaches the convex second vertex 31 of the first light output surface 330, an amount of light traveling toward the side direction of the first light output surface 330 through the light input surface 320 may increase. Thus, the amount of light diffused in the side direction of the optical lens 300 may increase. The first vertex 21 of the light input surface 320 may be more adjacent to the second vertex 31, which may be the center of the first light output surface 330, than a straight line horizontally extending from the third edge 35 of the second light output surface 335.

The width D7 of the second light output surface 335 may be a distance of a straight line between the second edge 25 and the third edge 35, and may be smaller than the depth D2 of the recess 315. The width D7 of the second light output surface 335 may be, for example, in a range of 1.8 mm to 2.3 mm. The width D7 of the second light output surface 335 may be 1.5 times or greater, for example, two times or greater, of the distance D5 between the recess 315 and the first light output surface 330. The width D7 of the second light output surface 335 may be 0.3 times the depth D2 or greater, for example, may have a range of 0.32 to 0.6 times the depth D2. The width D7 may be 0.25 times the thickness D3 of the optical lens 300 or greater, for example, a range of 0.3 to 0.5 times the thickness D3 of the optical lens 300. When the width D7 of the second light output surface 335 exceeds the above ranges, an amount of light output to the second light output surface 335 may increase, thus making it difficult to control light distribution. When the width D7 of the second light output surface 335 is smaller than the ranges, it may be difficult to secure a gate region when manufacturing the lens body.

Referring to FIG. 2, line segments connecting the center P0 of the bottom of the recess 315, the first vertex 21 of the light input surface 320, and the first edge 23 of the light input surface 320 in the optical lens 300 may form a triangular shape, for example, a right triangular shape. With respect to the first vertex 21, an angle θ11 between the central axis Y0 and the first edge 23 may be 30° or smaller, for example, in a range of 20° to 24°. An angle θ12 may be equal to or smaller than ⅓ times another angle θ14. When the angle θ11/θ12<1 is satisfied, the angle θ11/θ5>1 may be satisfied. The angle θ5 may be an inclined angle of the bottom surface 310. The angle θ11 may be four times or greater than the angle θ5, for example, a range of five times to twenty times greater than the angle θ5. The angle θ5 may be ¼ or smaller, e.g. ⅕, of the angle θ11. With respect to the second vertex 31 of the second light output surface 335, an angle θ13 between the central axis Y0 and the straight line connecting the second vertex 31 to the first edge 23 may be smaller than the angle θ11, for example, in a range of 15° to 22°, and the angle θ11/θ13<1 is satisfied.

An angle R1 between the straight horizontal line X4 at which the central axis Y0 and the second vertex 31 of the first light output surface 330 intersect and a straight line connecting up to the third edge 35 of the second light output surface 335 may be in a range of 15° to 25°. The straight line X4 may be a straight line horizontal to the second vertex 31 of the optical lens 300, or a straight line orthogonal to a direction at a level with the central axis Y0. A ratio between the height of the first light output surface 330 and a lens radius H2 may be calculated in accordance with a tangential value of the angle R1. With respect to the second vertex 31 of the first light output surface 330, an angle between the central axis Y0 and the straight line connecting up to the third edge 35 of the second light output surface 335 may be in a range of 105° to 115°.

An angle R2 between a straight line connecting from the first vertex 21 of the light input surface 320 to the third edge 35 of the second light output surface 335 and the central axis Y0 may be in a range of 98° to 110°. A height difference between the first vertex 21 of the light input surface 320 and the third edge 35 of the second light output surface 335 may exist due to the angle R2. When the angle R2 deviates from the above range, a position of the third edge 35 of the second light output surface 335 may become different.

An angle R3 between a straight line connecting from the first vertex 21 of the light input surface 320 to the second edge 25 of the bottom surface 310 and the central axis Y0 may be in a range of 104° to 120°. The angle R3, together with the angle R2, may set the height (=D3-D7) of the second light output surface 335, and may set a height difference between the first vertex 21 of the light input surface 320 and the second edge 25 of the second light output surface 335. The angles R1, R2, and R3 may vary in accordance with positions of the second vertex 31 of the first light output surface 330 where the central region of the first light output surface 330 has a positive curvature, and the first vertex 21 of the light input surface 320. The thickness of the optical lens 300 may be slimly provided.

Referring to FIG. 3, in the optical lens 300, the lower point 22 at which a straight line X6 horizontally extending from the second edge 25 of the bottom surface 310 intersects with the light input surface 320 may be provided at an angle of 22° or smaller, for example, an angle θ24 in a range of 13° to 18°, from the first axis X0 with respect to the center P0 of the bottom of the recess 315. A distance between the center P0 of the bottom of the recess 315 and the first edge 23 may be ½ of D1, and the height of the lower point 22 of the light input surface 320 may be the interval T0 between the second edge 25 of the bottom surface 310 and the first axis X0, which may be 500 μm or smaller, for example, in a range of 200 μm to 450 μm. A ratio between the ½ distance of D1 and the interval T0 may be changed in the range of the angle θ24. When the height of the lower point 22 is lower than the above range, the optical loss may not be significantly decreased. When the height of the lower point 22 is greater than the above range, the thickness of the optical lens 300 thickens. The first edge 23 of the bottom surface 310 may be the lower point of the bottom surface 310, and light traveling lower than the lower point 22 may be incident at the region 22A between the first edge 23 and the lower point 22. Thus, the optical loss may be reduced through the lower region 22A of the light input surface 320.

Referring to FIG. 4, the central region 32 of the first light output surface 330 is a region vertically overlapping the recess 315, and may be positioned at an angle of 20° or smaller, for example, a range of 14° to 18°, from the central axis Y0 with respect to the center P0 of the bottom of the recess 315. A point Px of the first light output surface 330 intersecting with a straight line Y1 perpendicular to the first edge 23 of the recess 315 may be positioned at an angle θ24 of 20° or smaller, for example, in an angle range of 14° to 18°, from the central axis Y0 with respect to the center P0 of the bottom of the recess 315. When the central region 32 of the first light output surface 330 exceeds the above ranges, a radius within the recess 315 may increase, and a light amount difference between the central region 32 and the side region 33 may increase. Also, when the central region 32 of the first light output surface 330 is smaller than the above ranges, the radius within the recess 315 may decrease and inserting a light source may not be easy, and a light distribution at the central region 32 and the side region 33 of the first light output surface 330 may not be uniform.

The angle θ22 between the first axis X0 and the third edge 35 of the second light output surface 335 and the angle θ24 between the central axis Y0 and the point Px of the central region 32 of the first light output surface 330 may be 20° or smaller, for example, in a range of 14° to 18°, with respect to the center P0 of the bottom of the recess 315. The depth of the recess 315 and the inclined angle of the bottom surface 310 may be changed within the ranges of the angles θ22 and θ25.

Figure 6:
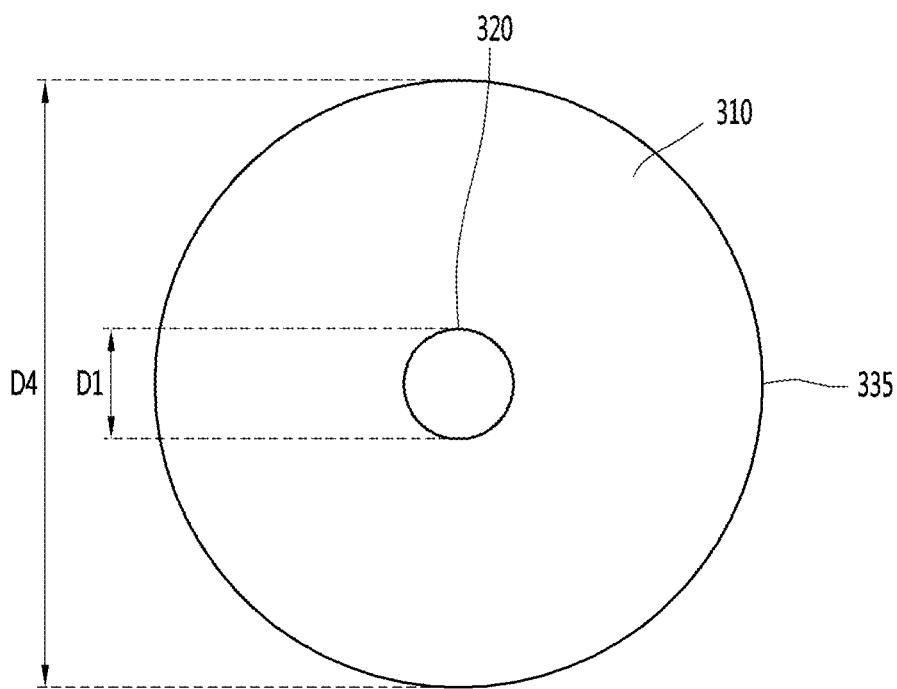
FIG. 6 is a bottom view of the optical lens of FIG. 1.

FIGS. 5 and 6 are views respectively illustrating a side view and a rear view of an optical lens according to an embodiment. Referring to FIG. 5, in the optical lens, the second light output surface 335 may be provided at a lower circumference of the first light output surface 330, and the bottom surface 310 may be provided lower than the second edge 25 of the second light output surface 335. The bottom surface 310 may protrude downward past the horizontal line of the second edge 25 of the second light output surface 335. For example, the optical lens 300 may have an embossed surface at the second light output surface 335. The embossed surface may be formed of a haze surface with a rough surface. The embossed surface may be a surface on which scattered particles are formed. As still another example, the optical lens 300 may have an embossed surface at the bottom surface. The embossed surface of the bottom surface 310 may be formed of the haze surface with a rough surface or have scattered particles formed thereon.

Figure 70:
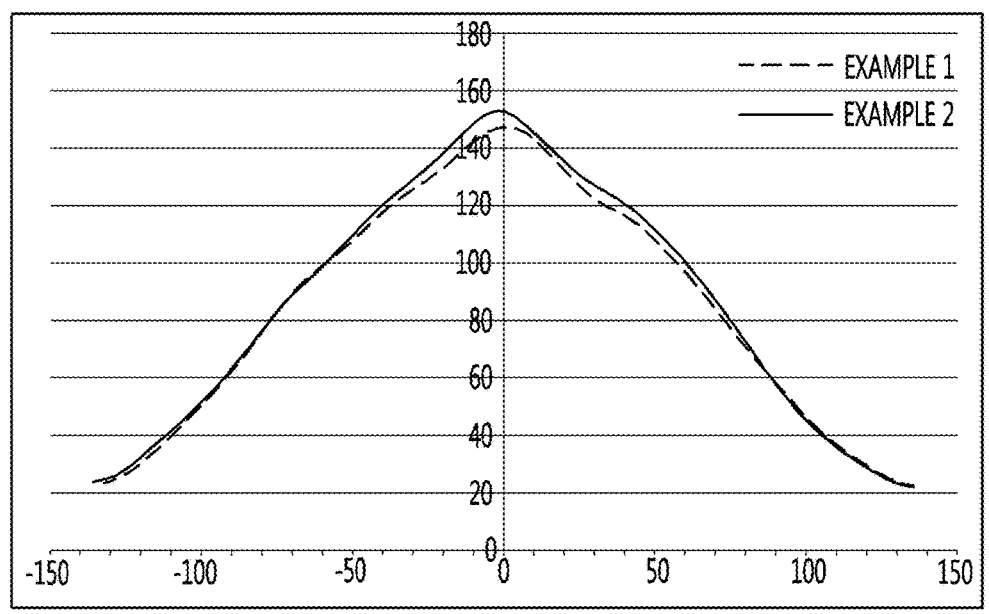
FIG. 70 is a graph illustrating luminance distributions in accordance with a presence of embossed portions at a second light output surface in an optical lens according to an embodiment.
Figure 71:
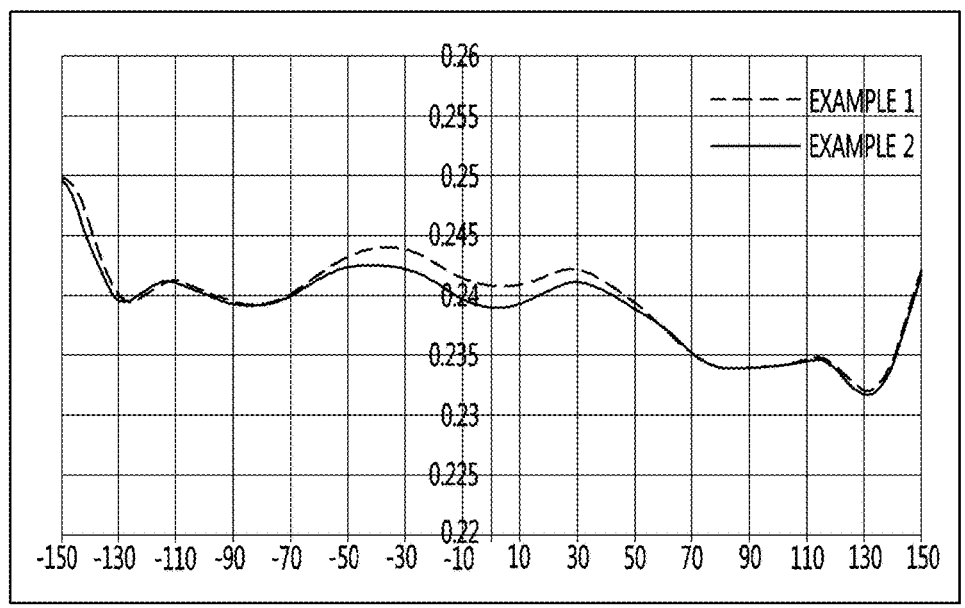
FIG. 71 is a graph illustrating changes in a color difference in accordance with the presence of embossed portions at the second light output surface in the optical lens according to an embodiment.

A luminance distribution of the optical lens due to the haze may be referenced to FIGS. 70 and 71. In FIG. 70, Example 1 shows a change in a luminance distribution in an optical lens without a haze processed on a bottom surface and side surfaces thereof, and Example 2 shows a change in the luminance distribution in an optical lens with the haze processed on a bottom surface and side surfaces thereof. Example 2 shows that uniformity is improved where the haze is processed at the side surfaces and the bottom surface of the optical lens. In FIG. 71, Example 1 shows a color difference in the optical lens without the haze processed on the bottom surface and the side surfaces thereof, and Example 2 shows the color difference in the optical lens with the haze processed on the bottom surface and the side surfaces thereof. Example 2 shows that the color difference is improved where the haze is processed.

Figure 7:
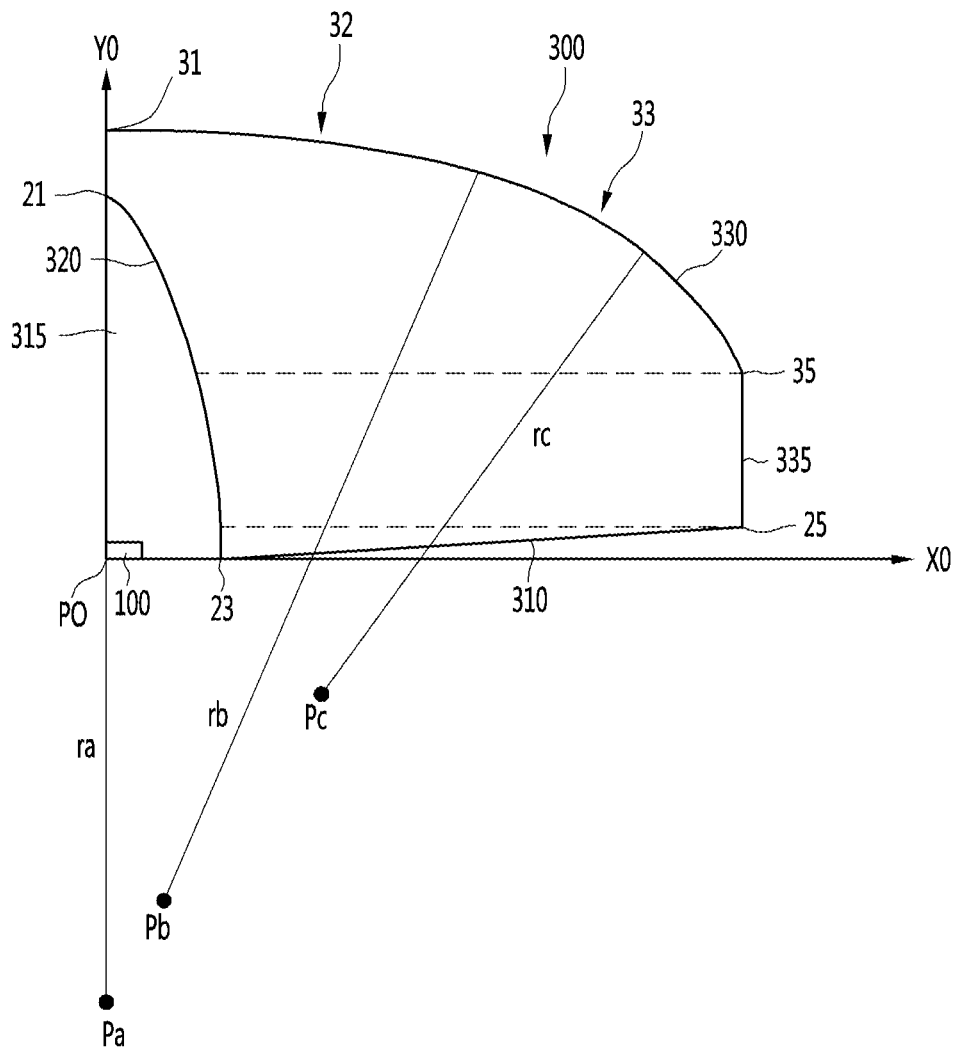
FIG. 7 is a view of a light output surface of an optical lens according to an embodiment.

Referring to FIG. 7, in the optical lens 300, the first light output surface 330 may have a plurality of circular components having different radii of curvatures ra, rb, and rc, and centers Pa, Pb, and Pc of the different circular components may be provided at different positions. The centers Pa, Pb, and Pc of the circular components of the first light output surface 330 may be provided lower than a straight horizontal line of the first vertex 21 of the light input surface 320. The centers Pa, Pb, and Pc of the circular components of the first light output surface 330 may be provided at a region vertically overlapping the optical lens 300. The light input surface 320 may have a plurality of circular components having different radii of curvatures, and centers of the circular components may be provided lower than the straight horizontal line of the first vertex 21 of the light input surface 320 and provided at a region vertically overlapping the optical lens 300.

Figure 8:
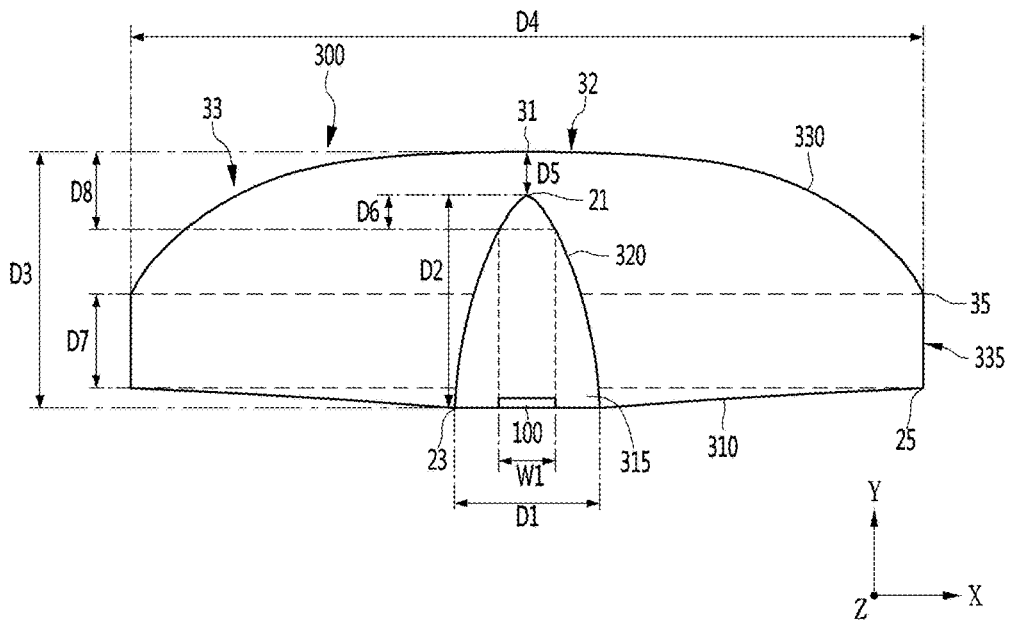
FIG. 8 is a side cross-sectional view illustrating a light emitting module having a light emitting device within an optical lens according to an embodiment.
Figure 9:
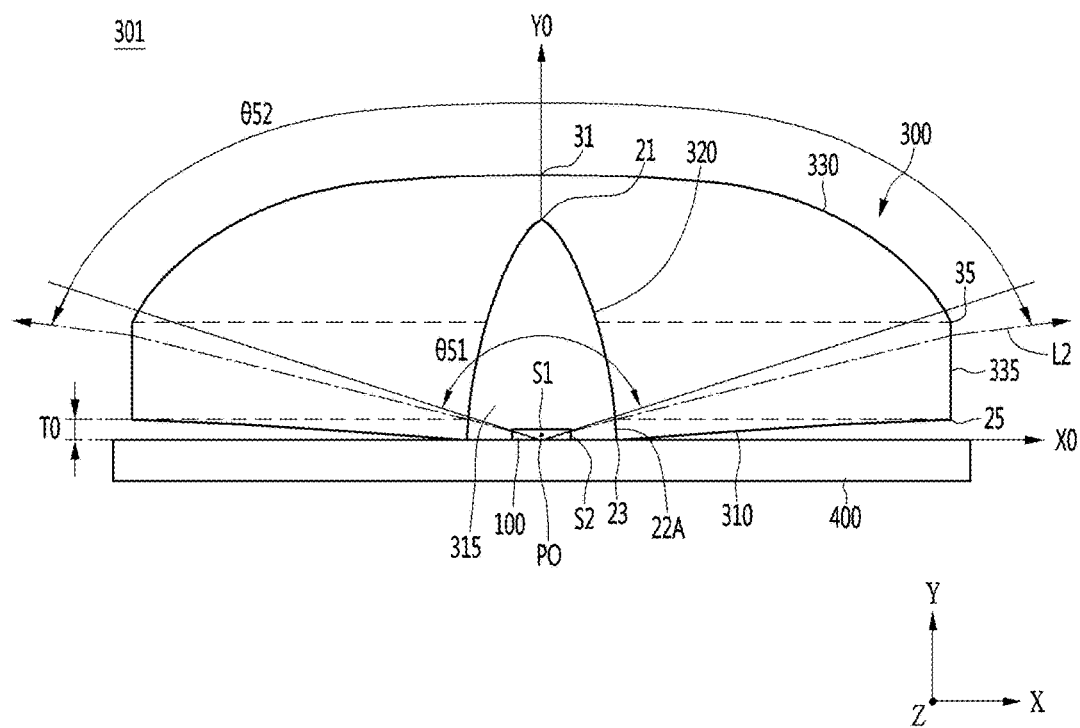
FIG. 9 is a side cross-sectional view illustrating a light emitting module having a circuit board below an optical lens according to an embodiment.
Figure 10:
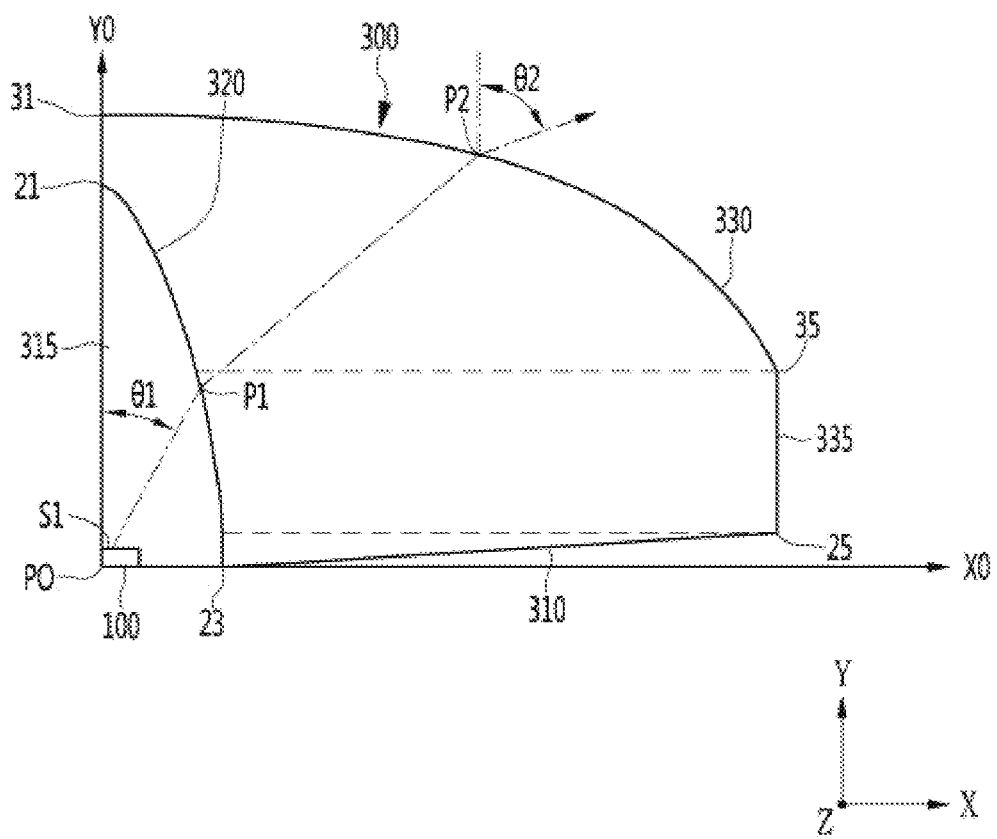
FIG. 10 is a view illustrating light output to a first light output surface of an optical lens according to an embodiment.
Figure 11:
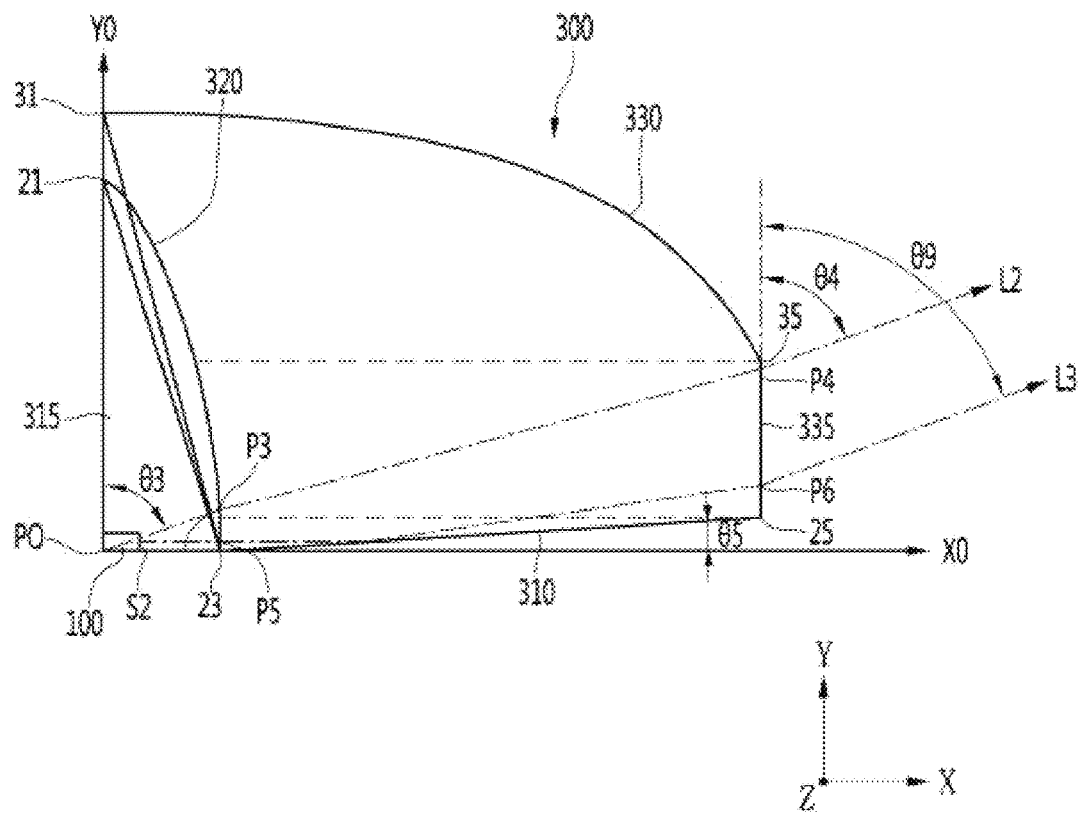
FIG. 11 is a view illustrating light output to a second light output surface of an optical lens according to an embodiment.
Figure 12:
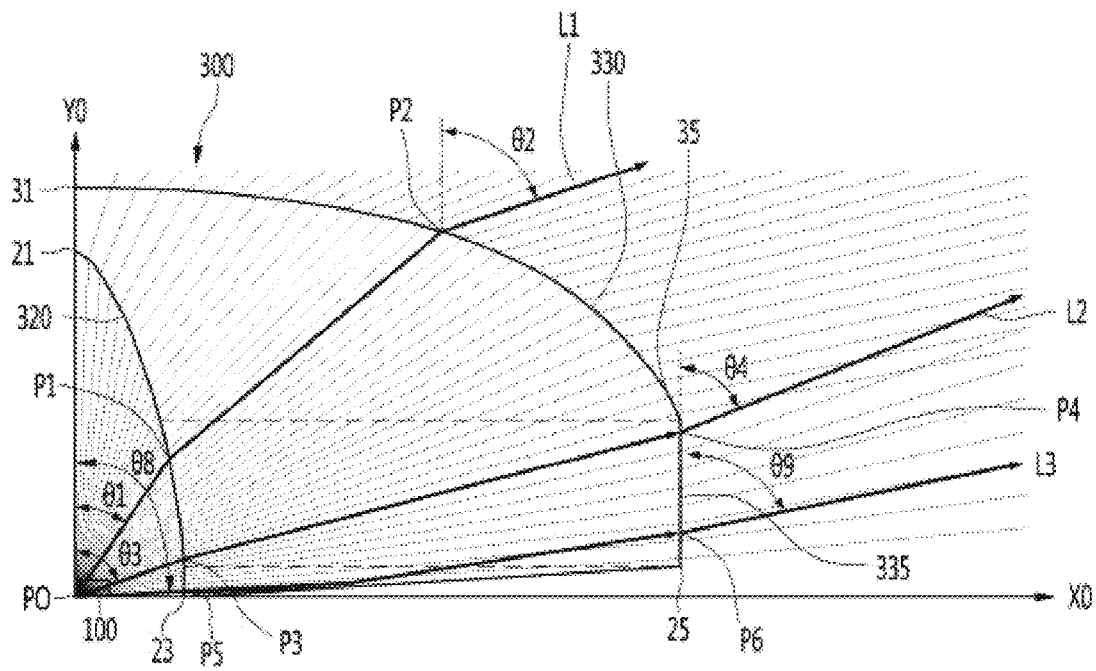
FIG. 12 is a view illustrating distribution of light output to first and second light output surfaces of an optical lens according to an embodiment.

FIG. 8 is a view illustrating a light emitting module in which a light emitting device is applied to an optical lens according to an embodiment. FIG. 9 is a side cross-sectional view illustrating a light emitting module having a circuit board below an optical lens according to an embodiment. FIG. 10 is a view illustrating light output to a first light output surface of an optical lens according to an embodiment. FIG. 11 is a view illustrating light output to a second light output surface of an optical lens according to an embodiment. FIG. 12 is a view illustrating distribution of light output to first and second light output surfaces of an optical lens according to an embodiment.

Referring to FIG. 8, a light emitting device 100 may be provided within the recess 315 of the optical lens 300. The light emitting device 100 may be a light source, and may be provided on the bottom of the recess 315 of the optical lens 300. The light emitting device 100 may be provided on the bottom of the recess 315 to vertically overlap the first vertex 21 of the light input surface 320 and the second vertex 31 of the first light output surface 330. The optical lens 300 may change a path of light emitted from the light emitting device 100 and extract the light to the outside. The light emitting device 100 may be defined as a light source. The light emitting device 100 may include a light-emitting diode (LED) chip having a compound semiconductor, for example, at least one of a blue LED chip, a green LED chip, a white LED chip, and a red LED chip. The light emitting device 100 may include at least one or both of a II-VI compound semiconductor and a III-V compound semiconductor. The light emitting device 100 may emit at least one of blue light, green light, UV light, or white light. The light emitting device 100 may, for example, emit white light.

In the optical lens 300, the width D1 of the bottom of the recess 315 may be a bottom width of the light input surface 320, and may be wider than a width W1 of the light emitting device 100. The light input surface 320 and the recess 315 may have sizes that allow light emitted from the light emitting device 100 to be easily incident. A ratio D1:W1 between the width D1 of the bottom of the recess 315 and the width W1 of the light emitting device 100 may be in a range of 1.8:1 to 3.0:1. When the width D1 of the bottom of the recess 315 is three times or smaller of the width W1 of the light emitting device 100, the light emitted from the light emitting device 100 may be effectively incident through the light input surface 320. When the width D1 of the bottom of the recess 315 is greater than three times the width W1 of the light emitting device 100, the inclined angle of the bottom surface 310 may change.

A position of the light input surface 320 having the same width as the light emitting device 100 may be a predetermined distance D6 apart from the first vertex 21 of the light input surface 320. The distance D6 may be the same as the minimum distance D5 between the recess 315 and the first light output surface 330 or have a difference within 0.1 mm therewith. Thus, vertical light emitted through an upper surface S1 of the light emitting device 100 may be incident on the first vertex 21 of the light input surface 320 or regions around the first vertex 21.

When the central axis Y0 is aligned with an axis vertical with respect to the upper surface S1 of the light emitting device 100, for example, an optical axis, the central axis Y0 may be defined by the optical axis. The optical axis and the central axis may have an alignment error between the light emitting device 100 and the optical lens 300. The central axis Y0 may be a direction orthogonal to an upper surface of a circuit board 400.

A distance D8 between a position of the light input surface 320 of the optical lens 300 having the same width as the light emitting device 100 and the second vertex 31 of the first light output surface 330 may be in a range of 0.5 mm to 2 mm, and may be twice the distance D5 or the distance D6. As a region of the light input surface 320 having the same width as the light emitting device 100 is provided at a distance of 2 mm or smaller from the second vertex 31 of the first light output surface 330, light may be diffused in the side direction by the depth D2 of the recess 310 and the distance thereof with the second vertex 31 even when the central region of the first light output surface 330 does not have a negative curvature. A ratio between the direction D6 between the first vertex 21 of the light input surface 320 and the width W1 within the recess 315 and the distance D5 between the first vertex 21 of the light input surface 320 and the second vertex 31 of the first light output surface 330 may satisfy a range of 0.5:1 to 1:1.

The minimum distance D5 between the recess 315 and the first light output surface 330 may be an interval between the first vertex 21 of the light input surface 320 and the second vertex 31 of the first light output surface 330. The distance D5 may be, for example, 1.5 mm or smaller, and in a range of 0.6 mm to 1 mm. When the distance D5 is 1.5 mm or greater, a hot spot phenomenon may occur. When the distance D5 is smaller than 0.6 mm, the stiffness of the center of the optical lens 300 may weaken. As the first vertex 21 of the light input surface 320 approaches the convex second vertex 31 of the first light output surface 330, an amount of light traveling to the side direction of the first light output surface 330 through the light input surface 320 may increase.

Figure 67:
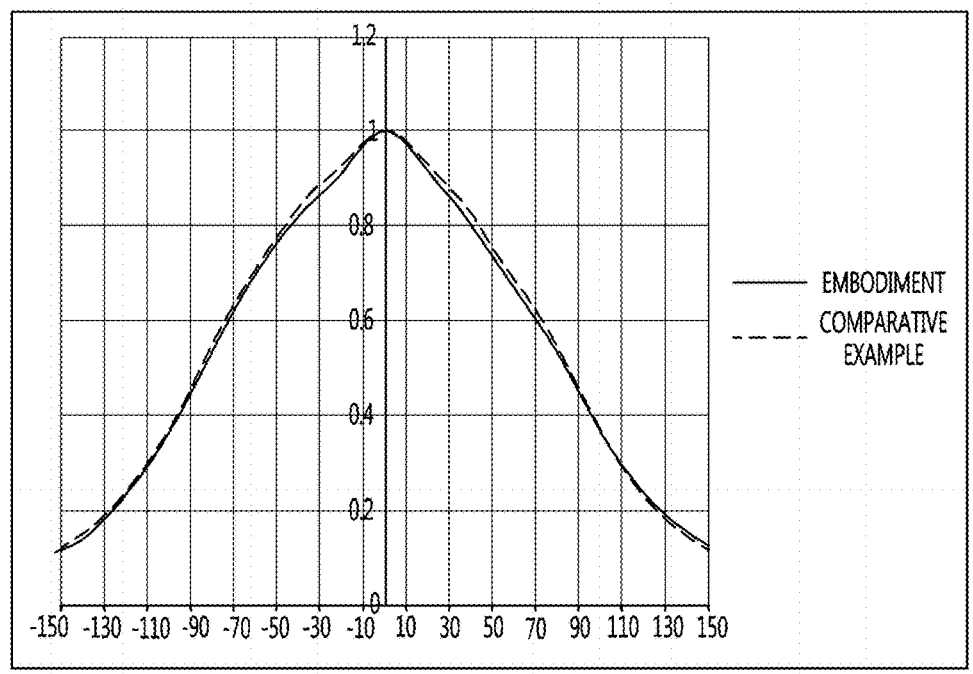
FIG. 67 is a graph of luminance distributions of an embodiment and a comparative example.

Thus, the amount of light diffusing to the side direction of the optical lens 300 may be increased. Even when the central region 32 of the first light output surface 330 does not have a total reflection surface or a negative curvature, a path of light may be diffused in a horizontal direction around the central region. FIG. 67 is a view illustrating a luminance distribution of an optical lens in a light unit according to an embodiment. An optical lens in the embodiment may be a structure in which a first light output surface does not have a negative curvature, and may be compared with an optical lens in the comparative example in which the first light output surface has a negative curvature. The optical lens in the embodiment may have almost the same luminance distribution as the optical lens in the comparative example even when the first light output surface having the negative curvature is not provided. Thus, a manufacturing process of the optical lens may be facilitated, and an introduction of a foreign material into a region having the negative curvature may be prevented.

The first vertex 21 of the light input surface 320 may be provided more adjacent to the second vertex 31, which is the center of the first light output surface 330, than a straight horizontal line extending from the third edge 35 of the second light output surface 335.

In FIG. 9, a light emitting module 301 may include the circuit board 400 provided below the light emitting device 100 and the optical lens 300. One or a plurality of the light emitting devices 100 may be arranged on the circuit board 400 in predetermined intervals. The light emitting device 100 may be provided between the optical lens 300 and the circuit board 400, and may operate by receiving power from the circuit board 400 to emit light. The circuit board 400 may include a circuit layer electrically connected to the light emitting device 100. The circuit board 400 may include at least one of a printed circuit board (PCB) of a resin material, a metal core PCB (MCPCB), and a flexible PCB (FPCB), but is not limited thereto.

The optical lens 300 may receive light emitted from the light emitting device 100 through the light input surface 320 and emit the light to the first and second light output surfaces 330 and 335. Partial light incident from the light input surface 320 may be emitted to the first and second light output surfaces 330 and 335 after passing through a predetermined path and being reflected by the bottom surface 310. A beam spread angle θ51 of the light emitting device 100 may be a unique beam spread angle of the light emitting device 100, and may emit light in an angle of 130° or greater, for example, 136° or greater. Light may be emitted through the upper surface S1 and a side surface S2 of the light emitting device 100. When the light emitted from the light emitting device 100 is incident with the beam spread angle distribution of 130° or greater, for example, 136° or greater, the optical lens 300 may radiate the light in a diffused beam spread angle θ52 through the first and second light output surfaces 330 and 335.

In the optical lens 300, the light input surface 320 may be provided at outsides of the upper surface S1 and the side surface S2 of the light emitting device 100. The lower region 22A of the light input surface 320 of the optical lens 300 may be provided to face a plurality of side surfaces S2 of the light emitting device 100. The light emitting device 100 may emit light through the upper surface S1 and the plurality of side surfaces S2. The light emitting device 100 may have, for example, five or more light emitting surfaces. The plurality of side surfaces S2 of the light emitting device 100 may include at least four side surfaces which may be light emitting surfaces. The light emitted from the upper surface S1 and the side surfaces S2 of the light emitting device 100 may be incident on the light input surface 320. Also, the light emitted through each of the side surfaces S2 may be incident to the light input surface 320 without leakage.

As the light emitting device 100 provides five or more light emitting surfaces, the beam spread angle distribution of the light emitting device 100 may be wider due to light emitted through the side surfaces S2. The beam spread angle θ51 of the light emitting device 100 may be 130° or greater, for example, 136° or greater. ½ of the beam spread angle θ51 of the light emitting device 100 may be may be 65° or greater, for example, 68° or greater. The beam spread angle θ51 may be a beam angle passing a half-value width, in which intensity of light becomes ½ of the maximum intensity of light, and ½ of the beam spread angle θ51 may be ½ of the beam angle. As the beam spread angle of the light emitting device 100 becomes wider, light diffusion using the optical lens 300 may be more facilitated.

When the beam spread angle θ51 of light emitted from the light emitting device 100 is 130° or greater, the beam spread angle θ51 may widen (θ52>θ51) after the light passes the optical lens 300. For example, the beam spread angle θ52 emitted from the optical lens 300 may be 10° greater or more than the unique beam spread angle θ51 of the light emitting device 100. The beam spread angle θ52 emitted from the optical lens 300 may be 140° or greater, e.g. 146° or greater. An angle (θ21×2 of FIG. 1) formed by two straight lines passing through the third edge 35 of the second light output surface 335 of the optical lens 300 from the center of the bottom of the recess 315 may be greater than the beam spread angle θ51 of the light emitting device 100 and smaller than the beam spread angle θ52 of the optical lens 300. As in FIG. 1, the angle θ21 formed by the straight line X5 passing through the third edge 35 of the second light output surface 335 with respect to the center P0 of the bottom of the recess 315 may be 144° or greater, for example, in a range of 144° to 152°. The beam spread angle θ52 emitted from the optical lens 300 may be greater than the angle formed by the two straight lines passing through the third edge 35 of the second light output surface 335 of the optical lens 300. The distribution of the beam spread angle θ52 emitted from the optical lens 300 may include a beam spread angle distribution of light emitted through the second light output surface 335, thereby reducing optical loss by the distribution of light emitted from the second light output surface 335, and improving a luminance distribution.

The bottom surface 310 of the optical lens 300 may provide a surface that is inclined with respect to the upper surface of the circuit board 400. The bottom surface 310 of the optical lens 300 may be provided as an inclined surface with respect the first axis X0. 80% or more, for example, the whole region, of the bottom surface 310 may be provided at a slant with respect to the upper surface of the circuit board 400. The bottom surface 310 may include a total reflection surface. The upper surface of the circuit board 400 may be provided more adjacent to the first edge 23 than the second edge 25 of the bottom surface 310 of the optical lens 300. The first edge 23 of the bottom surface 310 may come in contact with the upper surface of the circuit board 400, and the second edge 25 may be the maximum interval T0 apart from the upper surface of the circuit board 400. As the first edge 23 may be provided at a position lower than an active layer in the light emitting device 100, the optical loss may be prevented.

The first and second light output surfaces 330 and 335 of the optical lens 300 may refract and emit the incident light. The whole region of the first light output surface 330 may be formed as a curved surface through which light is output. The first light output surface 330 may include a curved shape continuously connected from the second vertex 31. The first light output surface 330 may reflect or refract the incident light to output the light to the outside. At the first light output surface 330, an emission angle of the light emitted through the first light output surface 330 after the refraction may be greater than an incidence angle in which the light is incident before the refraction with respect to the central axis Y0. With respect to the central axis Y0, the second light output surface 335 may refract light L2 such that an angle of the light L2 after the refraction is smaller than an incidence angle of the light L2 before the refraction. Thus, a light interference distance between adjacent optical lenses 300 may be long, and colors of partial light output through the second light output surface 335 and light output to the first light output surface 330 may be mixed around the optical lens 300.

The second light output surface 335 may be provided at the lower circumference of the first light output surface 330 to refract and emit the incident light. The second light output surface 335 may include an inclined surface or a flat surface. The second light output surface 335 may be, for example, a surface perpendicular or inclined with respect to the upper surface of the circuit board 400. When the second light output surface 335 is formed as an inclined surface, separation thereof may be easy during injection molding. The second light output surface 335 may receive partial light emitted to the side surfaces S2 of the light emitting device 100 to refract and extract the light. At the second light output surface 335, the output angle of the emitted light L2 may be smaller than the incidence angle before the refraction with respect to the central axis Y0. Thus, the light interference distance between adjacent optical lenses 300 may be long.

An optical path of the optical lens 300 may be described with reference to FIGS. 10 to 12. Referring to FIGS. 10 to 12, out of the light emitted from the light emitting device 100, first light L1 incident on a first point P1 of the light input surface 320 of the optical lens 300 may be refracted and emitted to a predetermined second point P2 of the first light output surface 330. Also, out of the light emitted from the light emitting device 100, second light L2 incident on a third point P3 of the light input surface 320 may be emitted to a fourth point P4 of the second light output surface 335. The incidence angle of the first light L1 incident on the first point P1 of the light input surface 320 may be defined as a first angle θ1 with respect to the central axis Y0, and the emission angle of the first light L1 emitted to any second point P2 of the first light output surface 330 may be defined as a second angle θ2 with respect to the central axis Y0. The incidence angle of the second light L2 incident on the third point P3 of the light input surface 320 may be defined as a third angle θ3 with respect to the central axis Y0, and the emission angle of the second light L2 emitted to any fourth point P4 of the second light output surface 335 may be defined as a fourth angle θ4 with respect to the central axis Y0. The second light L2 may be light emitted to the side surfaces of the light emitting device 100.

The second angle θ2 may be greater than the first angle θ1. The second angle θ2 may increase as the first angle θ1 increases, and decrease as the first angle θ1 decreases. Also, the first and second angles θ1 and θ2 may satisfy a condition of θ2>θ1 or 1<(θ2/θ1). The second angle θ2 of the first light output surface 330 may be the emission angle after the refraction, and may be greater than the incidence angle before the refraction. Thus, as the first light output surface 330 refracts the first light L1 traveling to the first light output surface 330 of the light incident through the light input surface 320, the first light output surface 330 may diffuse the first light L1 to the side direction of the optical lens 300. The fourth angle θ4 may be smaller than the third angle θ3. The fourth angle θ4 may increase as the third angle θ3 increases, and the fourth angle θ4 may decrease as the third angle θ3 decreases. Also, the third and fourth angles θ3 and θ4 may satisfy a condition of θ4<θ3 or 1>(θ4/θ3). The fourth angle θ4 of the second light output surface 335 may be the emission angle after the refraction, and may be smaller than the incidence angle before the refraction.

Light emitted through the side surfaces S2 of the light emitting device 100 or light deviated from a beam spread angle may be incident on the second light output surface 335. Thus, the second light output surface 335 may refract the light emitted through the side surfaces S2 of the light emitting device 100 and the light deviated from the beam spread angle to travel to the beam spread angle region of the luminance distribution. The optical loss may be reduced by the second light output surface 335.

The straight line passing through the center P0 of the bottom of the recess 315 and the third edge 35 of the second light output surface 335 may be provided at a ½ position of the half-value angle of the light emitted through the optical lens 300, for example, at a position above the position of the fourth angle θ4, with respect to the central axis Y0. For example, an angle between the central axis Y0 and a straight line connecting the center P0 of the bottom of the recess 315 to the third edge 35 may be greater than a ½ angle of the unique beam spread angle of the light emitting device 100, and may be smaller than a ½ angle of the beam spread angle of the optical lens 300. The half-value angle or the beam spread angle may represent an angle at which an output of the light emitted from the light emitting device 100 becomes 50% or ½ of a peak value.

Out of the light emitted from the light emitting device 100, light L3 incident on a fifth point P5 of the light input surface 320 may be reflected by the bottom surface 310 of the optical lens 300 and may be transmitted or reflected through a sixth point P6 of the second light output surface 335. The second light output surface 335 may transmit or reflect the light in an emission angle θ9, which may be smaller than an incidence angle θ8 of the light reflected from the bottom surface 310 and made incident. The incidence angle θ8 and the emission angle θ9 may be angles with the central axis Y0. The light reflected by the bottom surface 310 and traveling to the second light output surface 335 may be refracted such that the emission angle θ9 may be smaller than the incidence angle θ8, thereby effectively reusing light that may be leaked through the side surfaces S2 of the light emitting device 100. Also, the leakage of light deviated from the beam spread angle of the light emitting device 100 may also be prevented by the total reflection by the bottom surface 310.

Figure 13:
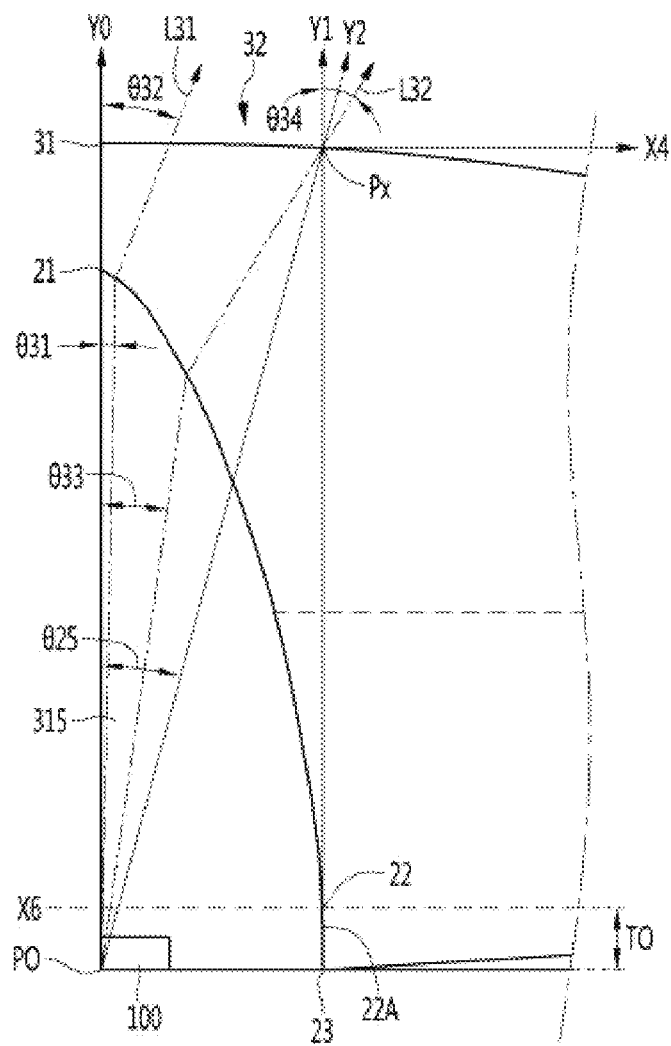
FIG. 13 is a view illustrating a path of light emitted to a region corresponding to the recess among the first light output surface of the optical lens according to an embodiment.

As illustrated in FIG. 13, when examining a path of light emitted to the central region 32 of the first light output surface 330 in the optical lens 300, when the light emitted from the light emitting device 100 is incident on the light input surface 320 in an angle θ31, which is 1° deviated with respect to the optical axis, light L31 emitted to the first light output surface 330 may be refracted in an angle of 15° or greater, for example, an angle θ32 which is 17° or greater. When the light which is deviated from the central axis Y0 by the angle θ31 of 1° is incident on the light input surface 320, the first light output surface 330 may refract the light as the light L31 which may have the angle θ32, which is seventeen times the angle θ31 or greater. When the light incident on the light input surface 320 moves 2° with respect to the central axis Y0, the light may be refracted at the first light output surface 330 while having an angle difference of 20° or greater, e.g. ten times greater.

The central region 32 of the first light output surface 330 may be a region within the point Px intersecting with the straight line Y1 perpendicular to the first edge 23 of the recess 315. Out of the light emitted from the light emitting device 100, light L32 emitted in an angle θ33 within 10° with respect to the central axis Y0 may be incident on the central region 32 of the first light output surface 330. The light emitted in the angle θ33 within 10° from the light emitting device 100 may be refracted through the light input surface 320 and the second light output surface 335, and may be refracted in a maximum angle of 50° or greater, e.g. an angle θ34 which is 55° or greater. The light incident on the central region 32 of the first light output surface 330 may be refracted by the convexly curved surfaces of the light input surface 320 and the second light output surface 335, thereby preventing a hot spot in the central region 32 of the first light output surface 330. The central region 32 of the first light output surface 330 may be a region within a straight line Y2 connecting the center of the light emitting device 100 to the point Px, and the angle from the central axis Y0 to the point Px may be 20° smaller, for example, the angle θ24 which is 18° or smaller. The point Px may be provided lower than the straight line X4 horizontally coming in contact with the second vertex 31.

Figure 68:
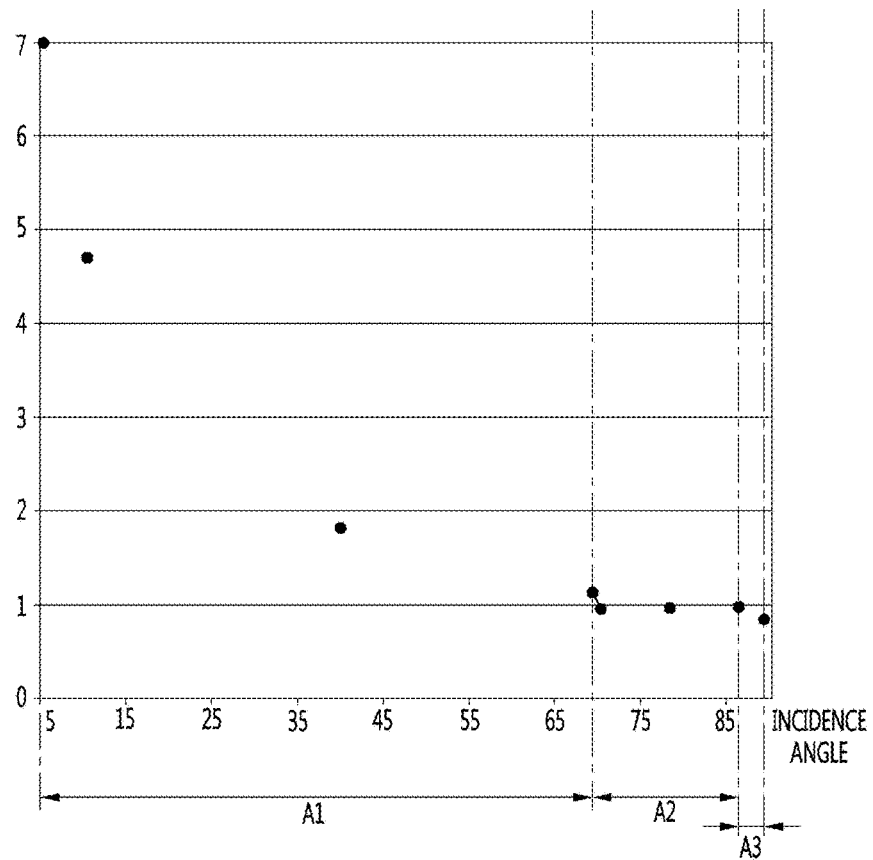
FIG. 68 is a graph of changes in output light in accordance with a position of a light output surface of an optical lens according to an embodiment.
Figure 69:
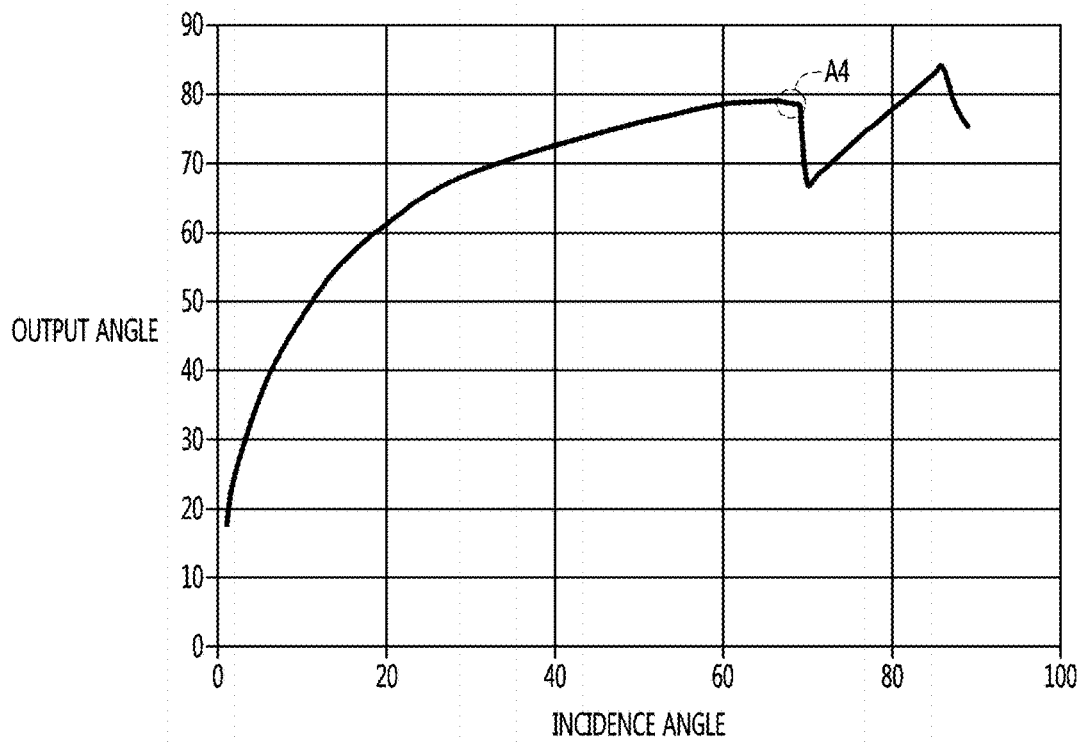
FIG. 69 is a graph comparing an incidence angle of a light input surface to an output angle of a light output surface of an optical lens according to an embodiment.

FIGS. 68 and 69 are graphs illustrating a ratio between an output angle of light output to the first and second light output surfaces and an incidence angle of the incidence surface. When described with reference to FIGS. 68 and 12, in a region A1 of the first light output surface 330, the ratio between the output angle and the incidence angle gradually shrinks approaching a region A2 of the second light output surface 335, and the ratio is greater than 1. The x-axis direction of FIG. 68 represents a beam spread angle of light incident on the light input surface, and the beam spread angle distribution of light of 68° or greater may be controlled by a second region A2 of the second light output surface 335. In the second region A2 of the second light output surface 335, the ratio between the output angle and the incidence angle may have a value less than 1, and the ratio between the output angle and the incidence angle of light output through a region A3 reflected to the second light output surface 335 by the bottom surface 310 may have a smaller value than the region A2.

Referring to FIGS. 69 and 12, an output angle of light output to the first light output surface 330 of the optical lens 300 may increase as the incidence angle of the light incident on the light input surface 320 of the optical lens 300 increases. The output angle may not increase at an outer lower portion A4 of the first light output surface 330, and the outer lower portion A4 may be provided as a tangential line or a perpendicular surface. Also, the output angle output to the second light output surface 335 of the optical lens 300 may be smaller than the incidence angle input to the light input surface 320, and may increase as the incidence angle increases.

Figure 14:
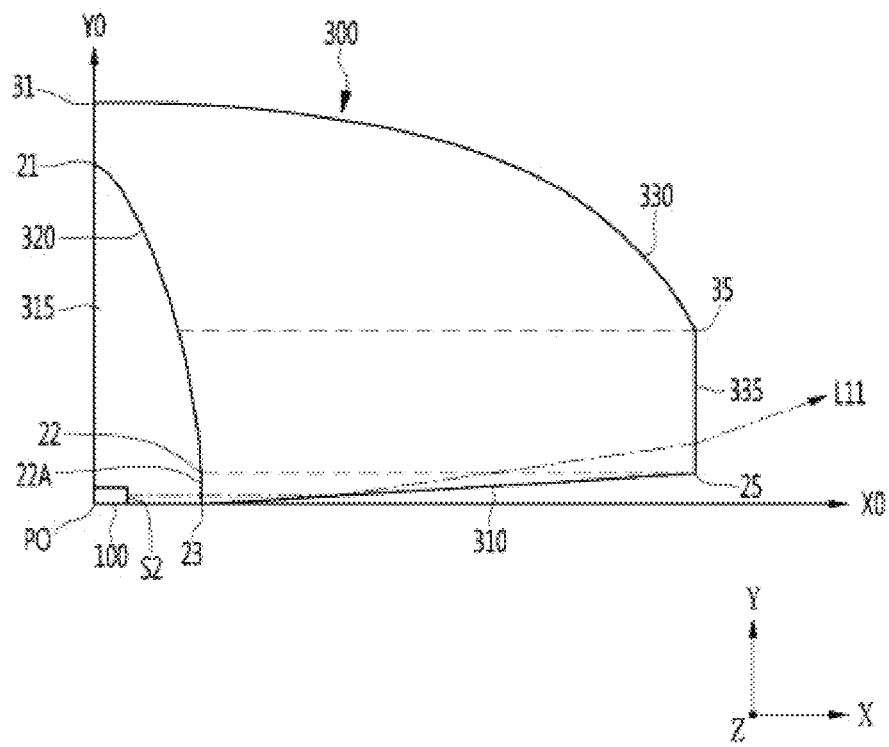
FIG. 14 is a view illustrating a path of horizontal light emitted from a light emitting device in an optical lens according to an embodiment.

Referring to FIG. 14, light emitted horizontally from the side surface S2 of the light emitting device 100 may be incident through the lower region 22A of the light input surface 320, and light L11 incident through the light input surface 320 may be reflected by the bottom surface 310 and emitted through the second light output surface 335. The light L11 may be incident in an angle of 88° to 90° with respect to the lower region 22A of the light input surface 320.

Figure 15:
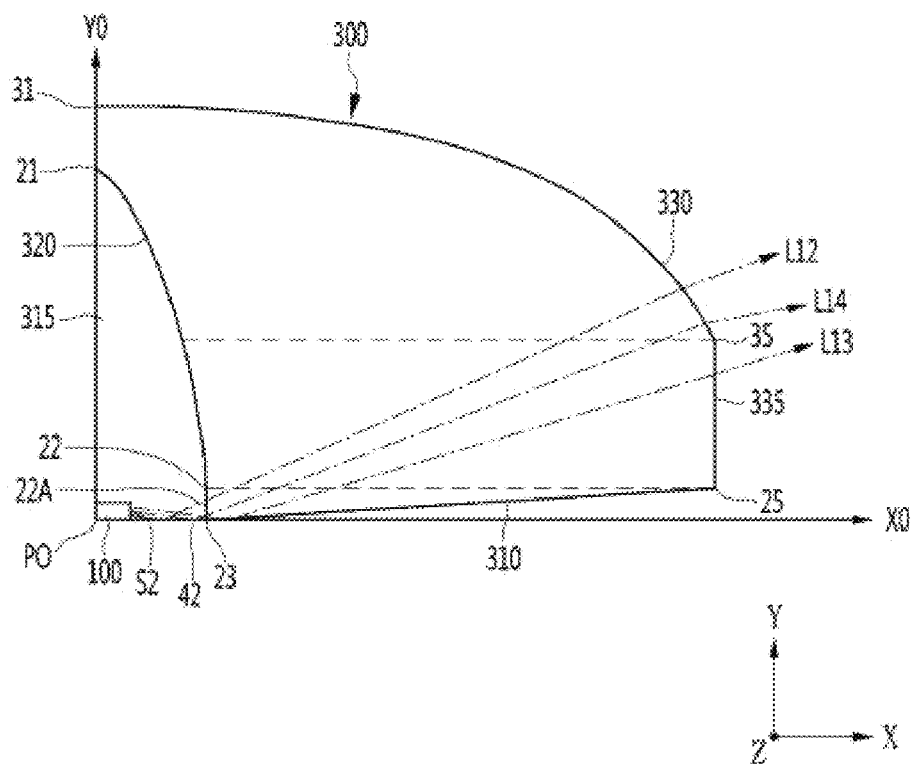
FIG. 15 is a view illustrating a path of light incident around a low point of an optical lens among light emitted from a light emitting device in the optical lens according to an embodiment.

Referring to FIG. 15, out of the light emitted to the side surface S2 of the light emitting device 100, the light L11, light L12, and light L13 incident at a slant may be reflected by the upper surface of the circuit board or incident at a slant on the lower region 22A of the light input surface 320. The light L13 incident at a slant on the lower region 22A of the light input surface 320 may be reflected by the bottom surface 310 to be emitted to the second light output surface 335, and the light L12 and light L14 reflected by the circuit board may be refracted through the first and second light output surfaces 330 and 335. The luminance distribution of light incident on the lower region 22A of the light input surface 320 may be improved.

Figure 16:
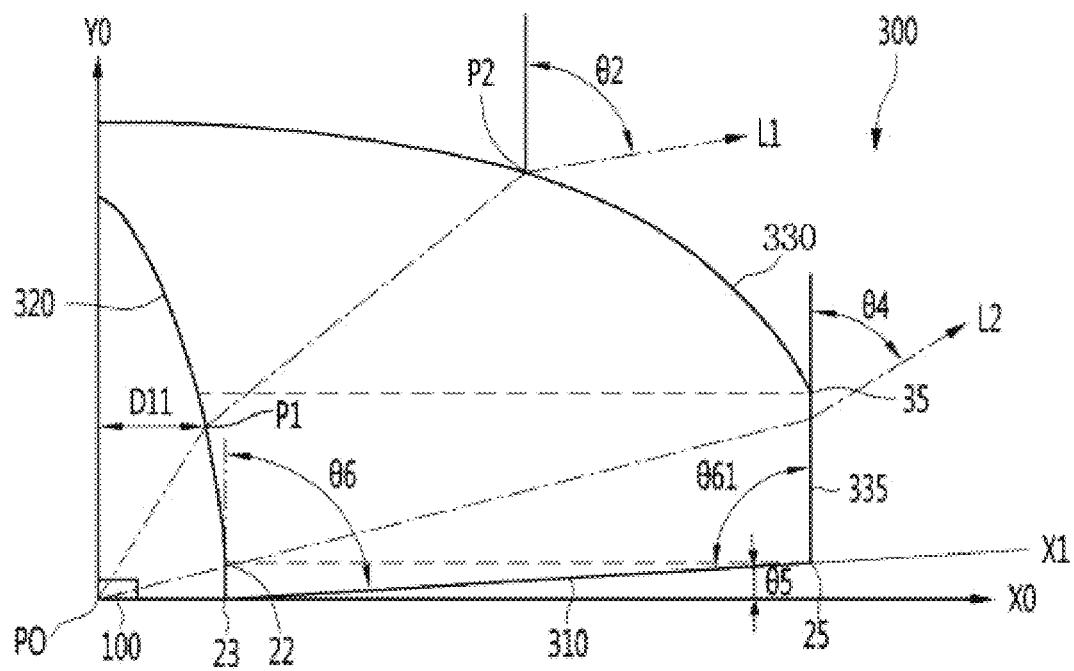
FIG. 16 is a view illustrating output angles of first and second light output surfaces of an optical lens according to an embodiment.

Referring to FIG. 16, out of regions of the second light output surface 335 of the optical lens 300, when the output angle θ2 of outputting light at the second point P2 is a ½ point of the beam spread angle of the light emitting device 100 based on the central axis Y0, a distance D11 between a first point P1 on the light input surface 320 of light incident on the second point P2 and the central axis Y0 may be ½ or less of the width D1 of the bottom of the recess 315. This may enable the light to be diffused to the side direction even when the thickness of the optical lens 300 is reduced or the height of the peak of the first light output surface 330 is lowered.

In the optical lens 300, an angle θ6 formed by the first straight line X1 passing through the both edges 23 and 25 of the bottom surface 310 and the central axis Y0 may be an acute angle, for example, 89.5° or smaller, or 87° or smaller. As the bottom surface 310 of the optical lens 300 is provided as a surface having an inclined angle θ5, the bottom surface 310 of the optical lens 300 may reflect light incident through the side surfaces S2 of the light emitting device 100 and transmit or reflect the light through the second light output surface 335. As the second light output surface 335 outputs the light such that the output angle is smaller than the incidence angle of light incident through the light input surface 320, interference between adjacent optical lenses 300 may be reduced. Thus, the amount of light emitted through the second light output surface 335 of the optical lens 300 may be improved. The inclined angle θ5 of the bottom surface 310 may be greater than an inclined angle θ7 of the second light output surface 335 illustrated in FIG. 19.

The angle θ6 between the central axis Y0 and the bottom surface 310 of the optical lens 300 may be smaller than an angle θ61 between the bottom surface 310 and the second light output surface 335. The angles θ6 and θ61 may satisfy θ6/θ61<1. The angle θ6 may be smaller than 90°, and the angle θ61 may be 90° or greater, for example, in a range of 90°<θ61≤95°. As the line segment of the bottom surface 310 of the optical lens 300 has an acute angle with respect to the central axis Y0 and has an obtuse angle with respect to the second light output surface 335, the light emitted from the light emitting device 100 may be totally reflected, and interference with other optical lenses may be reduced as the totally reflected light is refracted through the second light output surface 335.

One or a plurality of supporting protrusions provided at a lower portion of the optical lens 300 may protrude downward from the bottom surface 310, for example, toward the circuit board 400. The plurality of the supporting protrusions may be fixed on the circuit board 400, thereby preventing the optical lens 300 from being tilted.

Figure 17:
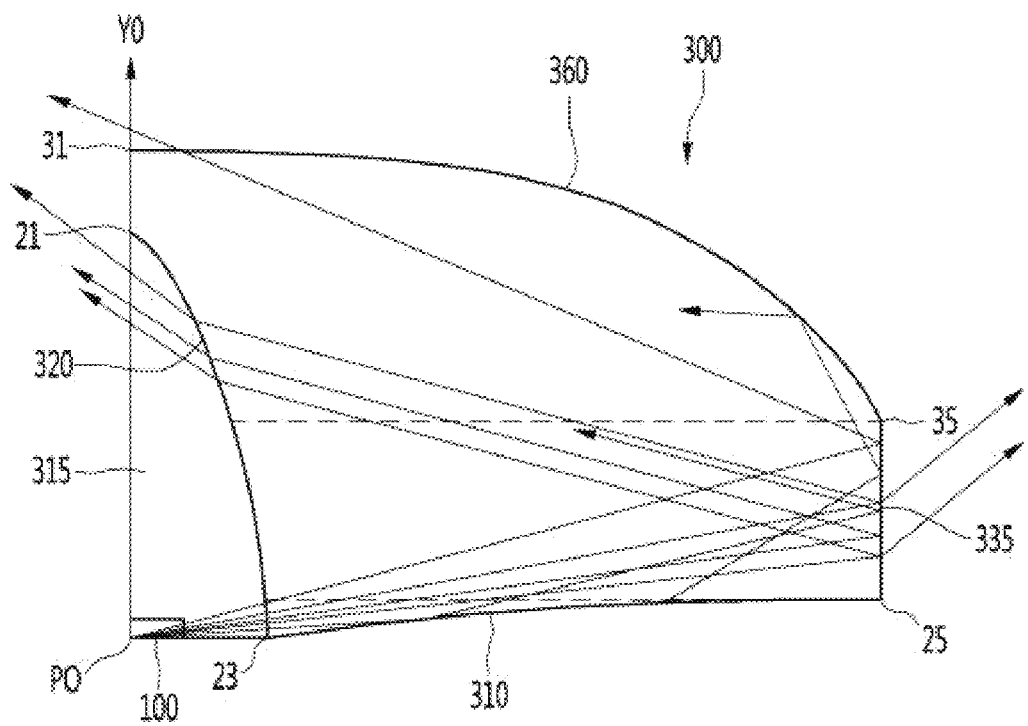
FIG. 17 is a view illustrating light paths when reflected by a second light output surface of an optical lens according to an embodiment.

Referring to FIG. 17, a haze surface may be formed at the optical lens 300, for example, on the bottom surface 310 and the second light output surface 335. The bottom surface 310 and the second light output surface 335, on which the haze surface is formed, may transmit or reflect partial light. The light reflected by the first light output surface 330 may change an optical path toward the second light output surface 335 or the light input surface, thereby allowing the light to be emitted toward the first light output surface 330.

Figure 18:
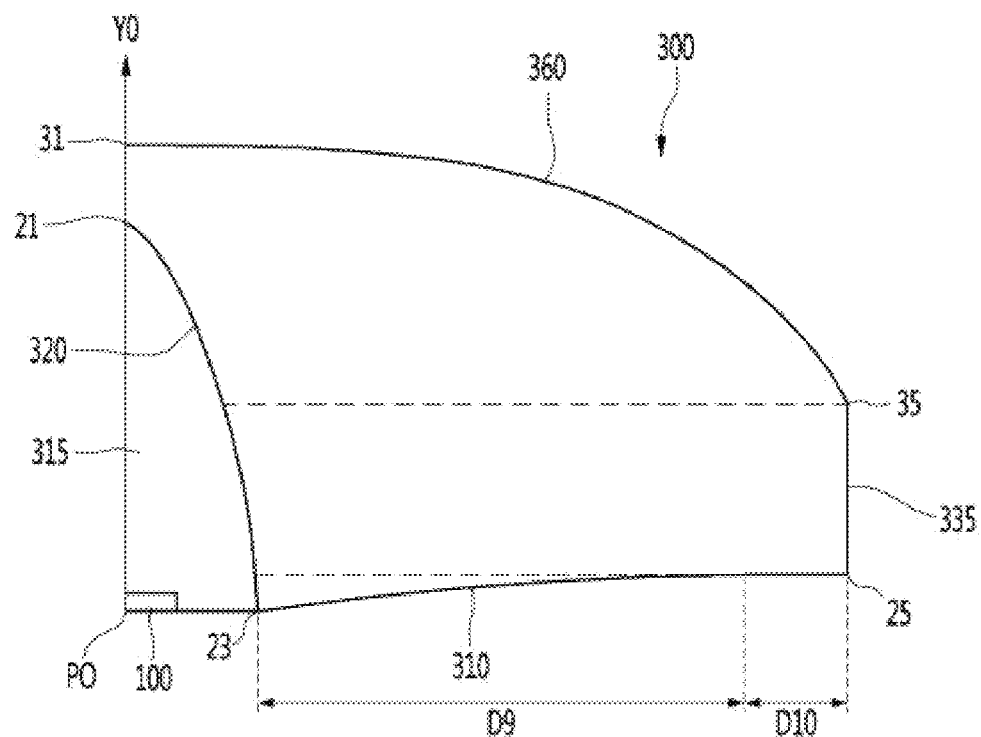
FIG. 18 is a view of a bottom surface of the optical lens of FIG. 1 according to another embodiment.

Referring to FIG. 18, the bottom surface 310 of the optical lens 300 may include a first region D9 having a curved surface and a second region D10 having a flat surface. In the bottom surface 310, a region adjacent to the recess 315 may have a curved surface and a region adjacent to the second light output surface 335 may have a flat surface. Thus, the bottom surface 310 may be provided as a horizontal surface or an inclined surface. The first region D9 may have a curvature that is upwardly convex from the first edge 23. That is, the curved surface of the first region D9 in the bottom surface 310 may be upwardly concave with respect to a horizontal extension line, and may have a radius of curvature, for example, in a range of 65 mm to 75 mm. That is, the first region D9 may have a negative curvature. The second region D10 may be provided between the first region D9 and the second edge 25. A width of the first region D9 may be wider than a width of the second region D10. A ratio between lengths of the first region D9 and the second region D10 may be 6:4 to 9:1. As the width of the first region D9 is wider, a hot spot phenomenon at the central portion of the optical lens 300 may be further reduced.

The first region D9, which is a curved section of the bottom surface 310, may be provided adjacent to the light input surface 320, and the second region D10, which is a flat section, may be provided adjacent to the second edge 25. The curved surface and the flat surface may be provided above a line segment straightly connecting the first edge 23 to the second edge 25. The first region D9 may be provided lower than the horizontally extending line of the second edge 25, and the second region D10 may be provided on the same line as the horizontally extending line of the second edge 25. The first region D9 of the bottom surface 310 may refract the light emitted from the light emitting device 100 in another direction, thereby changing the luminance distribution by the first and second light output surfaces 330 and 335. When the bottom surface 310 includes the curved region, the hot spot phenomenon in the luminance distribution of light at the central portion may be improved compared to the optical lens having an inclined surface.

Figure 19:
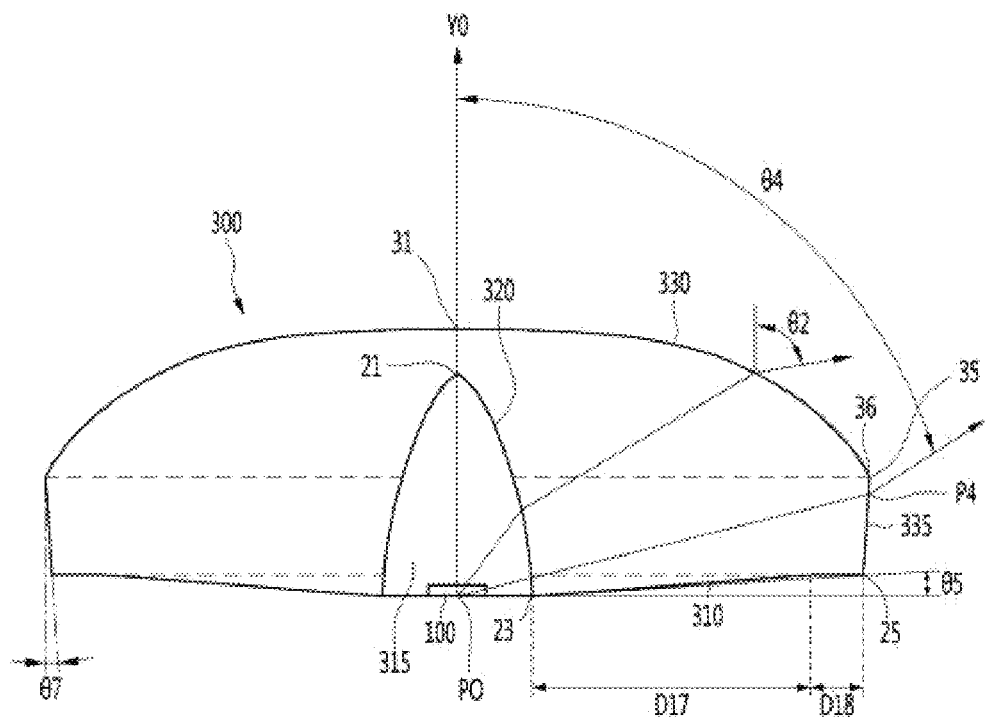
FIG. 19 is a view of a second light output surface of the optical lens of FIG. 1 according to another embodiment.

FIG. 19 is another example of the second light output surface and the bottom surface of the optical lens of FIG. 1. Referring to FIG. 19, the second light output surface 335 of the optical lens 300 may be inclined by a seventh angle θ7 with respect to the vertical central axis Y0. The seventh angle θ7 may be smaller than a fifth angle θ5. The angles θ7 and θ5 may satisfy θ7/θ5<1.

The bottom surface 310 of the optical lens 300 may include, for example, a first region D17 having an inclined surface and a second region D18 having a horizontal surface.

The first region D17 may be inclined from the first edge 23, and the second region D18 may be provided between the first region D17 and the second edge 25. A section of the first region D17 may be greater than a section of the second region D18. A ratio between the sections of the first region D17 and the second region D18 may be 6:4 to 9:1. The first region D17 may be provided lower than the horizontally extending line of the second edge 25 to correspond to a side surface of the light emitting device 100, and the second region D18 may be provided on the same line as the horizontally extending line of the second edge 25. As the section of the first region D17 is wider, the hot spot phenomenon at the central portion of the optical lens 300 may be reduced. The luminance distribution of light illustrated in FIG. 73 may be a case of providing an optical lens having a bottom surface with an inclined surface instead of a horizontal surface, and the hot spot phenomenon at the central portion may be improved.

Figure 20:
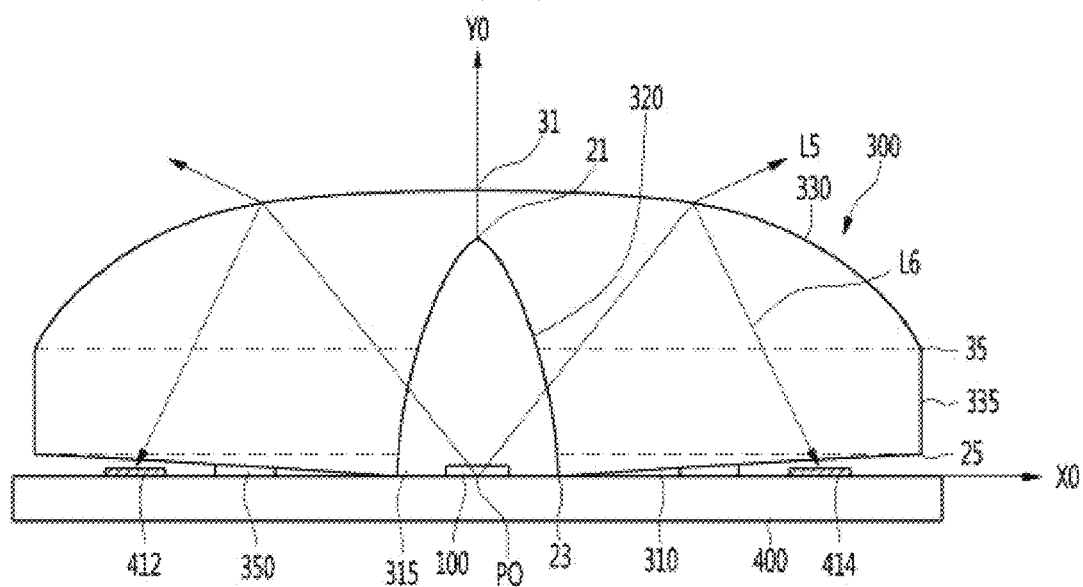
FIG. 20 is a view of a light emitting module with a circuit board having supporting protrusions and an absorption layer of an optical lens according to an embodiment.
Figure 21:
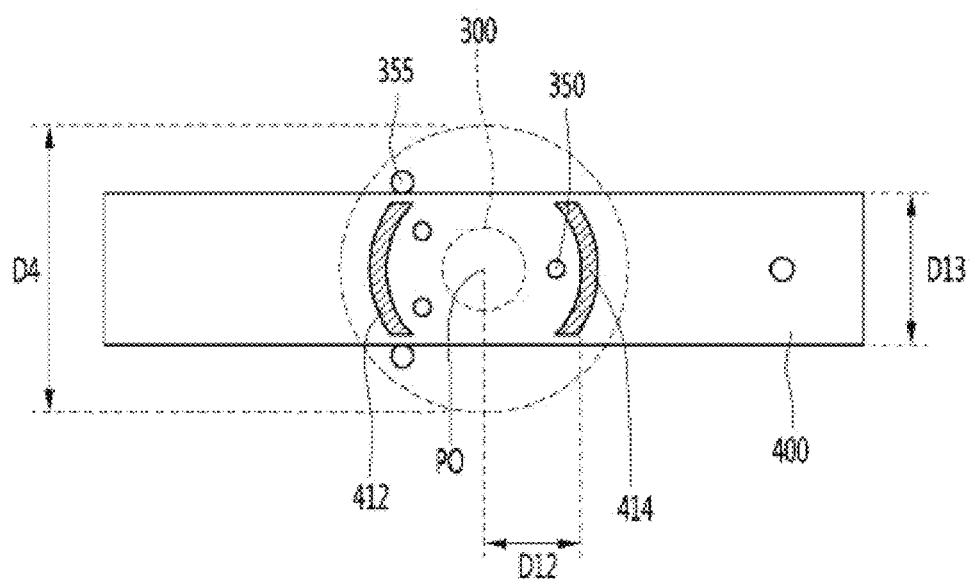
FIG. 21 is a see-through view of the optical lens of the light emitting module of FIG. 20.

FIGS. 20 and 21 illustrate a structure of providing an absorption layer on the circuit board in the light emitting module according to an embodiment. Referring to FIGS. 20 and 21, absorption layers 412 and 414 may be provided on the circuit board 400. The absorption layers 412 and 414 of the circuit board 400 may be provided at regions where an absorption rate of light passing through the bottom surface 310 of the optical lens 300 is the maximum. Partial light may be reflected by the first light output surface 330 in the optical lens 300, and the absorption layers 412 and 414 may be provided at regions where a traveling path of the reflected light is concentrated.

Partial light L5 incident on the first light output surface 330 of the optical lens 300 may be transmitted and partial light L6 may be reflected. The absorption layers 412 and 414 may absorb the partial light L6 when the partial light L6 reflected by the first light output surface 330 transmits through the bottom surface 310. The absorption layers 412 and 414 may include a black resist material. The absorption layers 412 and 414 may be provided at regions vertically overlapping with the optical lens 300. The absorption layers 412 and 414 may be provided at regions vertically overlapping the bottom surface 310 of the optical lens 300. The absorption layers 412 and 414 may be provided at opposite sides from each other with respect to the recess 315 of the optical lens 300 of the circuit board 400.

Figure 72:
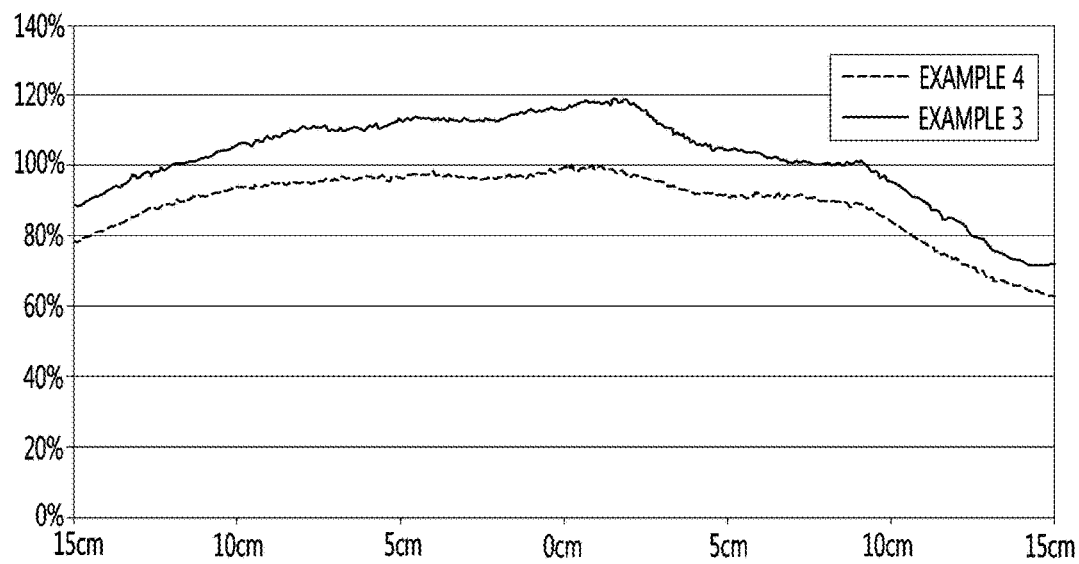
FIG. 72 is a graph illustrating an image uniformity in accordance with a presence of an absorption layer of a circuit board in an optical lens according to an embodiment.

When the width D4 of the optical lens 300 is wider than a width D13 of the circuit board 400, the absorption layers 412 and 414 may be respectively provided at both regions of the recess 315 of the optical lens 300 along a direction in which the optical lens 300 is arranged. The absorption layers 412 and 414 may absorb the partial light L6 reflected to the first light output surface 330 of the optical lens 300. Regions of the absorption layers 412 and 414 may be provided below regions where the amount of the light reflected to the first light output surface 330 is the maximum. The regions of the absorption layers 412 and 414 may be provided while having the same radius D12 from the center P0 of the bottom of the central axis Y0. As shown in FIG. 72, since unnecessary light is absorbed in a case of having the absorption layers on the circuit board 400 (Example 3) compared to a case of not having the absorption layers (Example 4), optical uniformity is improved in Example 3.

Referring to FIGS. 20 and 21, a plurality of supporting protrusions 350 and 355 may be provided under the bottom surface 310 of the optical lens 300. The plurality of the supporting protrusions 350 and 355 may include a first supporting protrusion 350 and a second supporting protrusion 355. A plurality of the first supporting protrusions 350 may be provided except at the regions of the absorption layers 412 and 414, and may come in contact with the upper surface of the circuit board 400. Two or more first supporting protrusions 350 may be provided to support the optical lens 300 on the circuit board 400. The second supporting protrusions 355 may protrude upward past the first supporting protrusions 350. Intervals between the second supporting protrusions 355 may be the same as the width D13 of the circuit board 400 or greater. The circuit board 400 may be fitted between the second supporting protrusions 355. Thus, the second supporting protrusions 355 may be coupled to the outside of the circuit board 400 in a process of coupling the optical lens 300 to prevent the optical lens 300 from being tilted. Two or more second supporting protrusions 355 may be provided, and may come in contact with both sides of the circuit board 400. A radius of each of the second supporting protrusions 355 may be greater than a radius of each of the first supporting protrusions 350.

Figure 22:
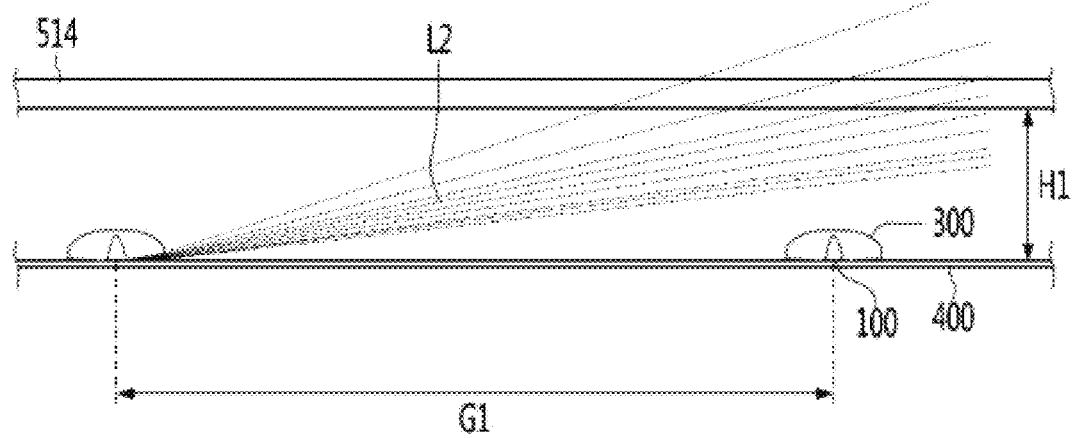
FIG. 22 is a side cross-sectional view illustrating a light unit having an optical lens according to an embodiment.

FIG. 22 is a side cross-sectional view illustrating a light unit having the optical lens according to an embodiment. Referring to FIG. 22, an interval G1 between optical lenses 300 provided within each circuit board 400 may be narrower than an interval between optical lenses 300 provided in different circuit boards 400. The interval G1 may be in a range of six times to ten times, for example, seven times to nine times, the width D4 of the optical lens 300 illustrated in FIG. 21. The interval G1 between the optical lenses 300 may prevent optical interference between the adjacent optical lenses 300. The width D4 of the optical lens 300 may be 15 mm or greater, for example, in a range of 16 mm to 20 mm. When the width D4 of the optical lens 300 is narrower than the above range, a number of optical lenses within the light unit may increase and dark portions may be generated at regions between the optical lenses 300. When the width D4 of the optical lens 300 is wider than the above range, the number of optical lenses within the light unit decreases, but a luminance of each optical lens may decrease. As the luminance distribution by the optical lens 300 is improved, a distance H1 between the circuit board 400 and an optical sheet 514 may be reduced. Also, the number of optical lenses 300 provided within a backlight unit may decrease.

Figure 23:
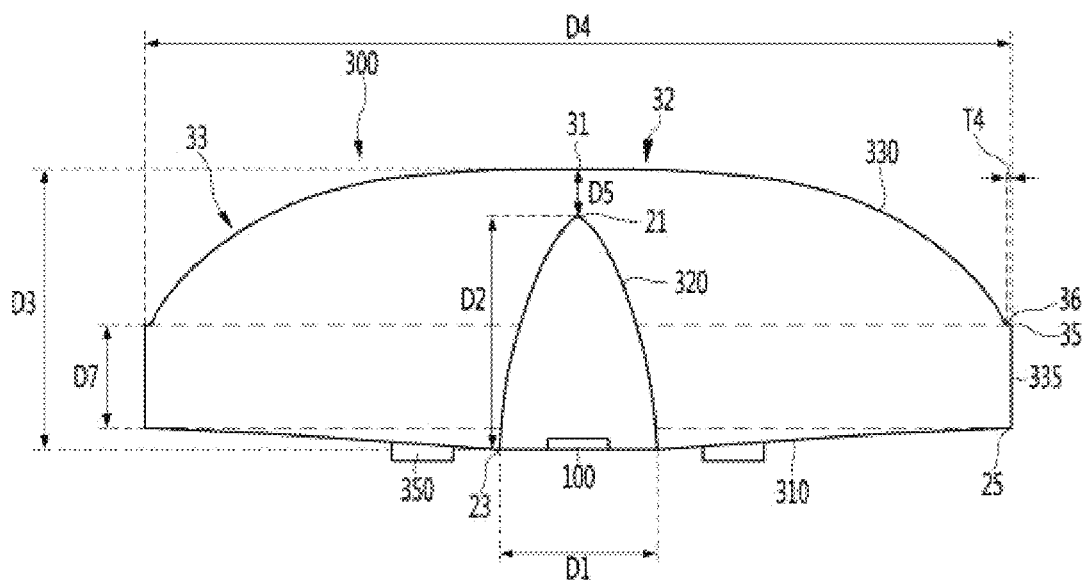
FIG. 23 is a view illustrating an optical lens according to another embodiment.
Figure 24:
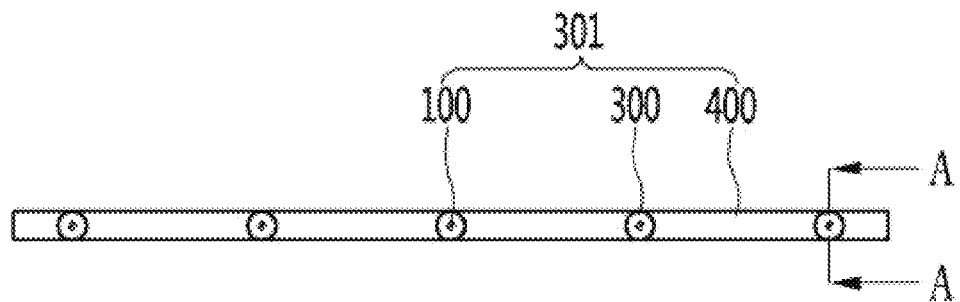
FIG. 24 is a plan view of a light emitting module having the optical lens of FIG. 23.
Figure 25:
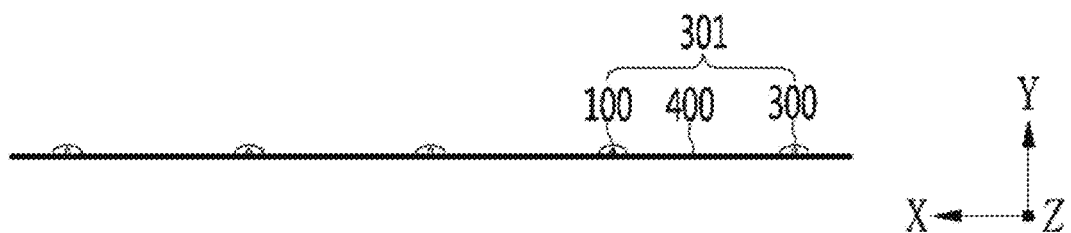
FIG. 25 is a side cross-sectional view of the light emitting module of FIG. 24.
Figure 26:
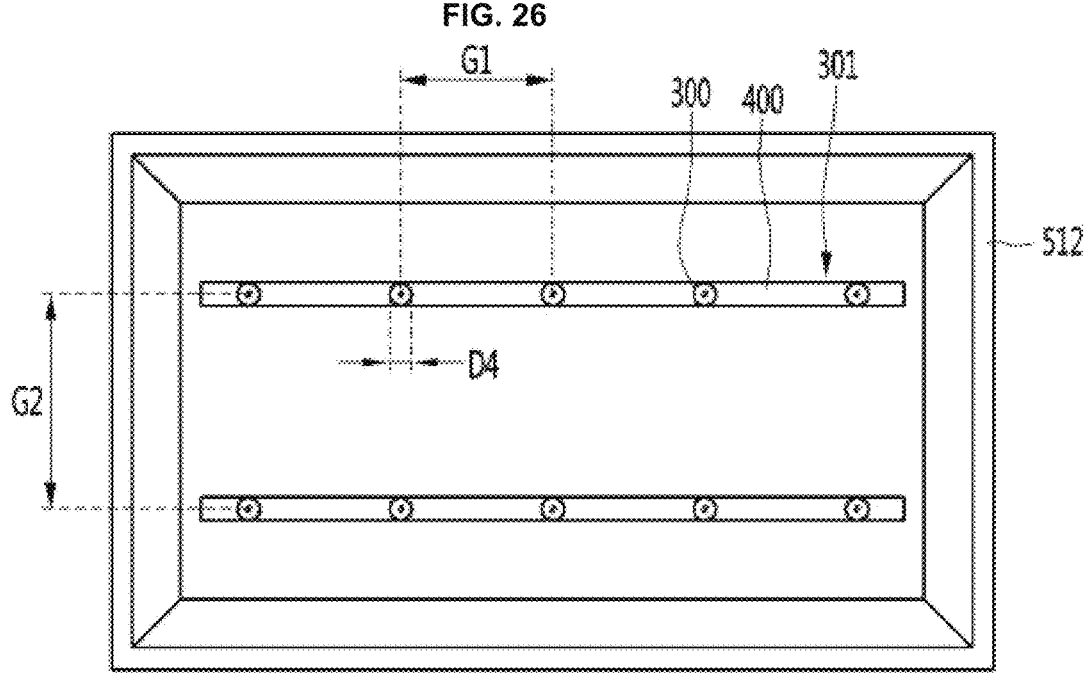
FIG. 26 is a view of a backlight unit on which the light emitting module of FIG. 24 is mounted.
Figure 27:
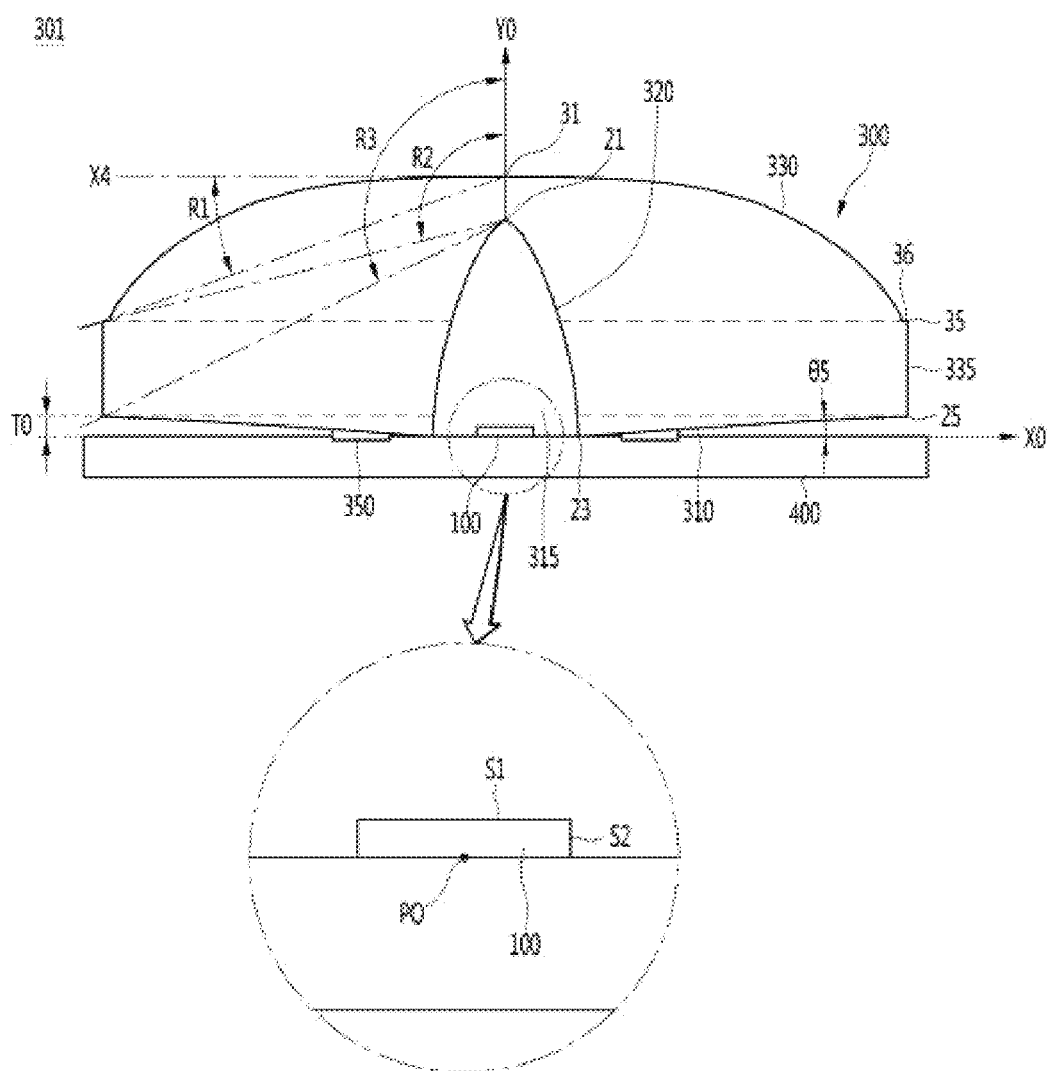
FIG. 27 is a cross-sectional view taken along line A-A of the light emitting module of FIG. 24.

FIG. 23 is another example of the second light output surface of the optical lens of FIG. 1. FIG. 24 is a light emitting module having the optical lens of FIG. 23. FIG. 25 is a side cross-sectional view of the light emitting module of FIG. 24. FIG. 26 is a view illustrating a light unit having the light emitting module of FIG. 24. FIG. 27 is a cross-sectional view taken along line A-A of the light emitting module of FIG. 24.

Referring to FIG. 23, the optical lens 300 may include the bottom surface 310, the recess 315 upwardly convex from the bottom surface 310 at the central region of the bottom surface 310, the light input surface 320 at the circumference of the recess 315, the first light output surface 330 provided at opposite sides of the bottom surface 310 and the light input surface 320, and the second light output surface 335 provided at the lower circumference of the first light output surface 330. The recess 315, the light input surface 320, and the first light output surface 330 of the optical lens 300 may be referenced to the description of the embodiment disclosed above.

The second light output surface 335 may include a stepped structure 36 from a lower edge of the first light output surface 330. The stepped structure 36 may include a flat surface or an inclined surface horizontally extending outward from the lower edge of the first light output surface 330. The flat surface of the stepped structure 36 may be another flat surface between the first light output surface 330 and the second light output surface 335, which may be, for example, 90° or greater with respect to the central axis Y0. A width T4 of the stepped structure 36 may be 150 μm or less, for example, in a range of 50 μm to 150 μm. The stepped structure 36 may have a ring shape of the predetermined width T4 when viewed from the top. The width T4 of the stepped structure 36 may be provided in a protruding shape within an error range of the width of the optical lens 300. Flat upper and lower surfaces of the stepped structure 36 may reflect incident light to the second light output surface 335. When the upper and lower surfaces of the stepped structure 36 have greater widths than the above range, light distribution may be affected, and controlling the light distribution may be difficult.

Referring to FIGS. 24 to 26, the light emitting module 301 may include the light emitting device 100, the optical lens 300 provided on the light emitting device 100, and the circuit board 400 provided below the light emitting device 100. In the light emitting module 301, a plurality of optical lenses 300 may be arranged on the circuit board 400 in predetermined intervals, and the light emitting device 100 may be provided between the optical lens 300 and the circuit board 400.

The light emitting device 100 may emit light through the upper surface S1 and the plurality of side surfaces S2, and may have, for example, five or more light emitting surfaces. The light emitted through the upper surface S1 and the plurality of side surfaces S2 of the light emitting device 100 may be incident on the light input surface 320 of the optical lens 300, and the light incident on the light input surface 320 may be refracted and extracted through the first and second light output surfaces 330 and 335. As the light emitting device 100 provides five or more light emitting surfaces, the beam spread angle distribution may be 130° or greater, for example, 136° or greater. As the beam spread angle distribution of the light emitting device 100 is 136° or greater, light of a predetermined intensity that is emitted through each side surface S2 of the light emitting device 100 may pass through the light input surface 320 of the optical lens 300 and be emitted through the second light output surface 335.

Figure 73A:
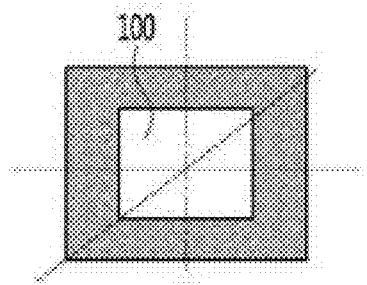
FIG. 73A is a plan view of a light emitting device according to an embodiment.
Figure 73B:
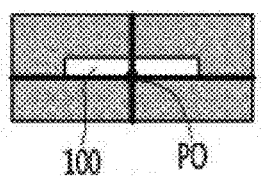
FIG. 73B is a view of a reference point of the light emitting device.
Figure 73C:
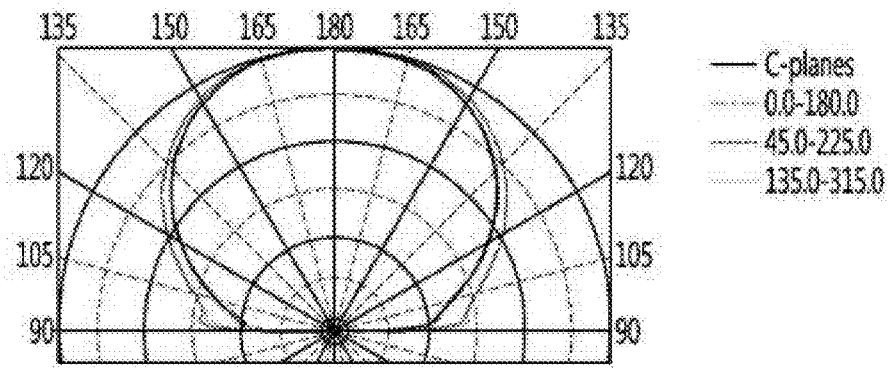
FIG. 73C is a graph illustrating a beam spread angle distribution for each direction on a plane of the light emitting device.
Figure 73D:
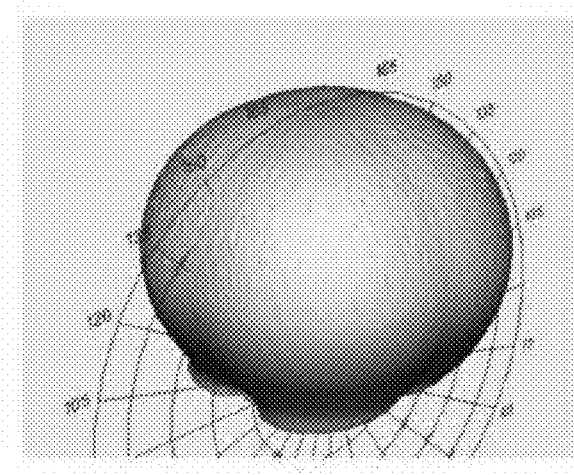
FIG. 73D is a view illustrating the beam spread angle distribution of FIG. 73C as a three-dimensional image.

The light emitting device 100 may provide, for example, a beam spread angle distribution such as in FIG. 73C. FIG. 73A is a plan view of a light emitting device according to an embodiment, FIG. 73B is a view of a reference point of the light emitting device, FIG. 73C is a graph illustrating a beam spread angle distribution for each direction on a flat surface of the light emitting device, and FIG. 73D is a view illustrating the beam spread angle distribution of FIG. 73C as a three-dimensional image.

In FIG. 73A, the light emitting device may emit light through the upper surface and the plurality of side surfaces. Beam spread angle distributions of each direction, for example, a horizontal direction, a vertical direction, and a diagonal direction, may be detected as shown in FIG. 73C. In FIG. 73A and FIG. 73C, the vertical direction may represent the beam spread angle distribution of a C-plane. In FIG. 73C, when viewing the beam spread angle distribution of light for each direction, the half-value angle is shown as 65° or greater, for example, 68° or greater.

The first and second light output surfaces 330 and 335 of the optical lens 300 may refract and emit the incident light. The second light output surface 335 may refract the light such that an angle of extracted light after the refraction is smaller than an angle of incident light before the refraction with respect to the central axis Y0. Thus, a light interference distance between adjacent optical lenses 300 may be long, and colors of partial light output through the second light output surface 335 and light output to the first light output surface 330 may be mixed around the optical lens 300. The interval G1 between optical lenses 300 provided within each circuit board 400 may be narrower than an interval G2 between optical lenses 300 provided in different circuit boards 400. The interval G1 may be in a range of six times to ten times, for example, seven times to nine times, the width D4 of the optical lens 300. The interval G2 may be in a range of nine times to eleven times, for example, 9.5 times to 10.5 times, the width D4 of the optical lens 300. The width D4 of the optical lens 300 may be 15 mm or greater. The optical interference distance, for example, the intervals G1 and G2, between the optical lenses 300 may remain at least six times the width D4 of the optical lens 300.

In FIG. 26, a plurality of circuit boards 400 of the light emitting module 301 may be arranged within a bottom cover 512. The circuit boards 400 may include absorption layers electrically connected to the light emitting devices 100.

Referring to FIGS. 23 and 27, in the light emitting module 301, the center P0 of the bottom of the recess 315 at which the central axis Y0 and the center of the light emitting device 100 intersect may be provided lower than the upper surface S1 of the light emitting device 100. The center P0 of the bottom of the recess 315 may become a reference point of the optical lens 300 or the center of the light emitting device 100. The center P0 of the bottom of the recess 315 may be a point at which the center of the upper surface S1 and the center of the plurality of side surfaces S2 of the light emitting device 100 intersect or be a point at which the center of the upper surface S1 and the lower center of each of the side surfaces S2 intersect. The center P0 of the bottom of the recess 315 may be an intersection point at which the central axis Y0 and the light output from the light emitting device 100 intersect. The center P0 of the bottom of the recess 315 may be provided on the same horizontal line with the low point of the optical lens 300 or be provided higher.

In the optical lens 300, the first edge 23 of the bottom surface 310 may be the lowest point of the optical lens 300, and may be the lowest in the region except the supporting protrusions 350. The circuit board 400 may be provided more adjacent to the first edge 23 than the second edge 25 of the bottom surface 310 of the optical lens 300. The first edge 23 of the bottom surface 310 may come in contact with the upper surface of the circuit board 400, and the second edge 25 may be the predetermined interval T0 apart from the upper surface of the circuit board 400. Thus, the light emitted to the side surfaces S2 of the light emitting device 100 may be incident on the light input surface 32 without leakage. The interval T0 may be the same or thinner than a thickness of a reflective sheet to be described below, but is not limited thereto.

The bottom surface 310 of the optical lens 300 may be formed of an inclined surface from the first edge 23 to the second edge 25 with respect to the horizontal first axis X0. The inclined angle θ5 of the bottom surface 310 may be within 5°, e.g. in a range of 0.5° to 4°. As the bottom surface 310 is formed with the surface having the inclined angle θ5, the bottom surface 310 may reflect partial light emitted to the side surfaces of the light emitting device 100. The bottom surface 310 of the optical lens 300 may include at least one or a plurality of concave portions, but is not limited thereto. The optical lens 300 may include the supporting protrusions 350 provided at a lower portion thereof. The supporting protrusions 350 may protrude downward, for example, toward the circuit board 400, from the bottom surface 310 of the optical lens 300. The plurality of the supporting protrusions 350 may be fixed on the circuit board 400, thereby preventing the optical lens 300 from being tilted.

Figure 28:
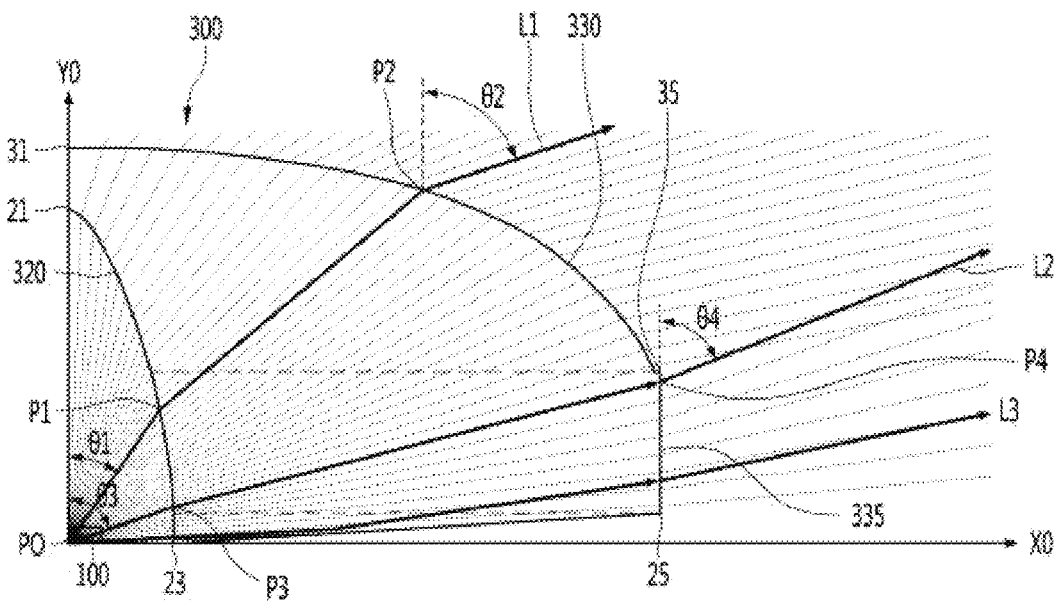
FIG. 28 is a view illustrating a relation between a light input surface and output angles of first and second light output surfaces in the optical lens of FIG. 27.

Referring to FIG. 28, out of the light emitted from the light emitting device 100, the first light L1 incident on the first point P1 of the light input surface 320 of the optical lens 300 may be refracted and emitted to the predetermined second point P2 of the first light output surface 330. Also, out of the light emitted from the light emitting device 100, the second light L2 incident on the third point P3 of the light input surface 320 may be emitted to the predetermined fourth point P4 of the second light output surface 335.

The incidence angle of the first light L1 incident on the first point P1 of the light input surface 320 may be defined as the first angle $\theta 1$ with respect to the central axis Y0, and the emission angle of the first light L1 emitted to any second point P2 of the first light output surface 330 may be defined as the second angle $\theta 2$ with respect to the central axis Y0. The incidence angle of the second light L2 incident on the third point P3 of the light input surface 320 may be defined as the third angle $\theta 3$ with respect to the central axis Y0, and the emission angle of the second light L2 emitted to any fourth point P4 of the second light output surface 335 may be defined as the fourth angle $\theta 4$ with respect to the central axis Y0. The second light L2 may be light emitted to the side surfaces of the light emitting device 100.

The second angle $\theta 2$ may be greater than the first angle $\theta 1$. The second angle $\theta 2$ may gradually increase as the first angle $\theta 1$ gradually increases, and gradually decrease as the first angle $\theta 1$ gradually decreases. Also, the first and second angles $\theta 1$ and $\theta 2$ may satisfy a condition of $\theta 2 > \theta 1$ or $1 < (\theta 2/\theta 1)$. The second angle $\theta 2$ of the first light output surface 330 may be the emission angle after the refraction, and may be greater than the incidence angle before the refraction. The fourth angle $\theta 4$ may be smaller than the third angle $\theta 3$. The fourth angle $\theta 4$ may increase as the third angle $\theta 3$ increases, and the fourth angle $\theta 4$ may decrease as the third angle $\theta 3$ decreases. Also, the third and fourth angles $\theta 3$ and $\theta 4$ may satisfy a condition of $\theta 4 < \theta 3$ or $1 > (\theta 4/\theta 3)$. The fourth angle $\theta 4$ of the second light output surface 335 may be the emission angle after the refraction, and may be smaller than the incidence angle before the refraction.

The third edge 35 of the second light output surface 335 may be provided above the angle in which light having the beam spread angle distribution of the light emitting device 100 is refracted with respect to the central axis Y0. For example, the angle between the central axis Y0 and the straight line connecting the center P0 of the bottom of the recess 315 to the third edge 35 may be smaller than a refraction angle of light passing through the ½ point of the beam spread angle of the light emitting device 100. Thus, out of the light emitted from the light emitting device 100, the light radiated to regions adjacent to the beam spread angle may be controlled to be emitted through the second light output surfaces 335. In this case, colors of the second light L2 emitted to the second light output surface 335 and the light traveling to the first light output surface 330 may be mixed.

Figure 29:
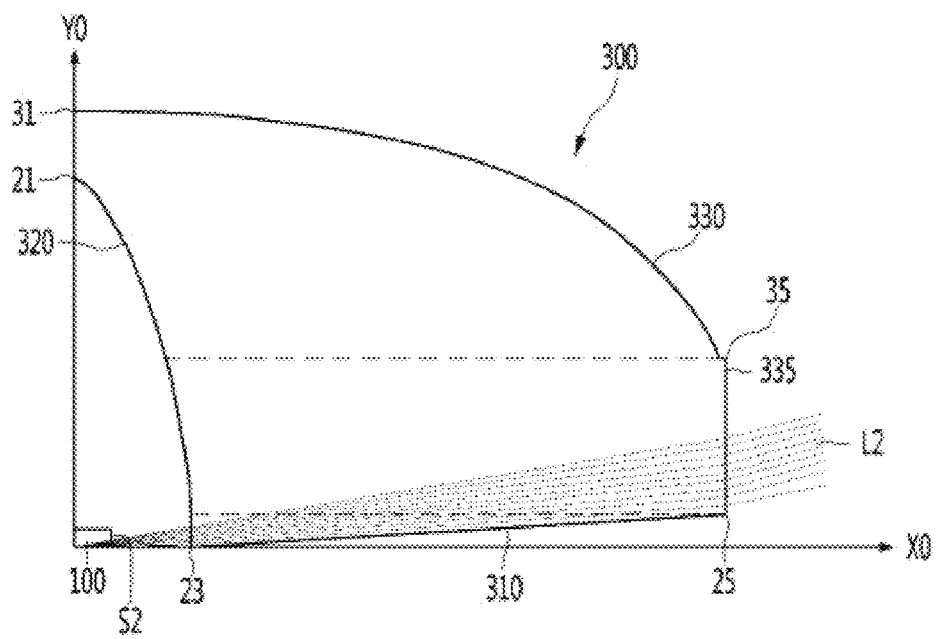
FIG. 29 is a view illustrating a distribution of light output to the second light output surface of the optical lens of FIG. 28.

Out of the light emitted from the light emitting device 100, the light L3 incident on the bottom surface 310 of the optical lens 300 may be reflected and incident on the second light output surface 335. The second light output surface 335 may emit light such that the emission angle is smaller than the incidence angle of the light incident after being reflected from the bottom surface 310. As in FIG. 29, out of the light emitted to the side surfaces S2 of the light emitting device 100, the second light L2 emitted through the second light output surface 335 may be emitted such that the emission angle is smaller than the incidence angle.

Figure 30:
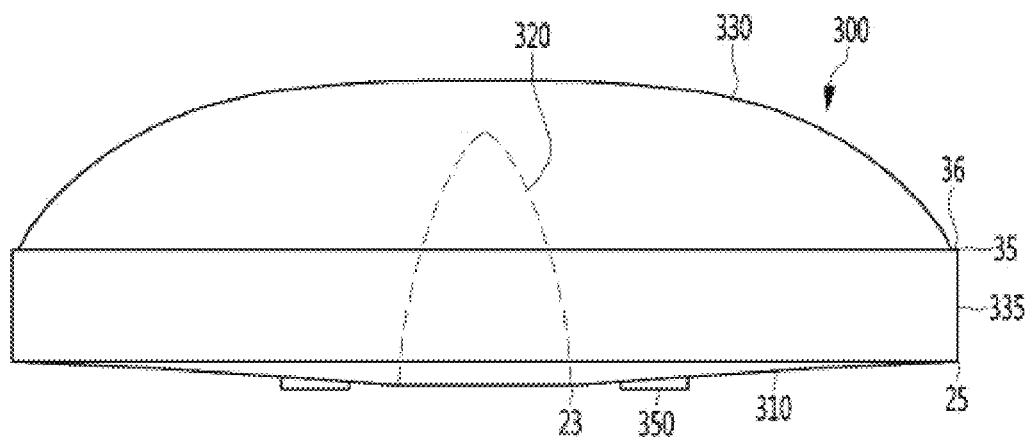
FIG. 30 is a side view of the light emitting device of FIG. 23.
Figure 31:
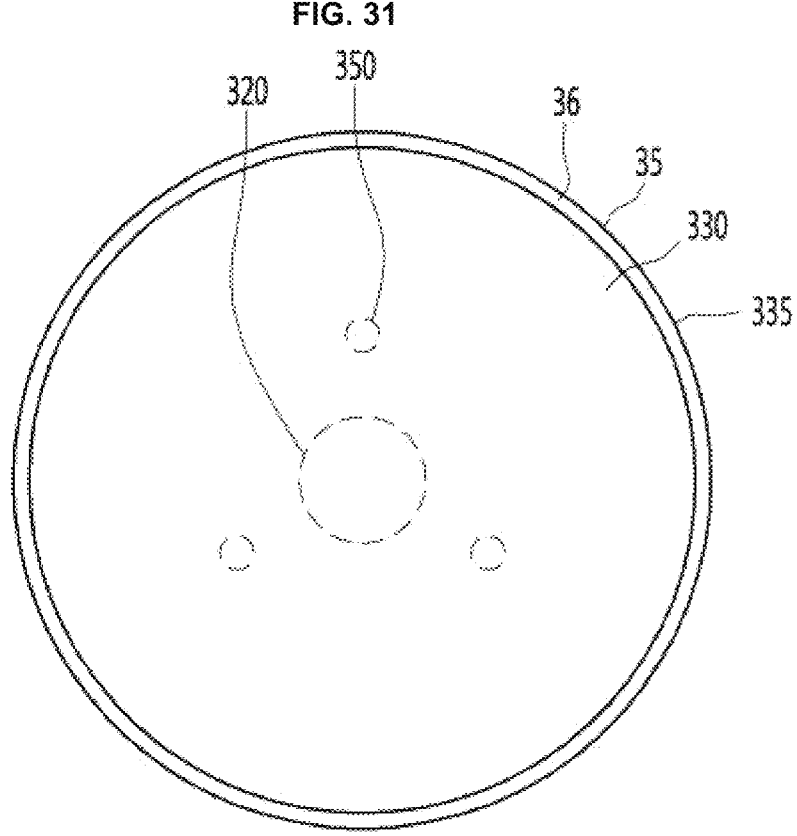
FIG. 31 is a plan view of the light emitting device of FIG. 23.
Figure 32:
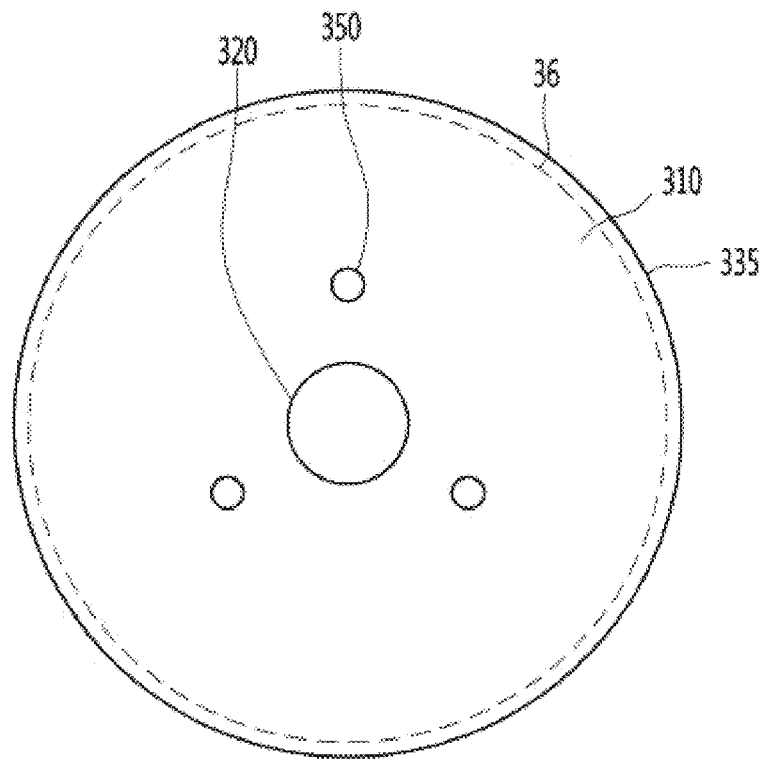
FIG. 32 is a bottom view of the light emitting device of FIG. 23.

FIG. 30 is a side view of the optical lens of FIG. 23, FIG. 31 is a plan view of the optical lens of FIG. 23, and FIG. 32 is a bottom view of the optical lens of FIG. 23. Referring to FIGS. 30 to 32, in the optical lens 300, the second light output surface 335 may be provided at the lower circumference of the first light output surface 330, and the bottom surface 310 may be provided below the second light output surface 335. The bottom surface 310 may be provided lower than the second edge 25 of the second light output surface 335. The bottom surface 310 may protrude downward past the horizontally extending line of the second edge 25 of the second light output surface 335. The second light output surface 335 may protrude outward past the outside of the first light output surface 330. The plurality of the supporting protrusions 350 provided at the bottom surface 310 of the optical lens 300 may be protrusions that support the optical lens 300. The plurality of the supporting protrusions 350 may be provided at an angle of 60° or greater, for example, 90° or greater, with respect to the center of the lens, but the positions of the plurality of the supporting protrusions 350 are not limited thereto.

Figure 33:
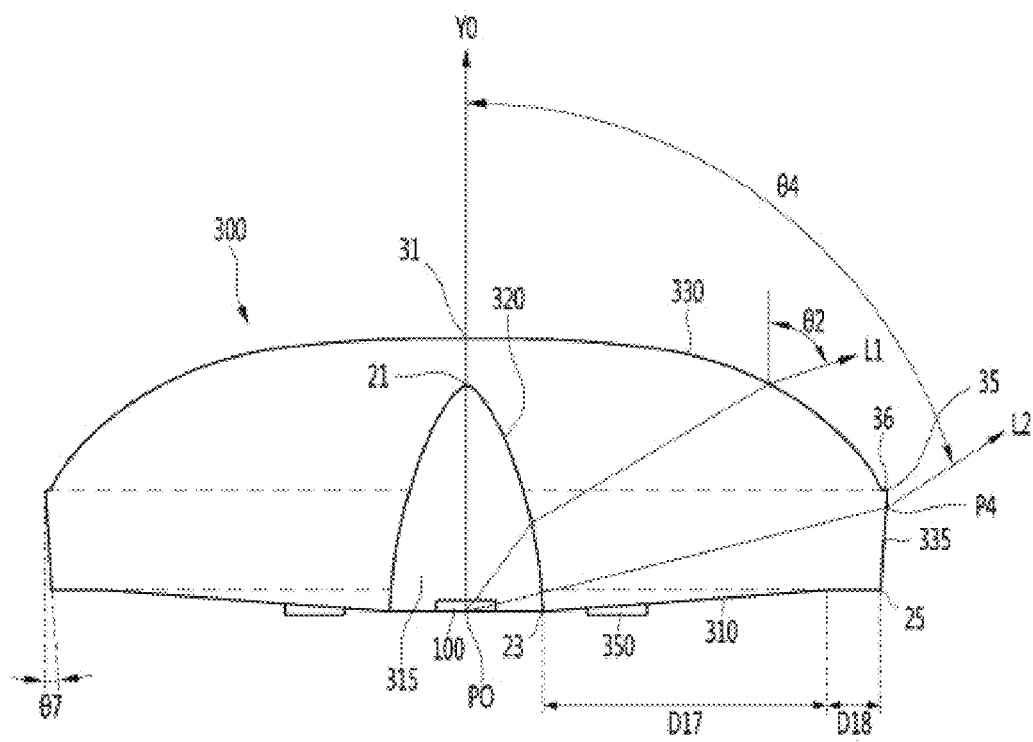
FIG. 33 is a side cross-sectional view of a second light output surface of an optical lens according to another embodiment.

FIG. 33 is a view illustrating a second light output surface and a bottom surface of an optical lens according to an embodiment. In describing FIG. 33, characteristics that are the same as the above disclosed configurations have been be omitted. Referring to FIG. 33, the second light output surface 335 of the optical lens 300 may be provided at a slant in a predetermined angle $\theta 7$ with respect to a vertical shaft. A distance of a straight line between the second edges 25 of the second light output surface 335 may be shorter than a distance of a straight line between the third edges 35. The angle of light emitted to the second light output surface 335, for example, the fourth angle $\theta 4$, may be smaller than the incidence angle before the refraction.

Figure 74:
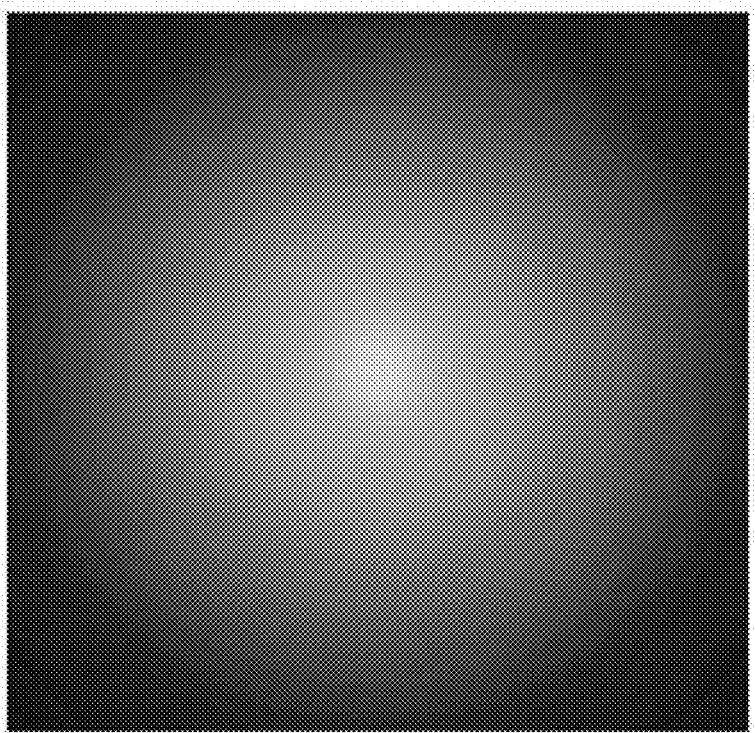
FIG. 74 is a view illustrating a luminance distribution of a light emitting module having the optical lens of FIG. 27.

The bottom surface 310 of the optical lens 300 may include, for example, the first region D17 having an inclined surface and the second region D18 having a horizontal surface. The first region D17 may be inclined from the first edge 23, and the second region D18 may be provided between the first region D17 and the second edge 25. A width of the first region D17 may be greater than a width of the second region D18. The supporting protrusions 350 may be provided on the first region D17. A ratio between the lengths of the first region D17 and the second region D18 may be 6:4 to 9:1. The first region D17 may be provided lower than the horizontally extending line of the second edge 25 to correspond to the side surfaces of the light emitting device 100, and the second region D18 may be provided on the same line as the horizontally extending line of the second edge 25. As the section of the first region D17 is wider, the hot spot phenomenon at the central portion of the optical lens 300 may be reduced. The luminance distribution of light illustrated in FIG. 74 is a case of providing an optical lens having a bottom surface with an inclined surface instead of a horizontal surface, and it can be seen that the hot spot phenomenon at the central portion is improved.

Figure 34:
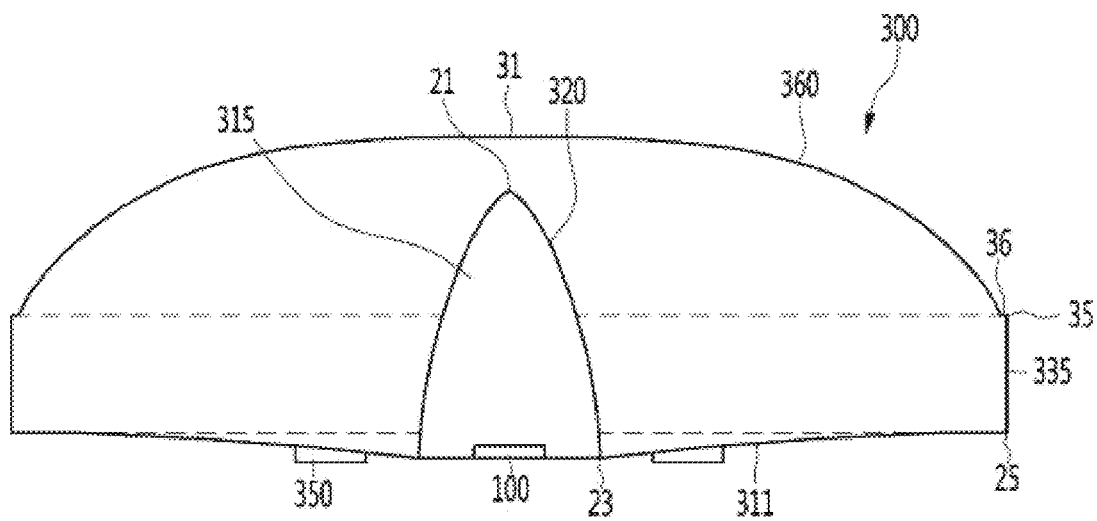
FIG. 34 is a side cross-sectional view of a bottom surface of an optical lens according to another embodiment.
Figure 35:
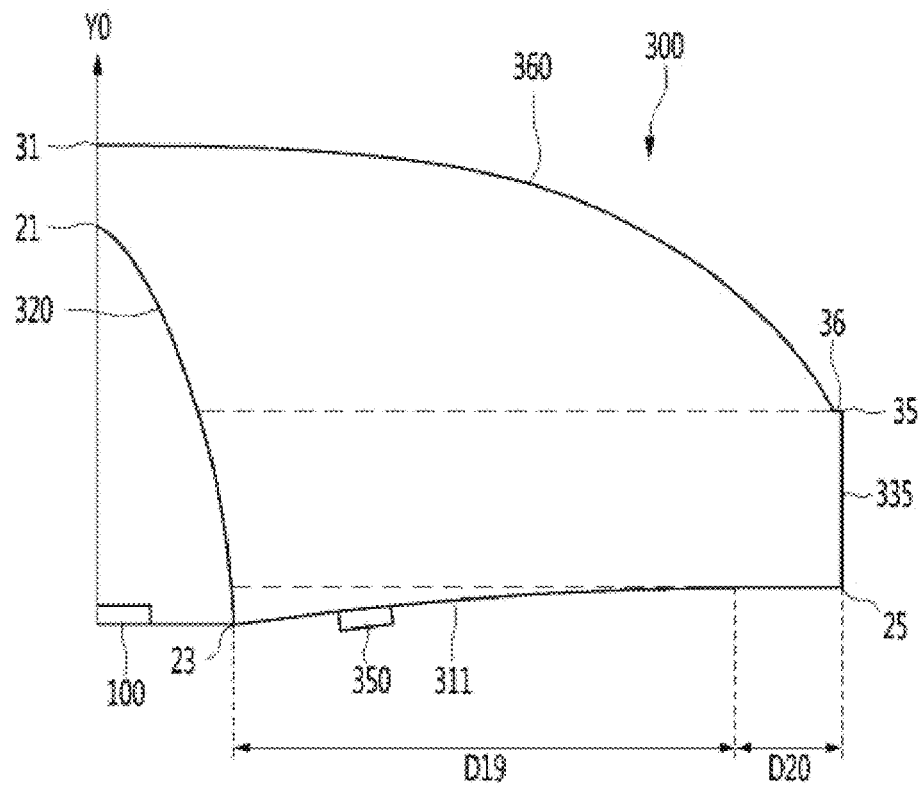
FIG. 35 is a partially enlarged view of the optical lens of FIG. 34.

FIG. 34 is a view of a bottom surface of an optical lens according to an embodiment, and FIG. 35 is a partially enlarged view of the optical lens of FIG. 34. In describing FIGS. 34 and 35, configurations that are the same as the embodiments disclosed above may be referenced to the description of the above-disclosed embodiments. Referring to FIGS. 34 and 35, a bottom surface 311 of the optical lens 300 may include a first region D19 having a curved surface and a second region D20 having a horizontal surface. The first region D19 may have a curvature that is upwardly convex from the first edge 23. That is, the curved surface of the bottom surface 311 may be upwardly concave with respect to the horizontally extending line, and may have, for example, a radius of curvature in a range of 65 mm to 75 mm. That is, the first region D19 may have a negative curvature. The second region D20 may be provided between the first region D19 and the second edge 25. A width of the first region D19 may be wider than a width of the second region D20. A ratio between the lengths of the first region D19 and the second region D20 may be 6:4 to 9:1. As the width of the first region D19 is wider, the hot spot phenomenon at the central portion of the optical lens 300 may be further reduced.

Figure 75:
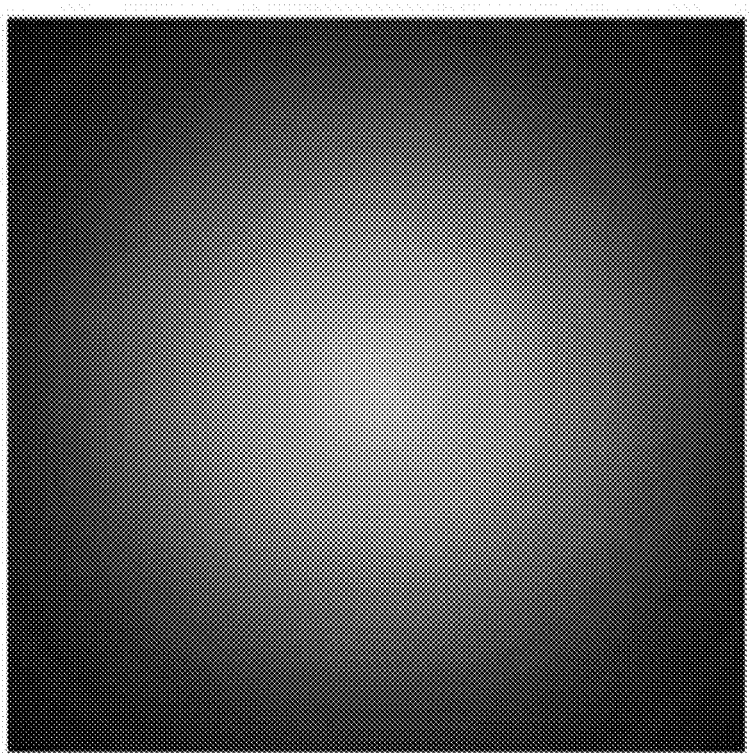
FIG. 75 is a view illustrating a luminance distribution of a light emitting module having the optical lens of FIG. 34.

Out of the bottom surface 311, the first region D19, which is a curved section, may be provided adjacent to the light input surface 320, and the second region D20, which is a flat section, may be provided adjacent to the second edge 25. The curved surface and the flat surface may be provided above the line segment straightly connecting the first edge 23 to the second edge 25. The first region D19 may be provided lower than the horizontally extending line of the second edge 25, and the second region D20 may be provided on the same line as the horizontally extending line of the second edge 25. The supporting protrusions 350 may protrude from the first region D19 to support the optical lens 300. The first region D19 of the bottom surface 311 may refract the light emitted from the light emitting device 100 in another direction, thereby changing the luminance distribution by the first and second light output surfaces 330 and 350. The luminance distribution of light illustrated in FIG. 75 is a case illustrating the luminance distribution of the optical lens having the bottom surface with the curved region, and the hot spot phenomenon at the central portion may be improved compared to the optical lens having the inclined surface.

Figure 36:
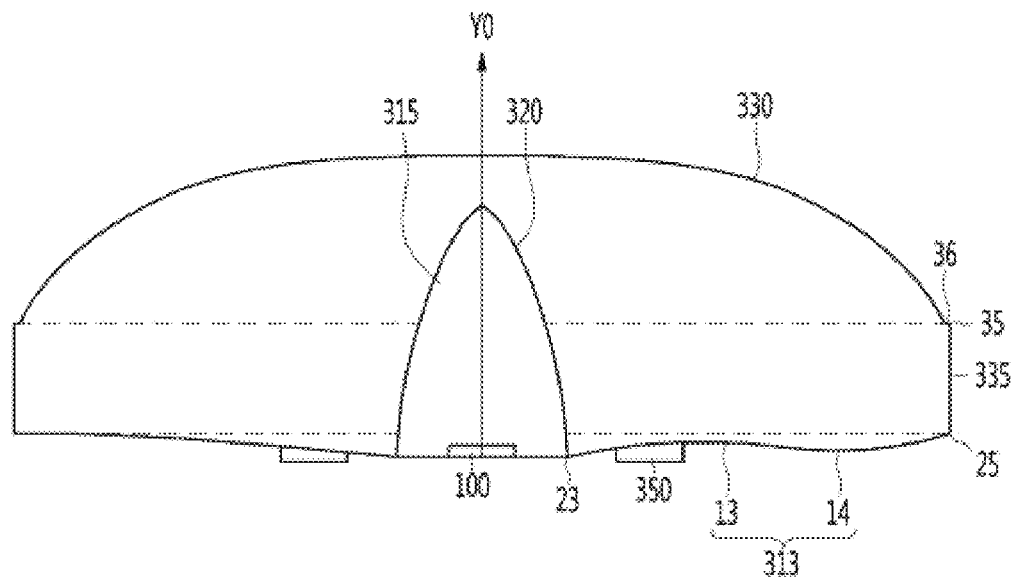
FIG. 36 is a side cross-sectional view of a bottom surface of an optical lens according to another embodiment.
Figure 37:
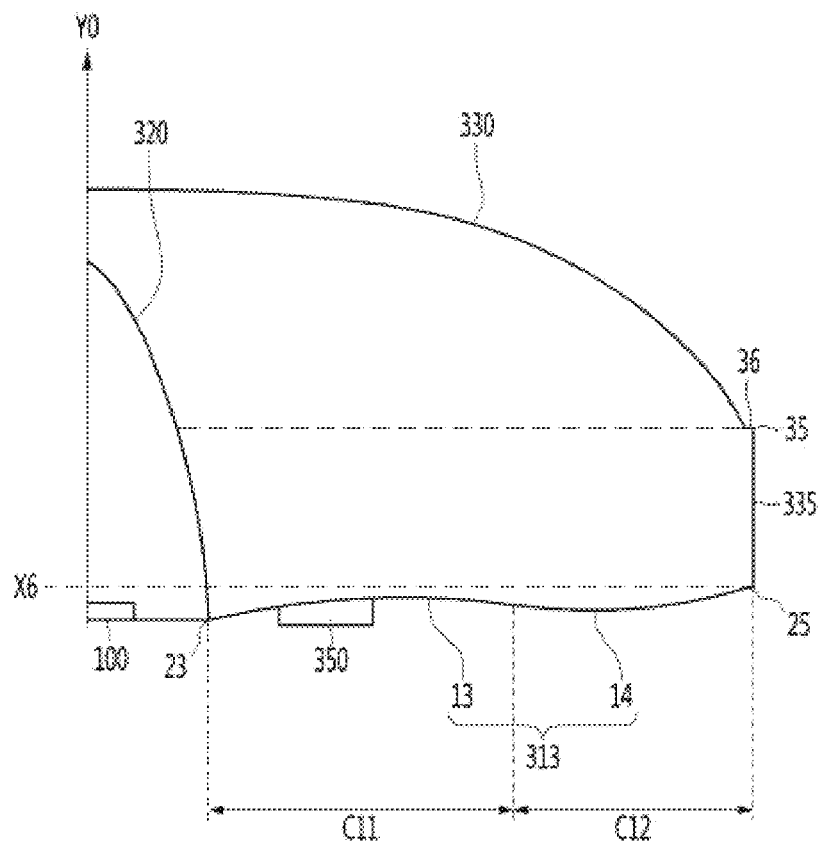
FIG. 37 is a partially enlarged view of the optical lens of FIG. 36.

FIG. 36 is a side cross-sectional view i of a bottom surface of an optical lens according to an embodiment, and FIG. 37 is a partially enlarged view of the optical lens of FIG. 36. In describing FIGS. 36 and 37, configurations that are the same as the embodiments disclosed above may be referenced to the description of the above-disclosed embodiments. Referring to FIGS. 36 and 37, a bottom surface 313 of the optical lens 300 may include curved surfaces 13 and 14 respectively having a negative curvature and a positive curvature. Of the bottom surface 313, a first curved surface 13 adjacent to the first edge 23 may have the negative curvature, and a second curved surface 14 adjacent to the second edge 25 may have the positive curvature. A high point of the first curved surface 13 may be provided above the upper surface of the light emitting device 100 and may be provided lower than the horizontally extending line of the second edge 25. The first curved surface 13 may totally reflect the light emitted from the side surface of the light emitting device 100, thereby reducing the hot spot phenomenon at the central portion of the optical lens 300 and improving the luminance distribution. When lengths of straight lines of the first curved surface 13 and the second curved surface 14 with respect to an inflection point between the first curved surface 13 and the second curved surface 14 are compared, a length C11 of the straight line of the first curved surface 13 may be longer than a length C12 of the straight line of the second curved surface 14, but embodiments are not limited thereto. The supporting protrusion 350 may protrude from the first curved surface 13 past the second curved surface 14 to support the optical lens 300.

Figure 38:
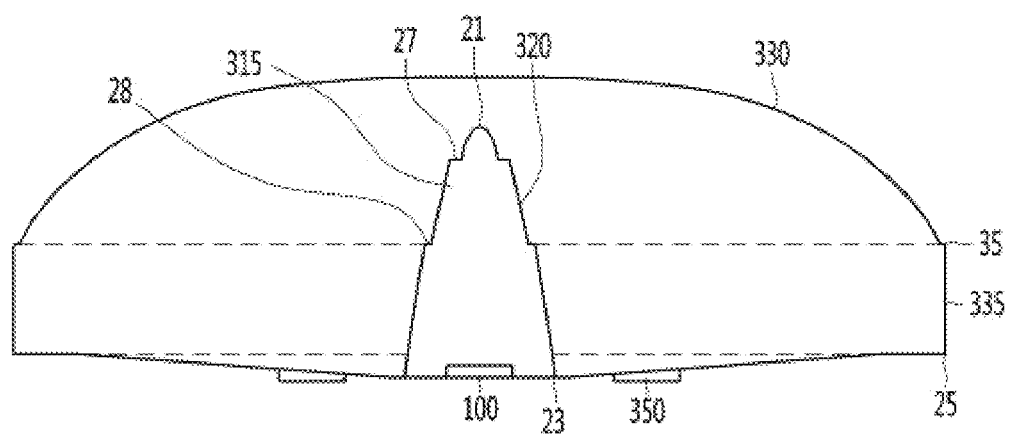
FIG. 38 is a side cross-sectional view illustrating a modified light input surface of an optical lens according to another embodiment.
Figure 39:
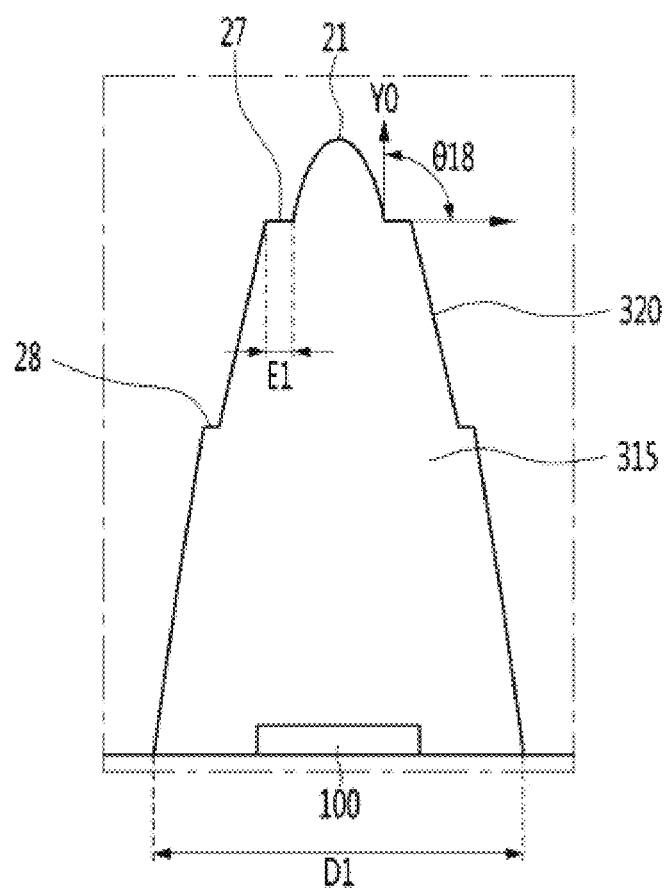
FIG. 39 is a view illustrating the light input surface of the optical lens of FIG. 38.
Figure 40:
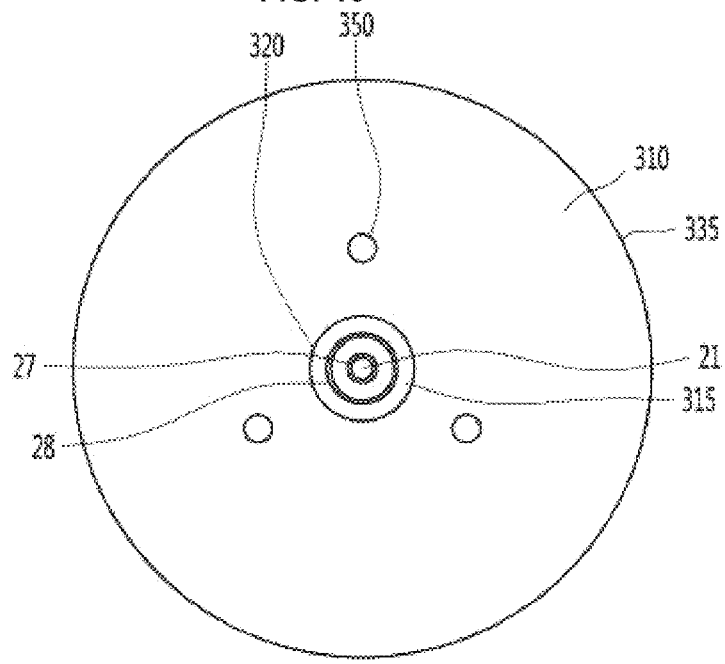
FIG. 40 is a bottom view of the optical lens of FIG. 38.

FIG. 38 is a side cross-sectional view of a light input surface of an optical lens according to an embodiment, FIG. 39 is a partially enlarged view of the optical lens of FIG. 38, and FIG. 40 is a bottom view of the optical lens of FIG. 38. In describing the optical lens according to the embodiment of FIG. 38, configurations that are the same as configurations of the optical lens disclosed in the above embodiments may be referenced to the above-disclosed description. Referring to FIGS. 38 to 40, the optical lens 300 may include the light input surface 320 having the recess 315, the bottom surface 310, and the first and second light output surfaces 330 and 335.

A shape of a side cross section of the light input surface 320 of the optical lens 300 may include a shell shape, a bell shape, or a semi-oval shape. The light input surface 320 may include at least one of flat surfaces 27 and 28. The flat surfaces 27 and 28 may be provided at different heights. The flat surfaces 27 and 28 may be provided at an angle θ18 of 90° or greater, for example, in a range of 90° to 140°, with respect to the central axis Y0. As shown in FIGS. 39 and 40, the flat surfaces 27 and 28 within the light input surface 320 may be formed in a ring shape having predetermined widths E1 when viewed from the bottom. A plurality of the ring-shaped flat surfaces 27 and 28 may be provided at different heights within the light input surface 320, but embodiments are not limited thereto. Diameters of the ring-shaped flat surfaces 27 and 28 may be narrower than the width D1 of the bottom of the recess 315.

Figure 76:
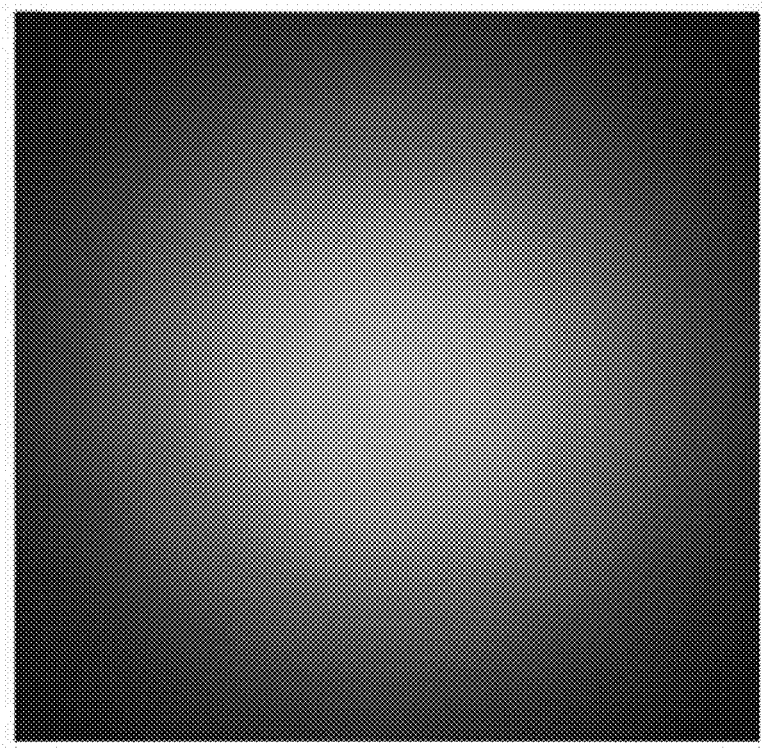
FIG. 76 is a view illustrating a luminance distribution of a light emitting module having the optical lens of FIG. 38.

The flat surfaces 27 and 28 may include a first flat surface 27 adjacent to the first vertex 21 of the light input surface 320, and a second flat surface 28 provided between the first flat surface 27 and the first edge 23. The second flat surface 28 may be provided above a horizontally extending line of the third edge 35 of the second light output surface 335. The widths E1 of the first and second flat surfaces 27 and 28 may be the same or different from each other. The widths E1 of the first and second flat surfaces 27 and 28 may widen as they become farther from the first vertex 221 of the light input surface 320. For example, the width of the second flat surface 28 may be wider than the width of the first flat surface 27. In the optical lens 300, due to the flat surfaces 27 and 28 of the light input surface 320, a plurality of ring shapes that are brighter than surroundings may be shown at a circumference of the central portion of the optical lens in the luminance distribution shown in FIG. 76. Thus, a difference between the luminance distribution at the central portion of the optical lens and the luminance distribution at the surrounding portion thereof may be decreased.

Figure 41:
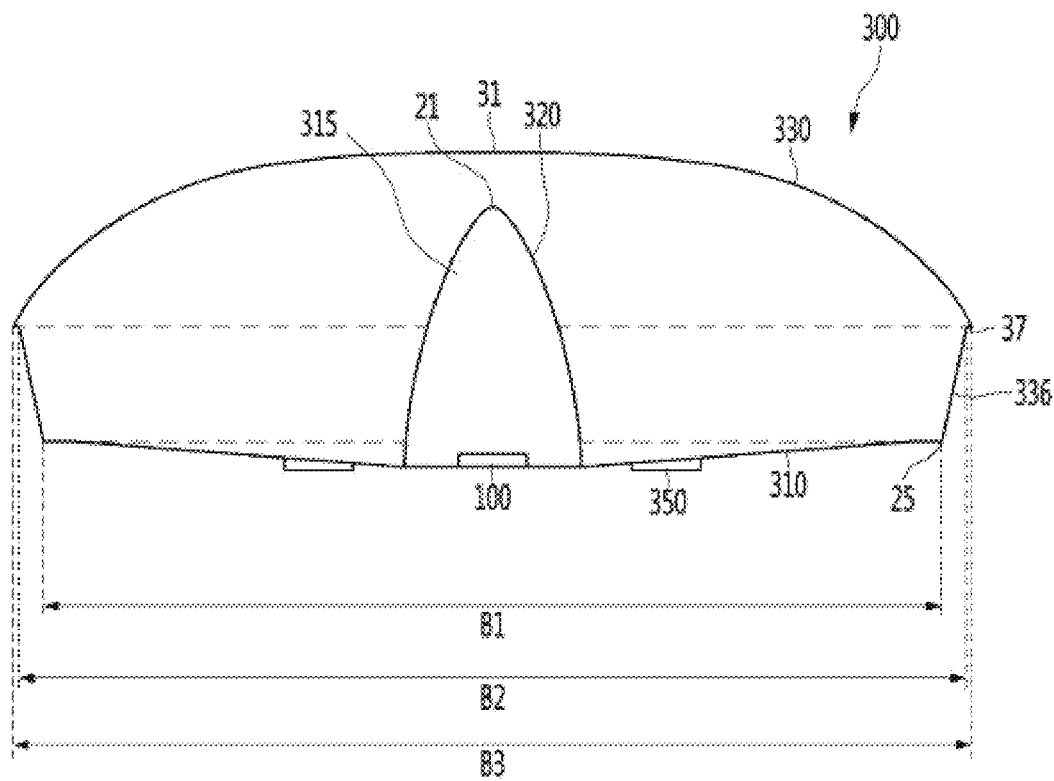
FIG. 41 is a side cross-sectional view illustrating a second light output surface of an optical lens according to another embodiment.

FIG. 41 is a side cross-sectional view illustrating another example of an optical lens according to an embodiment. In describing FIG. 41, configurations that are the same as the above-disclosed embodiments may be referenced to the description of the above-disclosed embodiments. Referring to FIG. 41, the optical lens 300 may include the light input surface 320 having the recess 315, the bottom surface 310, and first and second light output surfaces 330 and 336. The bottom surface 310 of the optical lens 300 may be provided as an inclined surface or a curved surface with respect to the horizontally extending line from the first edge 23 to the second edge 25, but embodiments are not limited thereto.

The second light output surface 336 may extend while having a stepped structure 37 from an outer circumference of the first light output surface 330. The second light output surface 336 may be provided further inward than the lower edge of the first light output surface 330. The second light output surface 336 may be provided as an inclined surface or a vertical surface. When the second light output surface 336 is provided as the inclined surface, a light refraction angle may become greater, and an interference distance between adjacent optical lenses may be long.

A distance B1 of a straight line between the second edges 25 of the bottom surface 310 may be shorter than a distance B3 between lower outer sides of the first light output surface 330. Also, a distance B2 of a straight line between upper edges of the second light output surface 336 may be longer than the distance B1 and shorter than the distance B3, but embodiments are not limited thereto. In the optical lens 300, the second light output surface 336 may be provided further inward than the lower edge of the first light output surface 330, such that a lower width of the optical lens 300 may decrease. Also, the second light output surface 336 may receive partial light emitted from the light emitting device 100 and emit the light. The second light output surface 336 may emit light in an emission angle that is smaller than an incidence angle before the refraction. Thus, the optical interference distance between optical lenses within the light emitting module may also increase.

Figure 42:
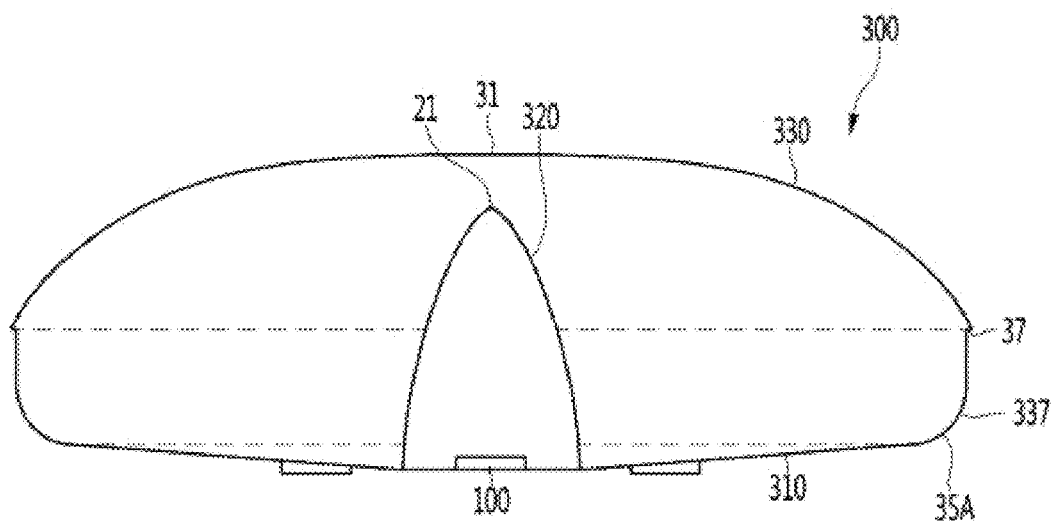
FIG. 42 is a side cross-sectional view illustrating a modified second light output surface and a bottom surface of an optical lens according to another embodiment.

FIG. 42 is a side cross-sectional view illustrating an optical lens according to an embodiment. In describing FIG. 42, configurations that are the same as the above-disclosed embodiments may be referenced to the description of the above-disclosed embodiments. Referring to FIG. 42, the optical lens 300 may include the bottom surface 310 provided at the lower circumference of the recess 315, the light input surface 320 having the recess 315, and first and second light output surfaces 330 and 337. The bottom surface 310 of the optical lens 300 may be provided as an inclined surface or a curved surface with respect to the horizontally extending line from the first edge 23, but embodiments are not limited thereto.

The second light output surface 337 may extend while having a stepped structure 37 from the outer circumference of the first light output surface 330. The second light output surface 337 may be provided more inward than the lower edge of the first light output surface 330. The second light output surface 337 may be provided as an inclined surface or a vertical surface. The second light output surface 337 may be provided more inside or inward than a line perpendicular to the outermost portion of the first light output surface 330.

A boundary portion 35A between the bottom surface 310 and the second light output surface 337 may be processed as a rounded curved surface. As the boundary portion 35A is processed as a curved surface, the light emitted from the light emitting device 100 may be prevented from interfering with another optical lens.

Figure 43:
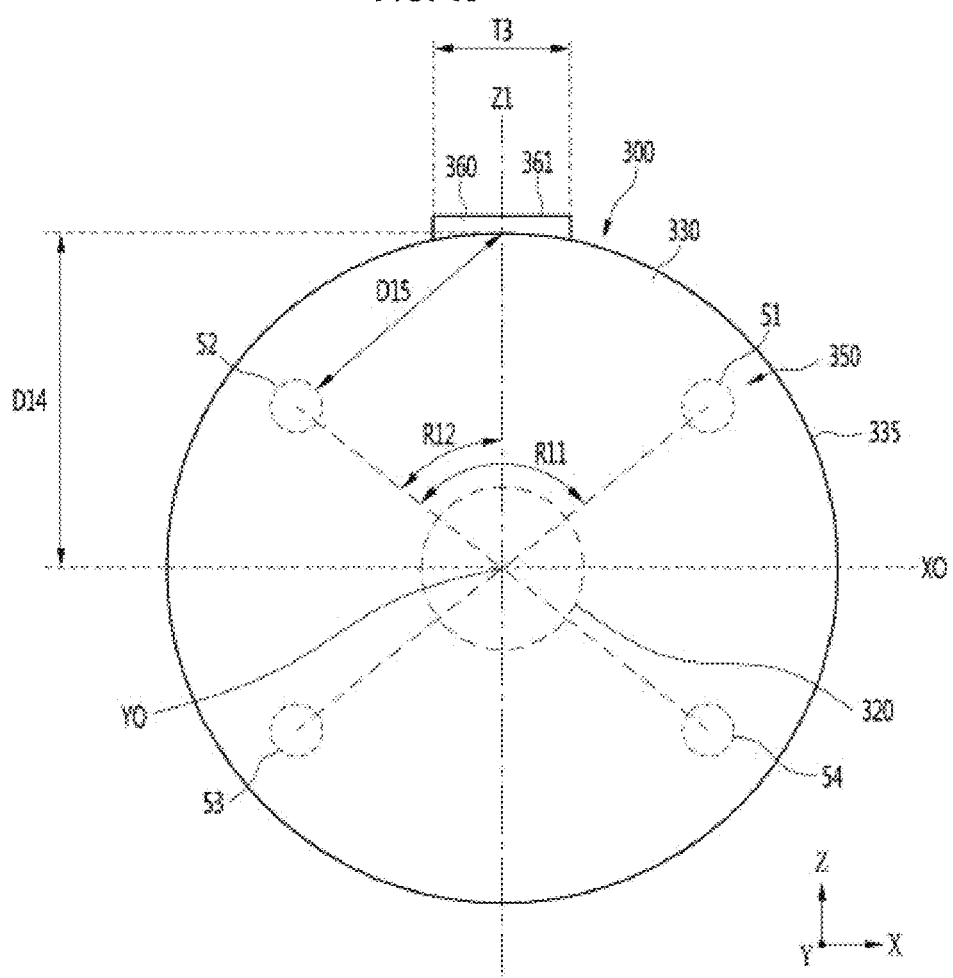
FIG. 43 is a plan view in which a side protruding portion is provided at an optical lens according to an embodiment.
Figure 44:
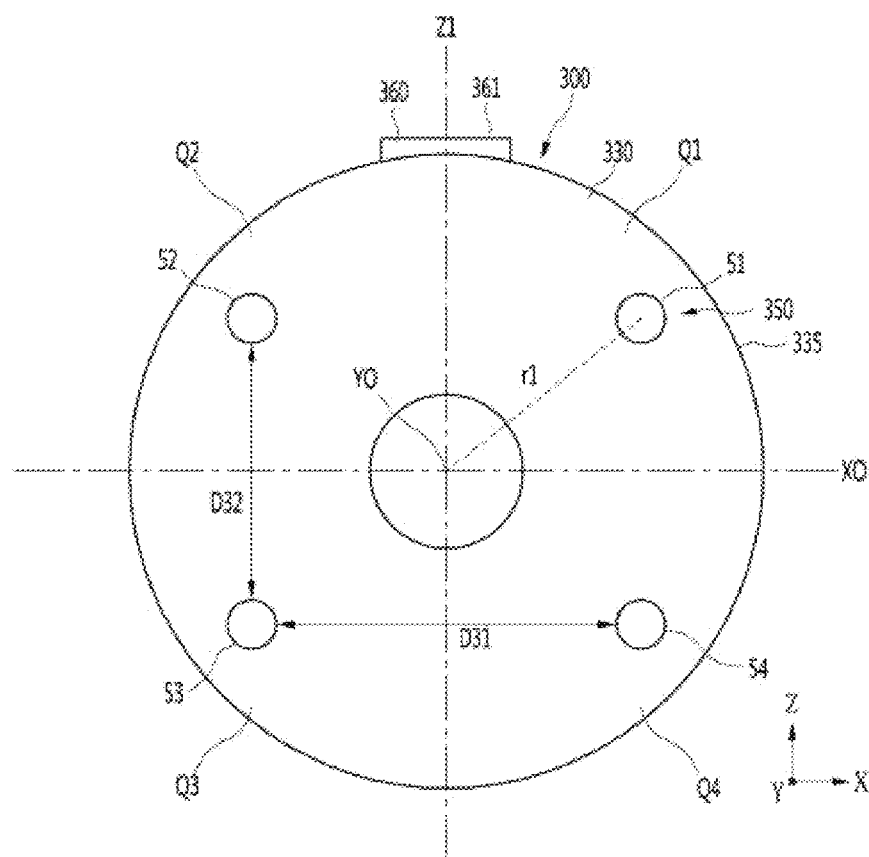
FIG. 44 is a rear view of the optical lens of FIG. 43.
Figure 45:
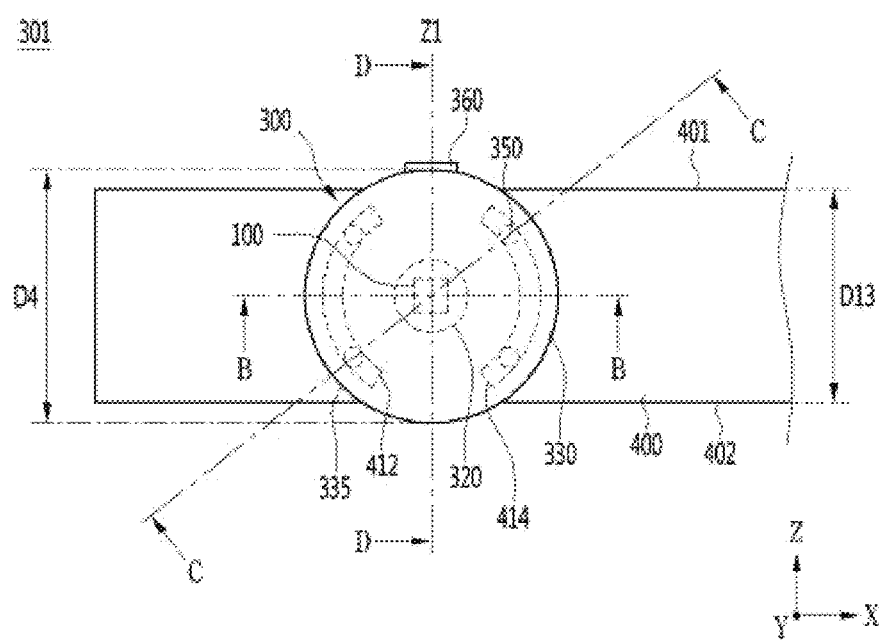
FIG. 45 is a plan view of a light emitting module having the optical lens of FIG. 43.
Figure 46:
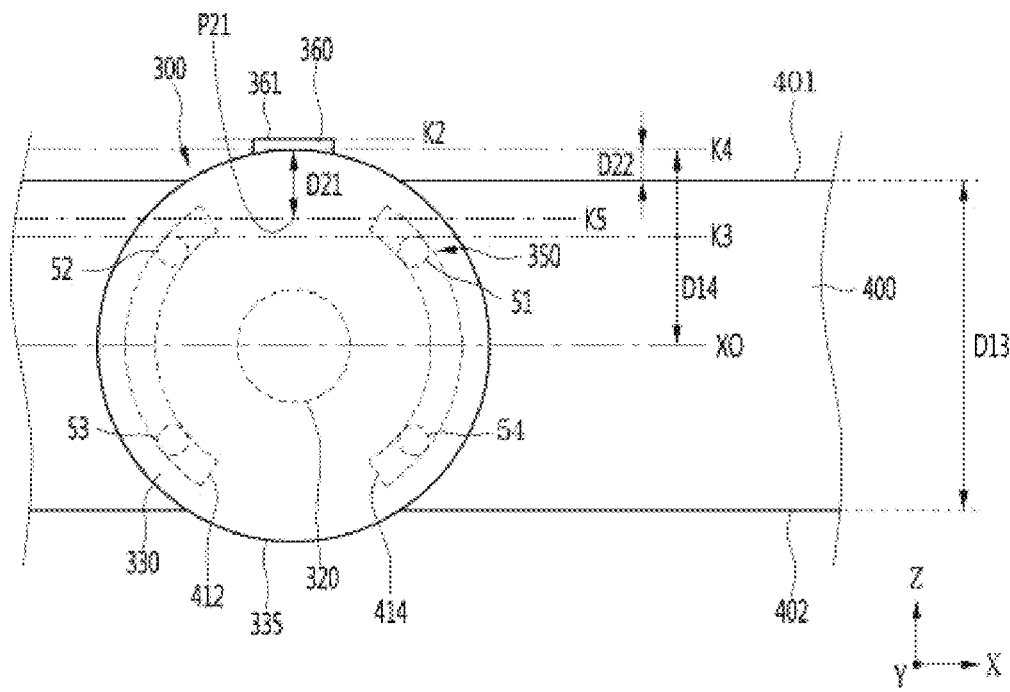
FIG. 46 is a plan view illustrating a circuit board and the optical lens of the light emitting module of FIG. 45.

FIG. 43 is a plan view in which a side protruding portion is provided at an optical lens according to an embodiment, FIG. 44 is a rear view of the optical lens of FIG. 43, FIG. 45 is a plan view of a light emitting module having the optical lens of FIG. 43, and FIG. 46 is a plan view illustrating a circuit board and the optical lens of the light emitting module of FIG. 45. Referring to FIGS. 43 and 44, the optical lens 300 may include the recess 315 and the light input surface 320 at the circumference of the recess 315, wherein the recess 315 may be upwardly convex from the bottom surface 310 of the optical lens 300. The light input surface 320 may have a curved surface at the circumference of the recess 315. The recess 315 may be a shell shape, a bell shape, or a semi-oval shape. In describing a structure of the optical lens 300, parts or configurations that are the same as the above-disclosed embodiments may be referenced to the description of the above-disclosed embodiments, and parts or configurations that are different will be described in detail.

The optical lens 300 includes the plurality of supporting protrusions 350 provided at the lower portion. The supporting protrusions 350 may protrude downward from the bottom surface 310 of the optical lens 300. The plurality of the supporting protrusions 350 may include first and second supporting protrusions 51 and 52 adjacent to the side protruding portion 360, and third and fourth supporting protrusions 53 and 54 spaced more apart from the side protruding portion 360 than the light input surface 320.

At any point, for example, a central point, of the side protruding portion 360, a distance D15 with the first and second supporting protrusions 51 and 52 may be shorter than a distance D14 with the central axis Y0. As D15>D14, the first to fourth supporting protrusions 51, 52, 53, and 54 may stably support the optical lens 300 at the circumference of the light input surface 320. When the optical lens 300 has a circular shape, D14 may be defined as a radius. A first distance r1 may be provided at a range of 0.82 to 0.85 of a radius D14 of the optical lens 300 or a radius of the bottom surface 310. The first distance r1 may include a range of 6 mm to 6.5 mm, e.g. a range of 6.2 mm to 6.4 mm. As the supporting protrusions 350 are provided at the first distance r1 from the central shaft Y0, interference due to light traveling to the bottom region at which the supporting protrusions 350 are provided may be reduced at the first distance r1 and surrounding regions thereof (r1±10%). Light traveling to a region deviated from the first distance r1 does not affect the light distribution significantly.

With respect to the central axis Y0, an angle R12 between a second axis Z1 passing through the central point of the side protruding portion 360 and the second supporting protrusion 52 may be an acute angle, for example, greater than 45°. In the plurality of the supporting protrusions 350, an angle R11 between the first and second supporting protrusions 51 and 52 adjacent to the side protruding portion 360 with respect to the central shaft Y0 may be greater than 90°. Thus, the plurality of the supporting protrusions 350 may be provided more adjacent to the first axis X0 than to the second axis Z1. As the plurality of the supporting protrusions 350 are provided more adjacent to the first axis X0, the optical lens 300 may be stably supported, and the length D13 of the circuit board 400 along the second axis Z1 may be shortened.

Referring to FIG. 44, at the bottom surface 310 of the optical lens 300, the plurality of the supporting protrusions 350 may be respectively provided at first to fourth quadrants Q1, Q2, Q3, and Q4 which are divided using the second axis Z1 passing through the central shaft Y0 and the center of the side protruding portion 360 and the first axis X0 perpendicular to the second axis Z1. Also, the plurality of the supporting protrusions 350 (51, 52, 53, and 54) may be provided closer to the first axis X0 than to the second axis Z1. The centers of the plurality of the supporting protrusions 350 and the central shaft Y0 may be apart by the same first distance r1, but embodiments are not limited thereto. At least one of the plurality of the supporting protrusions 350 may have a different interval from the central shaft Y0 compared to other remaining supporting protrusions 350, but embodiments are not limited thereto. In terms of distances between the plurality of the supporting protrusions 350 (51, 52, 53, and 54), a distance D31 along the first axis X0 may be longer than a distance D32 along the second axis Z1. This may vary in accordance with the width, which is a second length, of the circuit board 400.

As the plurality of the supporting protrusions 350 (51, 52, 53, and 54), at least four thereof may be provided in a polygonal shape, for example, a quadrilateral shape or a rectangular shape. As another example, the plurality of the supporting protrusions 350 (51, 52, 53, and 54) may be four or more, for example, five or more, but embodiments are not limited thereto. In the embodiment, since the plurality of the supporting protrusions 350 (51, 52, 53, and 54) are apart from the second axis Z1 not to overlap with the side protruding portion 360 and are provided closer to the first shaft X0, an influence of the plurality of the supporting protrusions 350 (51, 52, 53, and 54) on a surface of the second light output surface 335 may be reduced during injection molding of the optical lens 300.

The optical lens 300 may include the side protruding portion 360 protruding to the outermost portion of the optical lens 300. The side protruding portion 360 may protrude outward past the second light output surface 335 from a partial region of the second light output surface 335 of the optical lens 300. As shown in FIGS. 45 and 46, the side protruding portion 360 may protrude outward past a region of the circuit board 400. Thus, the side protruding portion 360 of the optical lens 300 may be provided at a region not vertically overlapping the circuit board 400. The side protruding portion 360 may protrude outward past any one of a first side surface 401 and a second side surface 402.

The side protruding portions 360 of the plurality of optical lenses 300 may be provided in a direction orthogonal to the central axis Y0, e.g. in the direction of the second axis Z1. The direction of the second axis Z1 may be a direction perpendicular to a direction along which the optical lenses 300 are arranged. The direction of the second axis Z1 may be orthogonal to the direction of the first axis X0 on the same plane. The side protruding portion 360 may protrude from the second light output surface 335. A horizontal surface at an outer side surface 361 of the side protruding portion 360 may be orthogonal to the direction of the second axis Z1. As shown in FIG. 46, a horizontal straight line K2 at the outer side surface 361 of the side protruding portion 360 may be parallel to the direction of the first axis X0. Here, when the first and second axes X0 and Z1 are provided on the same horizontal surface, the first and second axes X0 and Z1 may be orthogonal to each other while passing through the central axis Y0.

The side protruding portion 360 may be a portion in which a region for a gate during injection molding is cut, and may be defined as a gate portion, a cut portion, a protrusion, or a mark portion, but is not limited thereto. One side protruding portion 360 may be provided at the optical lens 300. The optical lens 300 may further include at least one protrusion protruding outward other than the side protruding portion 360, but embodiments are not limited thereto. The side protruding portion 360 of the optical lens 300 may have an outer side surface formed as a rough surface. The rough surface may have a higher surface roughness than a surface roughness of the first light output surface 330. The rough surface may have a lower transmission rate than a transmission rate of the first light output surface 330. The rough surface may be a cut surface.

Due to a low transmission rate and a high surface roughness of a region of the side protruding portion 360, light distribution may not be uniform and it may be difficult to control a light emission angle. Light emitted through the region of the side protruding portion 360 may be radiated to an adjacent optical lens. When the region of the side protruding portion 360 is arranged in the direction of the first axis X0 or provided to vertically overlap the circuit board 400, the light emitted through the side protruding portion 360 may be radiated to the adjacent optical lens 300 such that a light interference phenomenon may occur and may be reflected by the circuit board 400 and affect optical uniformity.

Referring to FIGS. 45 and 46, the light emitting module 301 may include the light emitting device 100, the optical lens 300 provided on the light emitting device 100, and the circuit board 400 provided below the light emitting device 100. The light emitting device 100 may be provided on the circuit board 400 and provided between the optical lens 300 and the circuit board 400. The light emitting device 100 may be operated by receiving power from the circuit board 400 and emits light.

The supporting protrusions 350 of the optical lens 300 may protrude toward the circuit board 400 and be provided lower than the upper surface of the circuit board 400. The plurality of the supporting protrusions 350 may vertically overlap the circuit board 400. The plurality of the supporting protrusions 350 may be fixed on the circuit board 400 to prevent the optical lens 300 from being tilted. Insertion grooves for inserting the supporting protrusions 350 may be provided on the circuit board 400. On the circuit board 400, when the supporting protrusions 350 are inserted into the insertion grooves for the supporting protrusions 350, an adhesive member (not shown) may be used to glue the supporting protrusions 350.

The circuit board 400 may be arranged within a light unit such as, e.g., a lighting device, a display device, a terminal, a headlight, and an indicator light. The circuit board 400 may include a circuit layer electrically connected to the light emitting device 100. A protective layer may be provided on the circuit board 400, and the protective layer may include a material that absorbs or reflects light reflected from the optical lens 300. When the circuit board 400 is viewed from the top, a first length in the x-axis direction is longer than the second length D13 in the z-axis direction. The first length may be a horizontal length, and the second length D13 may be a vertical length or width.

The second length D13 of the circuit board 400 may be smaller than or the same as the width D4 or the diameter of the optical lens 300. For example, the second length D13 may be smaller than the width D4 or the diameter of the optical lens 300. The second length D13 of the circuit board 400 may decrease, thus having a cost saving effect. The first length of the circuit board 400 may be twice or more of the diameter or the width of the optical lens 300. For example, the first length of the circuit board 400 may have a length longer than a sum of diameters or widths of four or more optical lenses 300. The first length of the circuit board 400 may be longer, for example, four times longer or more, than the second length D13, but embodiments are not limited thereto.

The first and second supporting protrusions 51 and 52 may be more spaced apart than a distance D21 with a straight line K5 at a level with a ⅓ point P21 of the radius D14 or a ½ width of the optical lens 300. The first and second side surfaces 401 and 402 of the circuit board 400 may be provided outward past a straight horizontal line K3 passing through the plurality of the supporting protrusions 350 and provided more inward than the outer circumference of the optical lens 300, for example, a straight horizontal line K4 passing through the second light output surface 335. The first side surface 401 of the circuit board 400 may be a predetermined distance D22 apart from the straight line K4.

The absorption layers 412 and 414 may be provided on the circuit board 400. The absorption layers 412 and 414 may include a material in which an absorption rate is higher than a reflection rate, for example, a black resist material. The absorption layers 412 and 414 may include the first and second absorption layers 412 and 414 apart from each other, and the first and second absorption layers 412 and 414 may be apart from each other along the first axis X0 of the circuit board 400. The first and second absorption layers 412 and 414 may be formed of a semi-oval shape, but embodiments are not limited thereto. The first and second absorption layers 412 and 414 may be apart from the central axis Y0 in the same first distance r1. The absorption layers 412 and 414 may be protective materials of the circuit board 400 or formed as separate layers, but embodiments are not limited thereto.

Figure 49:
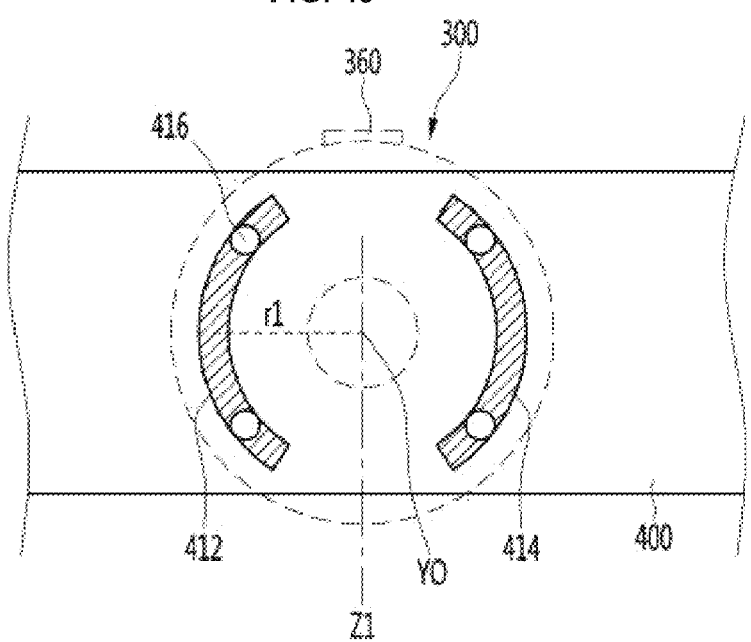
FIG. 49 is a see-through view of an optical lens of an upper surface of a circuit board according to an embodiment.
Figure 51:
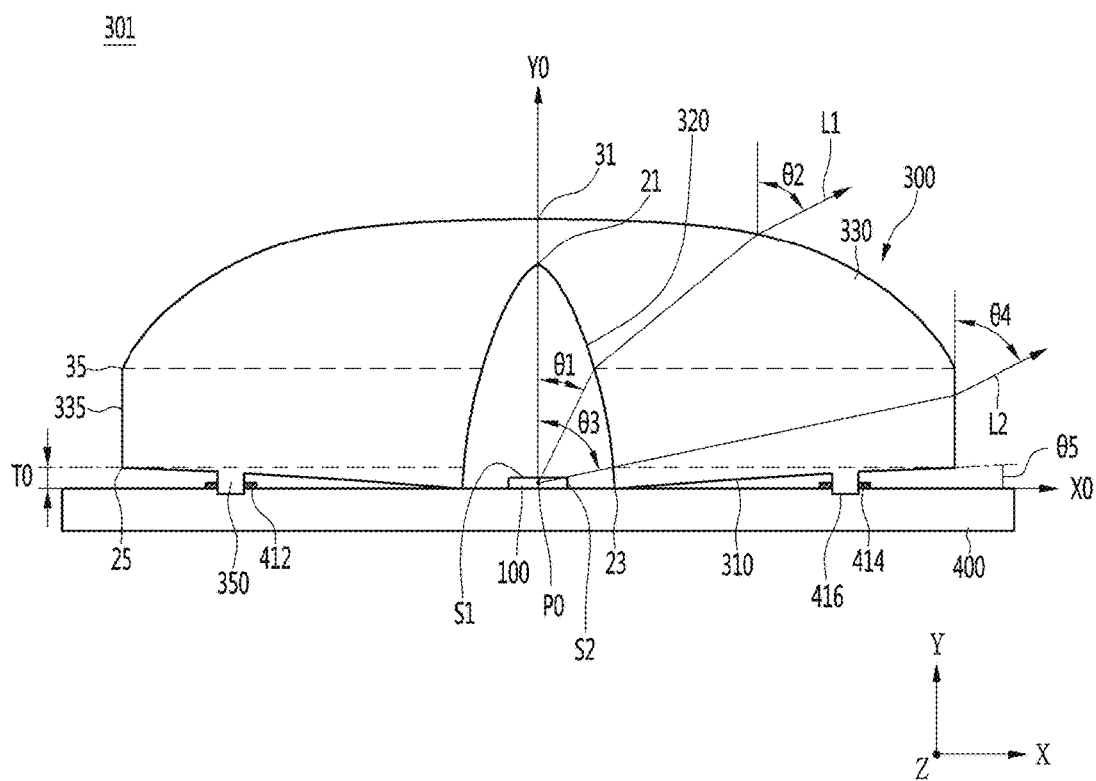
FIG. 51 is a cross-sectional view taken along line C-C of the light emitting module of FIG. 45.
Figure 52:
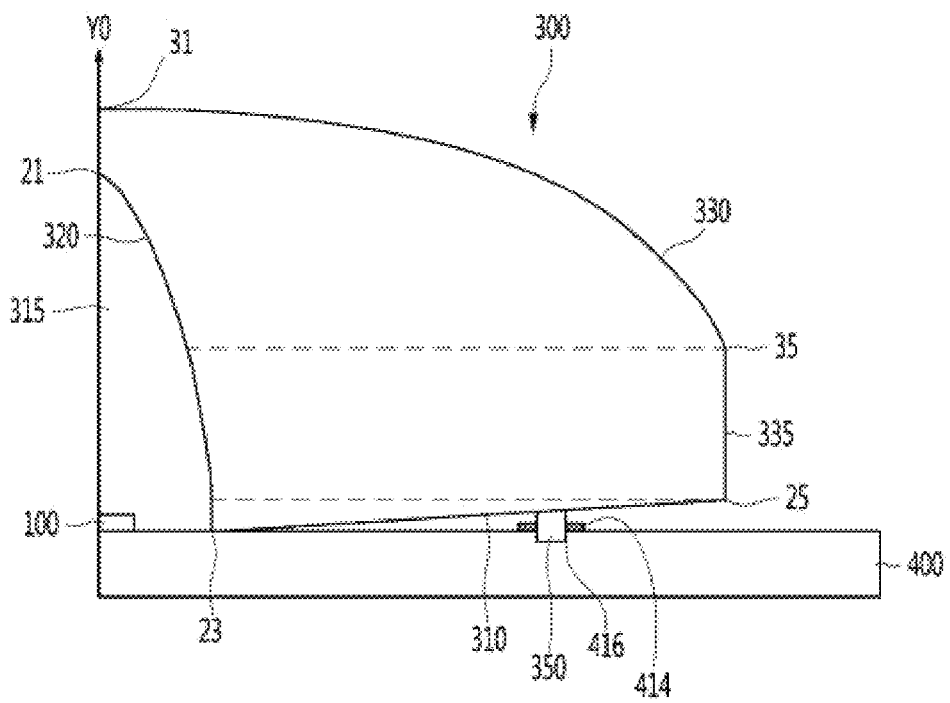
FIG. 52 is a partially enlarged view of the light emitting module of FIG. 51.

The supporting protrusions 350 (51, 52, 53, and 54) of the optical lens 300 may vertically overlap the first and second absorption layers 412 and 414. As illustrated in FIG. 49, a plurality of holes 416 into which the supporting protrusions 350 may be inserted may be formed along regions of the first and second absorption layers 412 and 414 on the upper surface of the circuit board 400. The supporting protrusions 350 of the optical lens 300 may be inserted into the holes 416 provided at the regions of the first and second absorption layers 412 and 414 as illustrated in FIGS. 49, 51, and 52.

Figure 53:
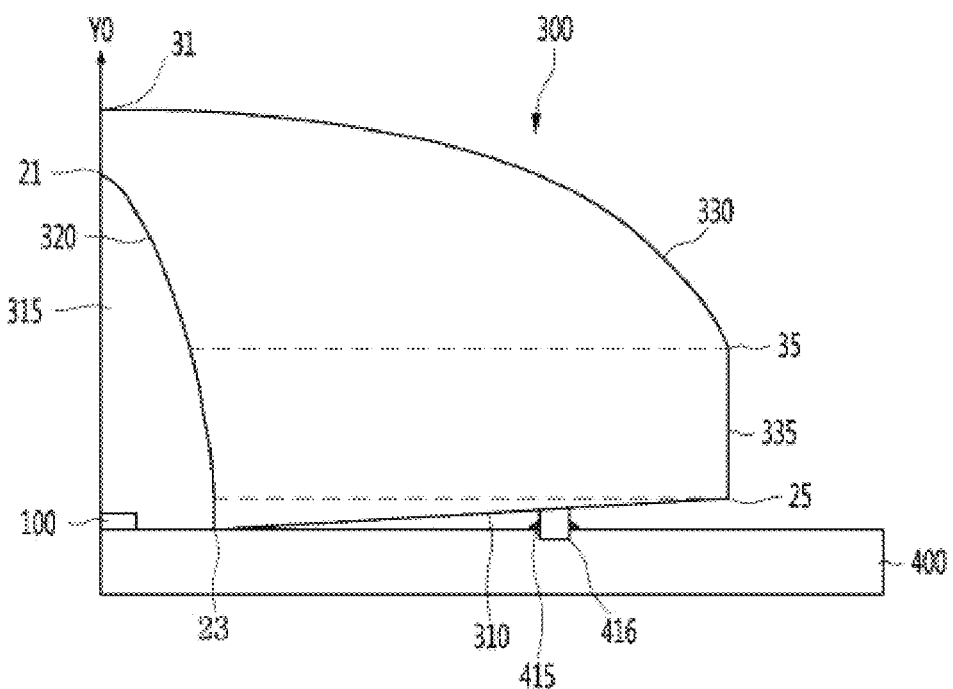
FIG. 53 is a view illustrating fixing a supporting protrusion of an optical lens to a circuit board in the light emitting module of FIG. 51.

As illustrated in FIG. 53, when the supporting protrusions 350 of the optical lens 300 are inserted into the holes 416, circumferences of the supporting protrusions 350 may be glued by an adhesive agent 405. The adhesive agent 405 may include an adhesive material of a black resin material, e.g. a black epoxy resin material. The adhesive agent 405 may absorb light to suppress reflection of unnecessary light.

Figure 47:
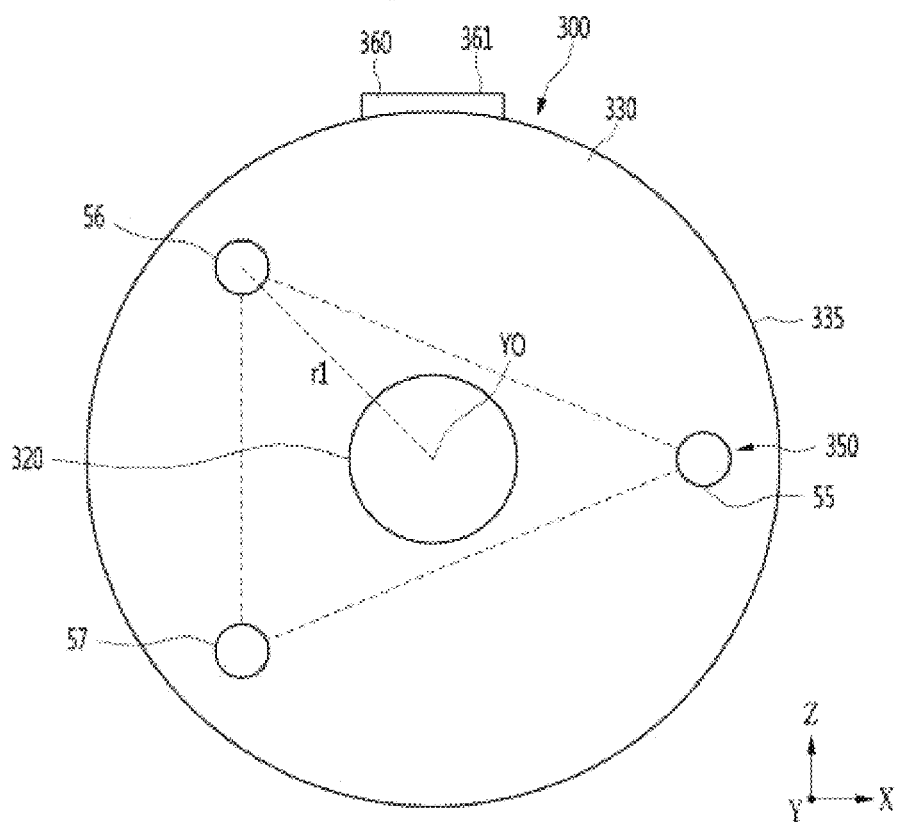
FIG. 47 is a view illustrating another example of a supporting protrusion of the optical lens of FIG. 43.

Referring to FIG. 47, three supporting protrusions 350 (55, 56, and 57) of the optical lens 300 may be provided in a triangular shape. Distances between centers of the supporting protrusions 350 and the central axis Y0 may be the same first distance r1 or any one of the supporting protrusions 350 may have a different distance from the central axis Y0, but embodiments are not limited thereto.

Figure 48:
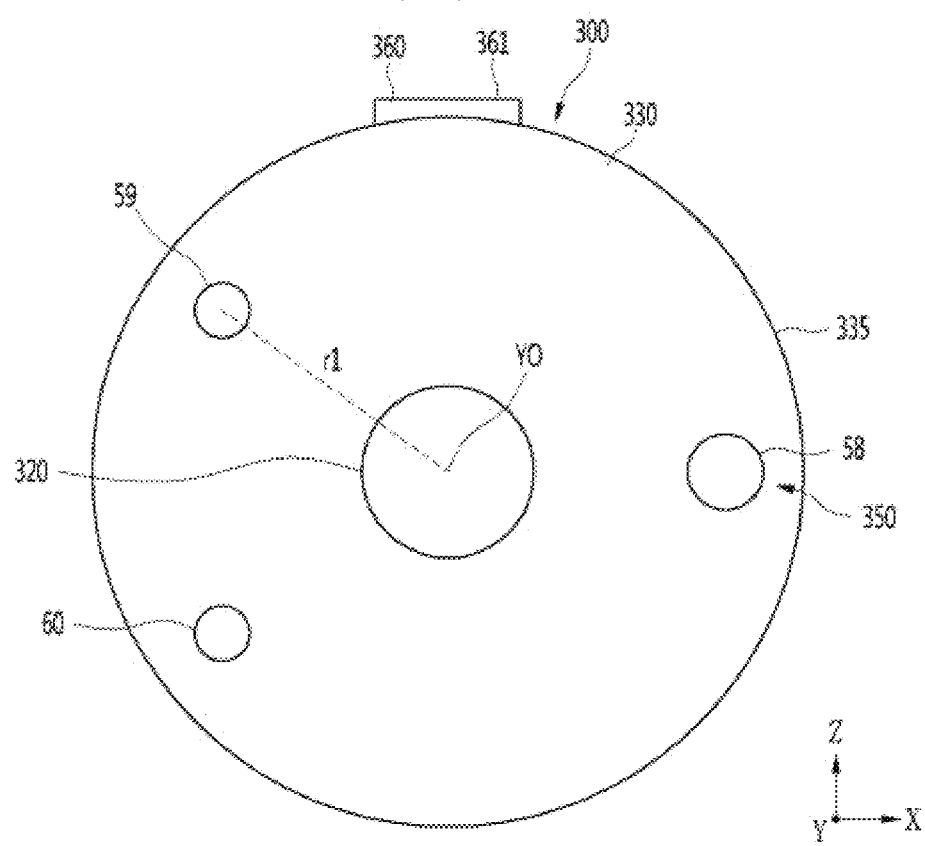
FIG. 48 is a view illustrating a supporting protrusion of the optical lens of FIG. 43 according to another embodiment.

Referring to FIG. 48, at least one of the plurality of the supporting protrusions 350 (58, 59, and 60) of the optical lens 300, for example, the supporting protrusion 58, may have a larger width or a larger area compared to the other supporting protrusions 59 and 60. Among the plurality of the supporting protrusions 350, a size of the supporting protrusion 58, which is relatively farther from the central axis Y0, may be larger than sizes of the supporting protrusions 59 and 60, which are relatively closer to the central axis. Differences of bottom areas of the supporting protrusions 58, 59, and 60 may be proportional to the distances thereof with the central axis Y0.

Figure 50:
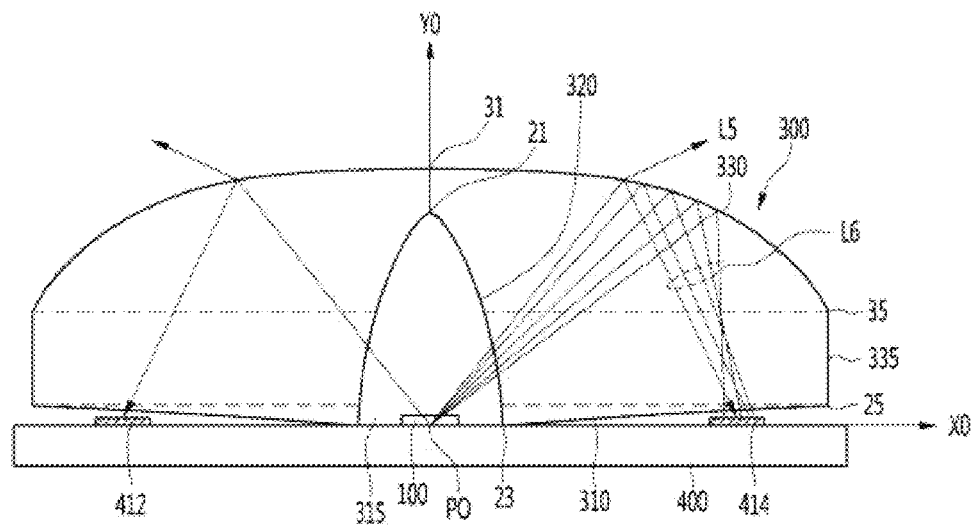
FIG. 50 is a cross-sectional view taken along line B-B of the light emitting module of FIG. 45.
Figure 77:
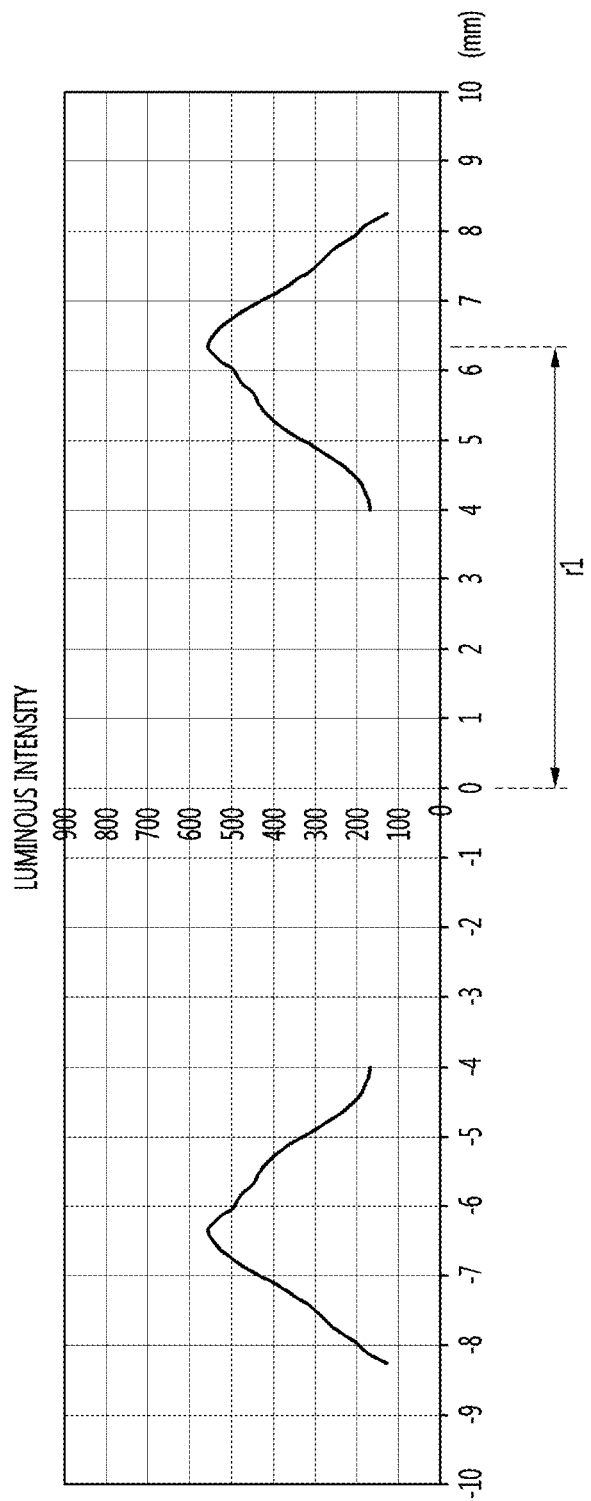
FIG. 77 is a graph illustrating a luminous intensity of the optical lens according to an embodiment at a predetermined distance from an optical axis.

FIG. 50 is a cross-sectional view taken along line B-B of the light emitting module of FIG. 45. As illustrated in FIG. 50, of the light emitted from the light emitting device 100, although most light L5 incident on the first light output surface 330 transmits, the partial light L6 may be reflected toward the bottom surface 310. As a result of measuring the intensity of the partial light L6 reflected toward the bottom surface 310, a peak value detected in a region having the first distance r1 from the central axis Y0 is shown in FIG. 77. The partial light L6 traveling to the bottom surface 310 may transmit through the bottom surface 310 or may be reflected by the bottom surface 310, thus interfering with other light. In the embodiment, the absorption layers 412 and 414 of the circuit board 400 may be provided at regions corresponding to the peak value or a range of 80% or more of the peak value of the intensity of the partial light L6 traveling to the bottom surface 310 in order to absorb unnecessary light. When the unnecessary light travels to the outside, a mura defect may occur.

The supporting protrusions 350 to support the optical lens 300 may be provided at regions corresponding to the peak value or the range of 80% or more of the peak value of the intensity of the partial light L6 traveling to the bottom surface 310. As the supporting protrusions 350 are provided within the regions of the absorption layers 412 and 414 or a glue of an absorption material is applied to the supporting protrusions 350, the incident partial light L6 may be absorbed to suppress the mura defect. As another example of the bottom surface 310 of the optical lens 300, a light absorption material may be applied to the above regions, but embodiments are not limited thereto.

At the bottom surface 310 of the optical lens 300, the first distance r1 may include the range of 6 mm to 6.5 mm, e.g. the range of 6.2 mm to 6.4 mm. As the supporting protrusions 350 are provided at the first distance r1 from the central shaft Y0, interference due to light traveling to the bottom region at which the supporting protrusions 350 are provided may be reduced at the first distance r1 and surrounding regions thereof (r1±10%). Light traveling to a region deviated from the first distance r1 does not affect the light distribution significantly. Thus, light output through the first and second light output surfaces 330 and 335 of the optical lens 300 may be effectively controlled, and the partial light L6 traveling to other regions, for example, the bottom surface, may be suppressed from interfering with other light distributions, thereby improving the uniformity of light distribution.

When radiating light to the first light output surface from the outside of the optical lens, the light intensity of the peak value may be detected at the first distance r1 as shown in FIG. 77. At least one or all of the supporting protrusions 350, the absorption layers 412 and 414, and the glue (405 of FIG. 51) may be provided at regions where the amount of light is the maximum and opposite regions thereof among the regions of the bottom surface 310 which may be reflected or refracted by characteristics of the curved surface of the first light output surface 330, thereby suppressing the mura problem and preventing the uniform light distribution from being interfered with.

Figure 54:
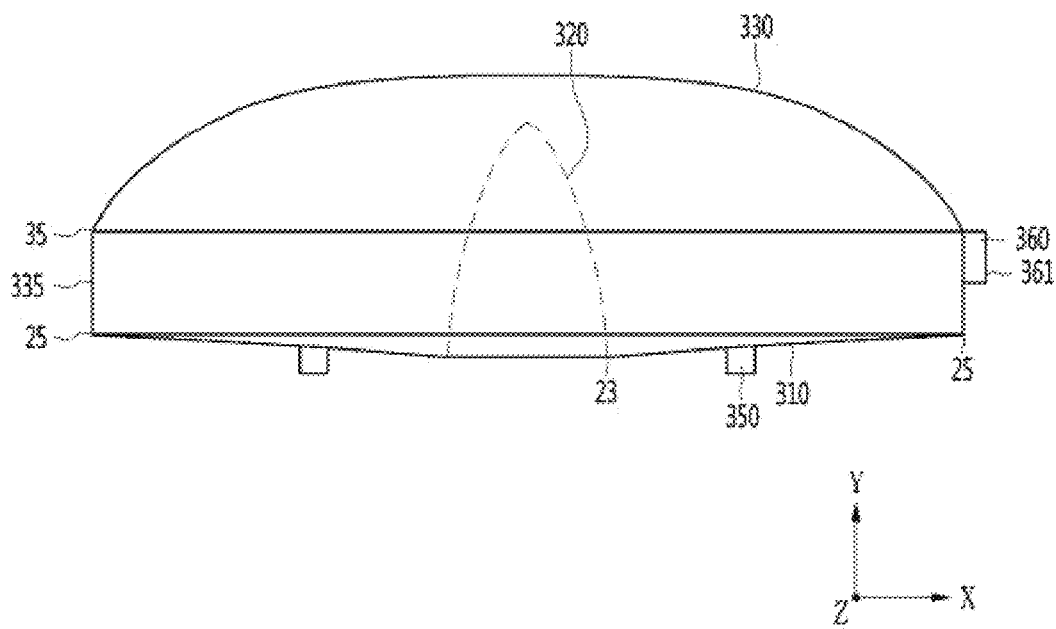
FIG. 54 is a side view of an optical lens according to another embodiment.
Figure 55:
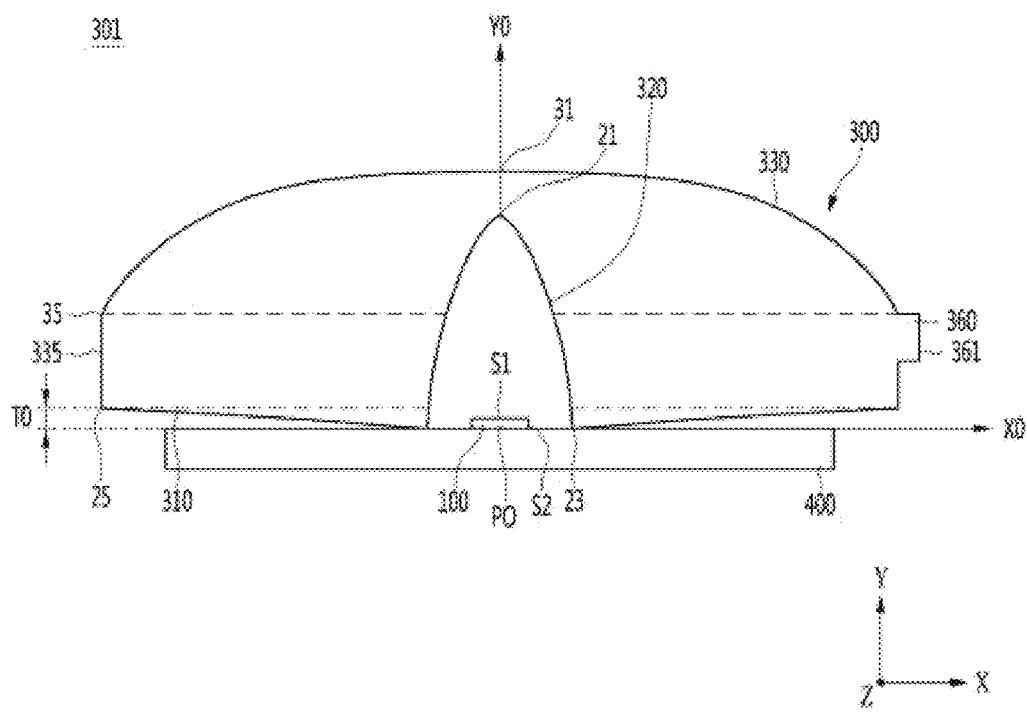
FIG. 55 is a cross-sectional view taken along line D-D of the light emitting module of FIG. 45.

FIG. 51 is a cross-sectional view taken along line C-C of the light emitting module of FIG. 45, and is a view illustrating paths of light output to a light input surface and an output surface of an optical lens. FIG. 52 is a partially enlarged view of the light emitting module of FIG. 51, FIG. 53 is a view illustrating fixing a supporting protrusion of an optical lens to a circuit board in the light emitting module of FIG. 51, FIG. 54 is a side view of an optical lens according to a third embodiment, and FIG. 55 is a cross-sectional view taken along line D-D of the light emitting module of FIG. 45. Referring to FIGS. 51 to 55, the optical lens 300 may include the bottom surface 310, the light input surface 320, the recess 315, the first light output surface 330, and the second light output surface 335, and may be referenced to the description of the above-disclosed embodiments.

The optical lens 300 may receive through the light input surface 320 the light emitted from the upper surface and the side surfaces of the light emitting device 100, and emit the light to the first and second light output surfaces 330 and 335. Partial light incident from the light input surface 320 may pass through a predetermined path and be radiated to the bottom surface 310. When the light emitted from the light emitting device 100 is incident on the light input surface 320 while having the beam spread angle distribution of a predetermined angle, the optical lens 300 may diffuse the light through the first and second light output surfaces 330 and 335.

The light input surface 320 of the optical lens 300 may be provided to be opposite from the upper surface S1 and the side surfaces S2 of the light emitting device 100. The light emitted from the side surfaces S2 of the light emitting device 100 may be radiated to the light input surface 320. Thus, the light emitted to the side surfaces S2 of the light emitting device 100 may be incident on the light input surface 320 without leakage.

The light emitting device 100 emits light through the upper surface S1 and the plurality of side surfaces S2, and has, for example, five or more light emitting surfaces. The plurality of side surfaces S2 of the light emitting device 100 may be a structure including at least four side surfaces, and may be light emitting surfaces. As the light emitting device 100 provides five or more light emitting surfaces, the beam spread angle distribution of light may be widened due to the light emitted through the side surfaces S2. The beam spread angle distribution of the light emitting device 100 may be 130° or greater, for example, 136° or greater. ½ of the beam spread angle of the light emitting device 100 may be may be 65° or greater, for example, 68° or greater. When the light emitted from the light emitting device 100 is emitted through the optical lens 300, a beam angle corresponding to the beam spread angle of the light emitting device 100 may be 140° or greater, for example, 142° or greater. ½ of the beam angle may be 70° or greater, for example, 71° or greater. As the optical lens 300 emits light in a wider beam spread angle distribution than the beam spread angle of the light emitting device 100, the beam spread angle distribution of light may be improved, and uniform luminance distribution may be provided. As the beam spread angle distribution of the light emitting device 100 is provided to be wide, diffusing light using the optical lens 300 having the inclined bottom surface 310 and the light input surface 320 with a deep depth may be facilitated.

The first and second light output surfaces 330 and 335 may refract and emit the incident light. The second light output surface 335 may refract the light such that an angle of extracted light after the refraction is smaller than an angle of incident light before the refraction with respect to the central axis Y0. Thus, a light interference distance between adjacent optical lenses 300 may be long, and colors of partial light output through the second light output surface 335 and light output to the first light output surface 330 may be mixed around the optical lens 300. The first light output surface 330 may reflect or refract the incident light to output the light to the outside. At the first light output surface 330, an emission angle of the light emitted through the first light output surface 330 after the refraction may be greater than an incidence angle in which the light is incident before the refraction with respect to the central axis Y0.

Figure 57:
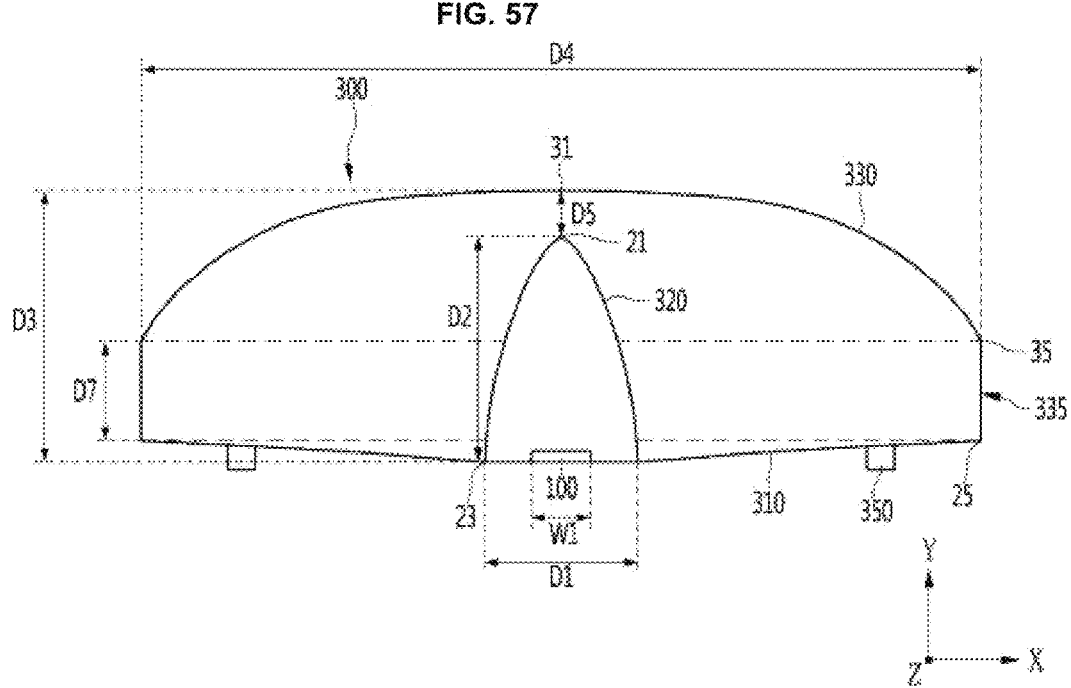
FIG. 57 is a detailed side cross-sectional view illustrating the optical lens of FIG. 55.

Referring to FIG. 57, the width D4 or the diameter of the optical lens 300 may be 2.5 times the thickness D3 or greater, for example, three times the thickness D3 or greater. As the width D4 or the diameter of the optical lens 300 is 15 mm or greater, a uniform luminance distribution may be provided throughout a light unit, for example, a backlight unit, and a thickness of the light unit may be reduced. The depth D2 of the recess 315 may be the same as a bottom width D1 of the light input surface 320 or deeper. The depth D2 of the recess 315 may be 75% of the thickness D3 of the optical lens 300 or greater, for example, 80% of the thickness D3 of the optical lens 300 or greater. As the depth D2 of the recess 315 is deep, light may be diffused in the side direction even from regions adjacent to the first vertex 21 of the light input surface 320 even when the central region 32 of the first light output surface 330 does not have a total reflection surface or a negative curvature. The depth D2 of the recess 315 may be the depth of the first vertex 21 of the light input surface 320. As the depth of the first vertex 21 of the light input surface 320 is deep, the light input surface 320 may refract light incident on surrounding regions of the first vertex 21 in the side direction.

The minimum distance D5 between the recess 315 and the first light output surface 330 may be the interval between the first vertex 21 of the light input surface 320 and the second vertex 31 of the first light output surface 330. The distance D5 may be, for example, 1.5 mm or smaller, or in a range of 0.6 mm to 1.5 mm. When the distance D5 between the first vertex 21 of the light input surface 320 and the second vertex 31 of the first light output surface 330 exceeds 1.5 mm, the amount of light traveling to the central region of the first light output surface 330 may increase such that the hot spot phenomenon may occur. When the distance D5 between the first vertex 21 of the light input surface 320 and the second vertex 31 of the first light output surface 330 is smaller than 0.6 mm, the stiffness at the center of the optical lens 300 weakens. As the distance D5 between the recess 315 and the first light output surface 330 is within the above range, a path of light may be horizontally diffused outward to the surrounding portions of the central region even when the central region 32 of the first light output unit 330 does not have a total reflection surface or a negative curvature. As the first vertex 21 of the recess 315 approaches the convex second vertex 31 of the first light output surface 330, the amount of light traveling toward the side direction of the first light output surface 330 through the light input surface 320 may increase. Thus, the amount of light diffused in the side direction of the optical lens 300 may increase. The first vertex 21 of the light input surface 320 may be provided more adjacent to the second vertex 31, which is the center of the first light output surface 330, than to the horizontally extending line from the third edge 35 of the second light output surface 335.

In the optical lens 300, the first light output surfaces 330 may have different radii of curvatures. The light input surfaces 320 may have different radii of curvatures. Centers of circles respectively having radii of curvatures of the first light output surfaces 330 and the light input surfaces 320 may be provided lower than the straight horizontal line passing through the first vertex 21 of the light input surface 320, and may be provided at a region vertically overlapping the optical lens 300.

As illustrated in FIG. 51, when the optical path of the optical lens 300 is viewed, the first light L1 incident on the light input surface 320 of the optical lens 300 among the light emitted from the light emitting device 100 may be refracted and emitted to the first light output surface 330. Also, out of the light emitted from the light emitting device 100, the second light L2 incident on the light input surface 320 may be emitted to the second light output surface 335.

The incidence angle of the first light L1 incident on the light input surface 320 may be the first angle $\theta 1$, and the emission angle of the first light L1 emitted to the first light output surface 330 may be the second angle $\theta 2$, the incidence angle of the second light L2 incident on the light input surface 320 may be the third angle $\theta 3$, and the emission angle of the second light L2 emitted to the second light output surface 335 may be the fourth angle $\theta 4$. The second light L2 may be light emitted to the side surfaces of the light emitting device 100. The second angle $\theta 2$ may be greater than the first angle θ1. The second angle θ2 may gradually increase as the first angle θ1 gradually increases, and gradually decrease as the first angle θ1 gradually decreases. Also, the first and second angles θ1 and θ2 may satisfy the condition of θ2>θ1 or 1<(θ2/θ1). The second angle θ2 of the first light output surface 330 may be the emission angle after the refraction, and may be greater than the incidence angle before the refraction. As the first light output surface 330 refracts the light L1 traveling to the first light output surface 330 of the light incident through the light input surface 320, the first light output surface 330 may diffuse the first light L1 to the side direction of the optical lens 300.

The fourth angle θ4 may be smaller than the third angle θ3. The fourth angle θ4 may increase as the third angle θ3 increases, and the fourth angle θ4 may decrease as the third angle θ3 decreases. Also, the third and fourth angles θ3 and θ4 may satisfy the condition of θ4<θ3 or 1>(θ4/θ3). The fourth angle θ4 of the second light output surface 335 may be the emission angle after the refraction, and may be smaller than the incidence angle before the refraction. Light emitted through the side surfaces S2 of the light emitting device 100 or light deviated from the beam spread angle may be incident on the second light output surface 335. Thus, the second light output surface 335 may refract the light emitted through the side surfaces S2 of the light emitting device 100 and the light deviated from the beam spread angle to travel to the half-value angle region of the luminance distribution. The optical loss may be reduced by the second light output surface 335.

The third edge 35 of the second light output surface 335 may have the beam spread angle of the light emitting device 100 and be provided above a position of the ½ angle of the radiated beam angle, for example, above the fourth angle θ4. For example, the angle between the central axis Y0 and the straight line connecting the center P0 of the bottom of the recess 315 to the third edge 35 may be smaller than the angle of the beam having the half-value angle of the light emitting device 100 and that has transmitted through the optical lens 300.

Out of the light emitted from the light emitting device 100, the light having the beam spread angle of the light emitting device may be controlled to be emitted through the second light output surface 335. In this case, colors of the light L2 emitted to the second light output surface 335 and the light traveling to the first light output surface 330 may be mixed.

Out of the light emitted from the light emitting device 100, the light L3 incident on the light input surface 320 may be reflected by the bottom surface 310 of the optical lens and emitted to the second light output surface 335 or reflected from the second light output surface 335. The light reflected by the second light output surface 335 may be remade incident on the light input surface 320 or the first light output surface 330 and refracted to be emitted to the first light output surface 330.

Figure 59:
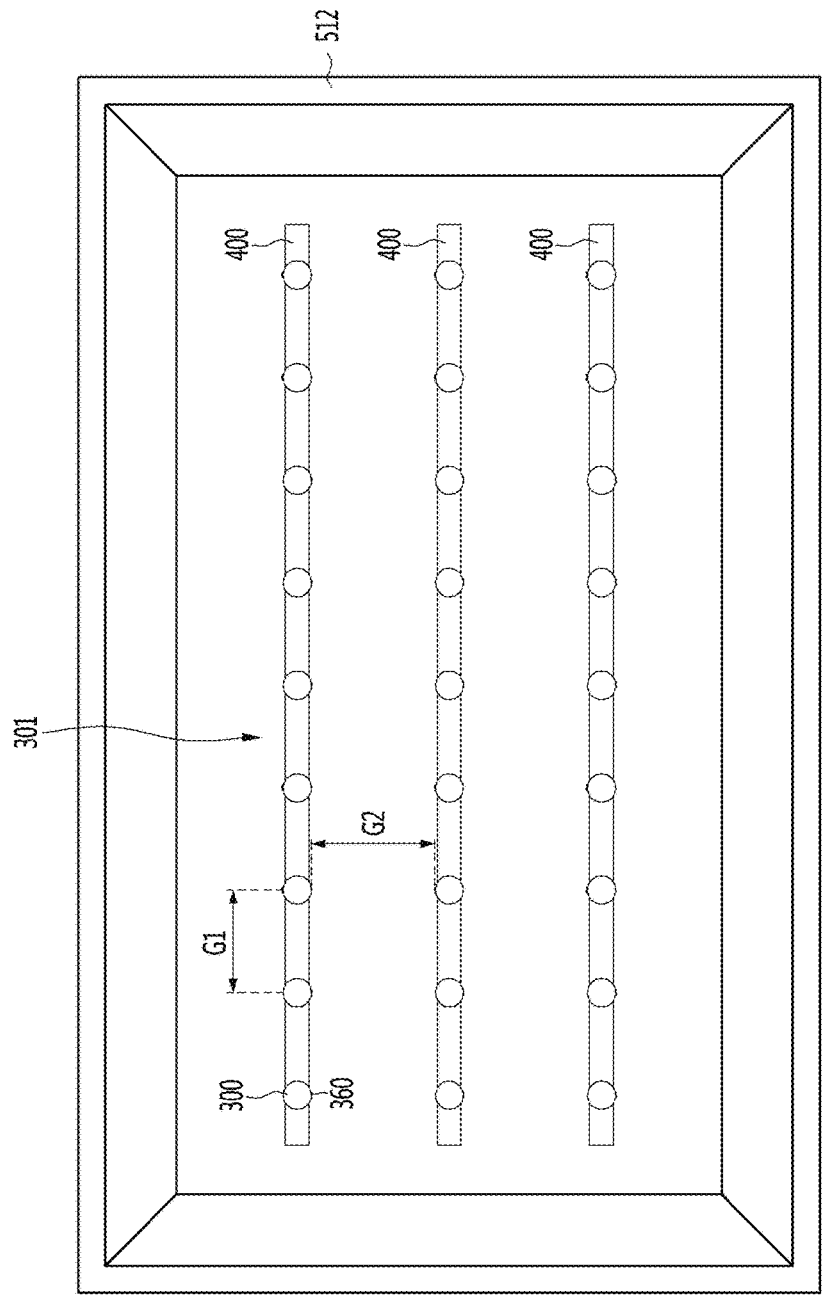
FIG. 59 is a view of a light unit or device having a light emitting module according to another embodiment.
Figure 60:
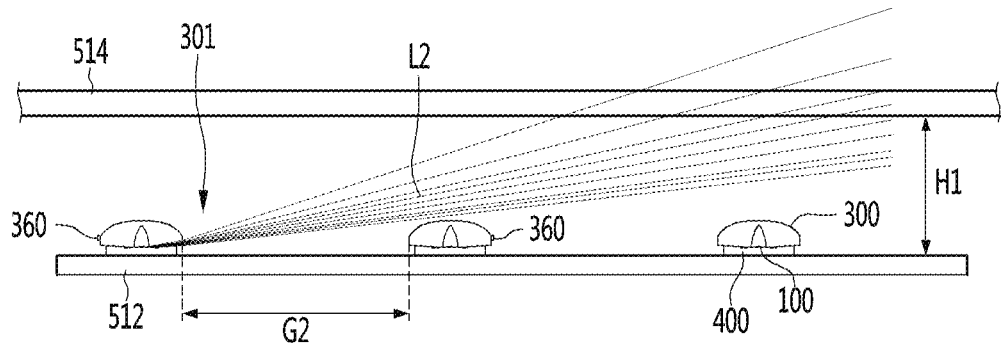
FIG. 60 is a view of a light unit or device in which an optical sheet is provided on the light emitting module of FIG. 59.

Out of the light emitted to the side surfaces S2 of the light emitting device 100, since the light emitted through the second light output surface 335 is emitted in the emission angle which is smaller than the incidence angle, the interval G2, for example, the optical interference distance, between the optical lenses 300 provided on different circuit boards 400 may be increased as illustrated in FIGS. 59 and 60. Also, since the luminance distribution by the optical lens 300 is improved, the distance H1 between the circuit board 400 and the optical sheet 514 may be decreased. Also, the number of the optical lenses 300 provided within the backlight unit may be reduced.

In the optical lens 300, the first edge 23 of the bottom surface 310 may be at the same or a lower position than the center P0 of the bottom of the recess 315 of the optical lens 300, and the position of the second edge 25 may be provided higher than the upper surface S2 of the light emitting device 100. Thus, the bottom surface 310 may totally reflect the light emitted through the side surfaces S2 of the light emitting device 100 and incident from the light input surface 320.

As the center region of the first light output surface 330 vertically overlapping the recess 315 is processed as a flat surface or a convex surface, the light emitted to the convex light input surface 320 may be refracted outward with respect to the optical axis, thereby preventing a hot spot from occurring due to the light transmitted through the center region of the first light output surface 330. In the embodiment, the depth D2 of the recess 315 may be provided adjacent to the convex center region of the first light output surface 330, thereby refracting the light in the side direction by the light input surface 320 of the recess 315. Thus, the hot spot due to the light emitted by the first light output surface 330 of the optical lens 300 may be reduced, and the light may be emitted at a uniform distribution at the center region of the first light output surface 330.

Figure 56:
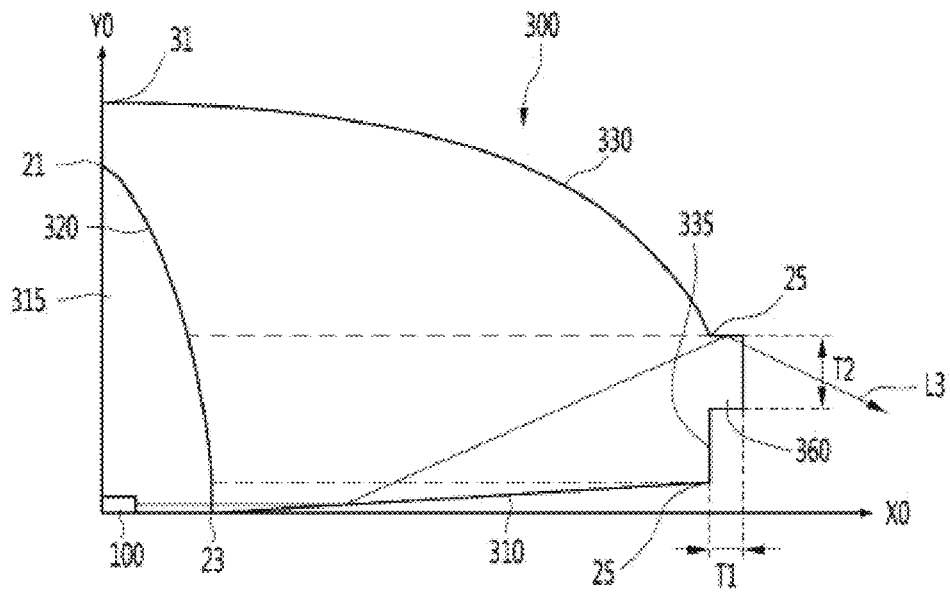
FIG. 56 is a partially enlarged view of the optical lens of FIG. 55.

As illustrated in FIGS. 55 and 56, the side protruding portion 360 of the optical lens 300 protrudes from the second light output surface 335. The light incident on the regions of the side protruding portion 360 is reflected from the side protruding portion 360 and emitted through the outer side surface 361. In the optical lens 300 of the circuit board 400, since the side protruding portion 360 reflects light in the direction of the second axis Z1 along which different circuit boards 400 are arranged, the optical interference between optical lenses 300 within the same circuit board 400 may be prevented. Also, the intervals between the different circuit boards 400 may be more spaced apart than intervals between the optical lenses 300 within the same circuit board 400, thereby reducing optical interference between the optical lenses 300 on the different circuit boards 400. The side protruding portion 360 may protrude from the second light output surface 335 by a minimum thickness T1 of 300 μm, e.g. 500 μm or greater. As the side protruding portions 360 may be provided in a direction at which the intervals between the optical lenses 300 are greater, the optical interference between the optical lenses 300 may be reduced. A height T2 of the side protruding portion 360 may be the same or smaller than the width (D7 of FIG. 8) of the second light output surface 335, and may be, for example, 1 mm or greater. The height T2 of the side protruding portion 360 may vary in accordance with the size of the optical lens 300. The height T2 of the side protruding portion 360 may be at least ⅓ of the thickness (D3 of FIG. 8) of the optical lens 300. The width (T3 of FIG. 43) of the side protruding portion 360 may be greater than the height T2 and the thickness T1, for example, twice or more of the T1 or T2. A width T3 of the side protruding portion 360 may be at least ⅓ of the width or diameter D4 of the optical lens 300.

Figure 58:
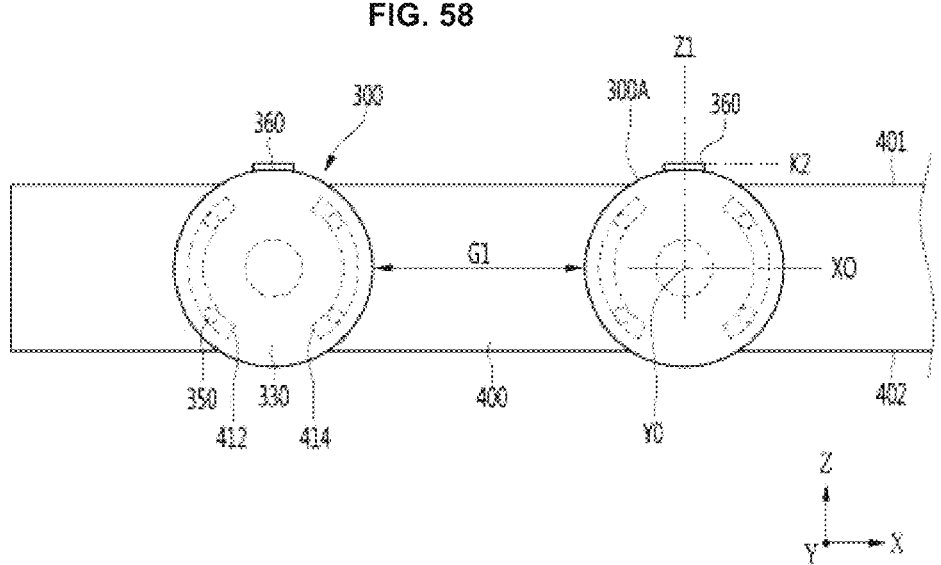
FIG. 58 is a view of a lighting module in which an optical lens may be arranged on a circuit board according to another embodiment.

Referring to FIG. 58, a plurality of optical lenses 300 and 300A may be provided on the circuit board 400. The plurality of optical lenses 300 and 300A may be arranged along the first axis X0, and be the predetermined interval G1 apart from each other. The side protruding portions 360 of the plurality of optical lenses 300 and 300A may protrude along the second axis Z1, for example, protrude toward the first side surface 401 of the circuit board 400. The side protruding portions 360 of the plurality of optical lenses 300 and 300A may protrude more outward past the first side surface 401 of the circuit board 400. The side protruding portions 360 of the plurality of optical lenses 300 and 300A may protrude along the same direction.

In another embodiment, the side protruding portions 360 of the plurality of optical lenses 300 and 300A may protrude along opposite directions +Z and −Z with respect to the direction of the first axis X0 or the central axis Y0. The side protruding portions 360 of the plurality of optical lenses 300 and 300A may protrude outward past the first and second side surfaces 401 and 402 of the circuit board 400. In still another embodiment, the side protruding portions 360 of the plurality of optical lenses 300 and 300A may protrude along the same direction with respect to the first axis X0 or the central axis Y0. For example, the side protruding portions 360 of the plurality of optical lenses 300 and 300A may protrude toward the second side surface 402 of the first and second side surfaces 401 and 402 of the circuit board 400. The side protruding portions 360 of the plurality of optical lenses 300 and 300A may protrude outward past the second side surface 402 of the circuit board 400.

Each of the side protruding portions 360 of the plurality of optical lenses 300 and 300A may be provided forward or backward from the second axis Z1 perpendicular to the first axis X0 in a random shape, and may protrude outward past outer portions, e.g. the first side surface 401 or the second side surface 402, of the circuit board 400.

FIGS. 59 and 60 are views illustrating a light unit having a lighting module according to an embodiment. Referring to FIGS. 59 and 60, a light unit may include the bottom cover 512, a plurality of circuit boards 400 as a lighting module in the bottom cover 512, the light emitting devices 100, and the optical lenses 300 provided on the plurality of circuit boards 400. The plurality of circuit boards 400 may be arranged in the bottom cover 512. The bottom cover 512 may include metal for heat dissipating or thermal conductive resin material. The bottom cover 512 may include a storage unit, and a side cover may be provided at a circumference of the storage unit.

The circuit boards 400 may include circuit layers electrically connected to the light emitting devices 100. The circuit boards 400 may include at least one of a resin PCB, a MCPCB having a metal core, and a FPCB, but embodiments are not limited thereto. Reflective sheets may be provided on the circuit boards according to the embodiment. The reflective sheets may be formed of, for example, PET, PC, PVC, resin, but embodiments are not limited thereto.

The optical sheet 514 may be provided above the bottom cover 512, and the optical sheet may include at least one of prism sheets that gather scattered light, luminance reinforcing sheets, and diffusion sheets that re-diffuse light. A light guide layer may be provided at a region between the optical sheet 514 and the lighting module, but embodiments are not limited thereto.

The interval G1 between optical lenses 300 provided within each circuit board 400 may be narrower than the interval G2 between the optical lenses 300 provided in different circuit boards 400. The interval G1 may be in a range of six times to ten times, for example, six times to nine times, the width or diameter D4 of the optical lens 300. The interval G2 may be in a range of nine times to eleven times, for example, nine times to eleven times, the width or diameter D4 of the optical lens 300. The width D4 of the optical lens 300 may be 15 mm or greater. The optical interference distance, for example, the intervals G1 and G2, between the optical lenses 300 may remain at least six times the width or diameter D4 of the optical lens 300.

When the width or diameter D4 of the optical lenses 300 is narrower than the above range, the number of the optical lenses 300 within the light unit may increase, and dark portions may be generated at regions between the optical lenses 300. When the width or diameter D4 of the optical lenses 300 is wider than the above range, the number of the optical lenses 300 within the light unit decreases, but the luminance of each optical lens 300 may decrease. The number of the optical lenses 300 within the light unit may be the same as the number of the side protruding portions 360.

In the optical lens, when the light input surface and the first light output surface include a curved section, the curved section may satisfy a spline curve, which is a nonlinear numerical analytical method. The spline curve is a function to form a smooth curve using a few control points, and may be defined by an interpolation curve passing through selected control points and an approximation curve which is similar to a shape of a line connecting the selected control points. The spline curve, a B-spline curve, a Bezier curve, a non-uniform rational B-spline (NURBS) curve, and a cubic spline curve may be used. For example, curved sections included in cross sections of each of the surfaces may be shown using the Bezier curve equation. The Bezier curve function may be implemented as a function that obtains various free curves by a start point, which is an initial control point, an end point, which is a final control point, and a movement of an inner control point positioned between the start point and the end point.

Figure 65:
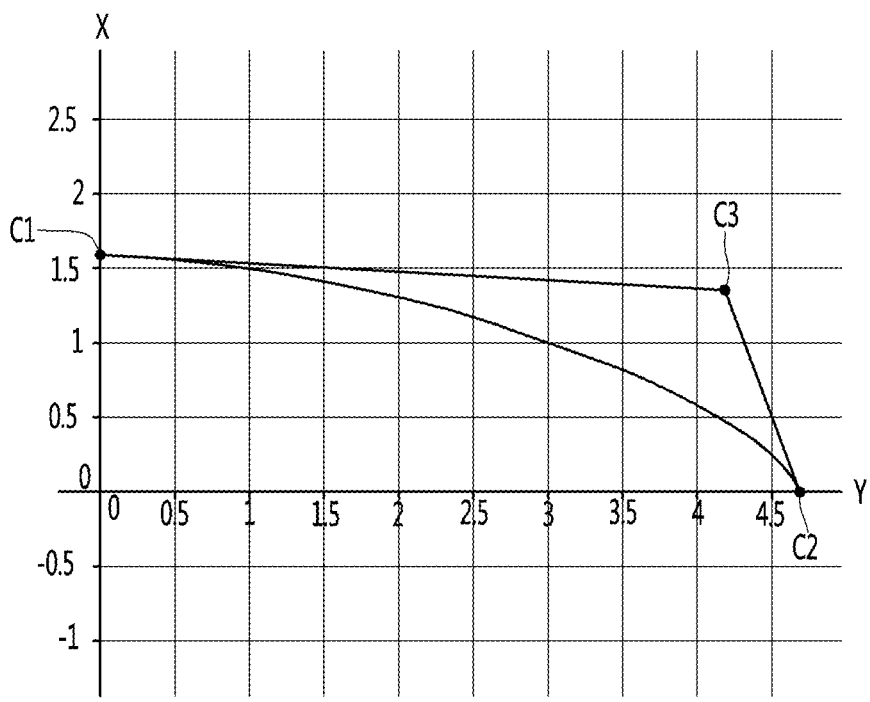
FIG. 65 is a graph defining a curved section of a light input surface of an optical lens using a function of a Bezier curve according to an embodiment.

FIG. 65 is a graph for obtaining a curve of a light input surface of a recess, and may be implemented by a start point C1, an end point C2, and a movement of at least one inner control point C3. By giving weighted values to the start point C1 and the end point C2 connected to the inner control point C3, a curve of the light input surface 320 may be obtained as in Table 1 below. Table 1 includes parameters for obtaining the curved section of the light input surface.

TABLE 1

|  | Start point | End point |
| --- | --- | --- |
| Y(Optical axis) | 0.00 | 1.58 |
| X(Horizontal axis) | 4.50-4.70 | 0.0099 |
| Tangent Angle | 109-113 | −3.74 |
| Tangent Length | 1.43 | 0.45 |
| Weight | 0.48-0.50 | 0.71 |

The x-axis point and the weighted value of the start point C1 may vary in accordance with an interval between the optical lens 300 and the optical sheet.

Figure 66:
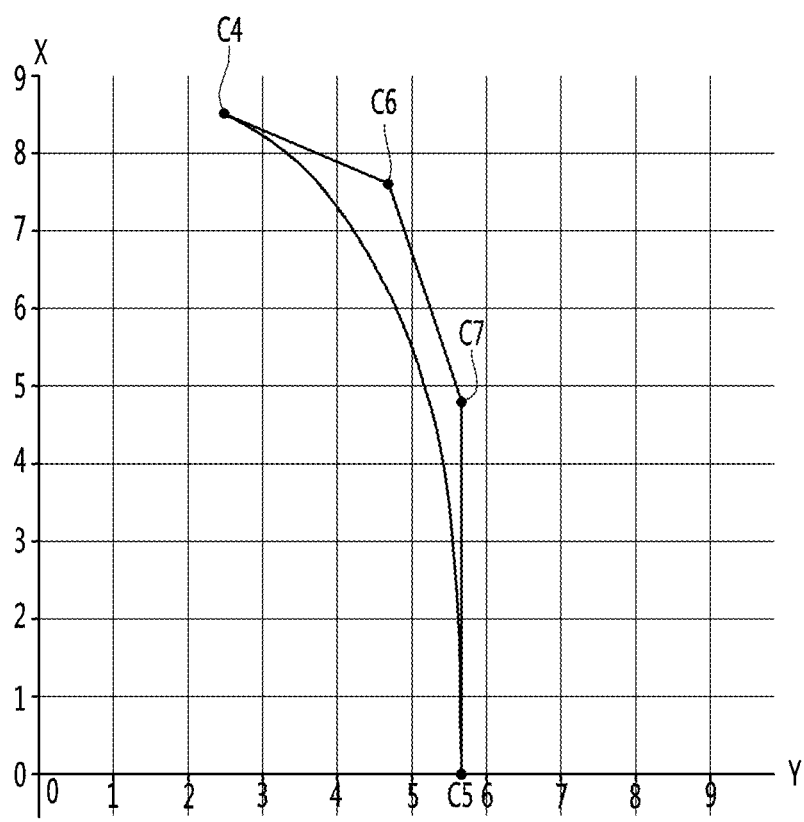
FIG. 66 is a graph defining a curved section of a first light output surface of an optical lens using a function of a Bezier curve according to an embodiment.

FIG. 66 is a graph for obtaining a curve of a first light output surface of an optical lens according to an embodiment, and may be implemented by a start point C4, an end point C5, and movements of at least two inner control points C6 and C7. By giving weighted values to the start point C4 and the end point C5 connected to the inner control points C6 and C7, a curve of the first light output surface 330 may be obtained as in Table 2 below. Table 2 includes parameters for obtaining the curved section of the first light output surface.

TABLE 2

|  | Start point | End point |
| --- | --- | --- |
| Y(Optical axis) | 8.51 | 0.00 |
| X(Horizontal axis) | 2.48 | 5.65-5.76 |
| Tangent Angle | −22 | 90 |

TABLE 2-continued

|  | Start point | End point |
|---|---|---|
| Tangent Length | 1.42.363 | 4.80 |
| Weight | 0.44-0.48 | 0.52-0.54 |

The x-axis point and the weighted value of the start point C4 may vary in accordance with the interval between the optical lens 300 and the optical sheet.

Figure 61:
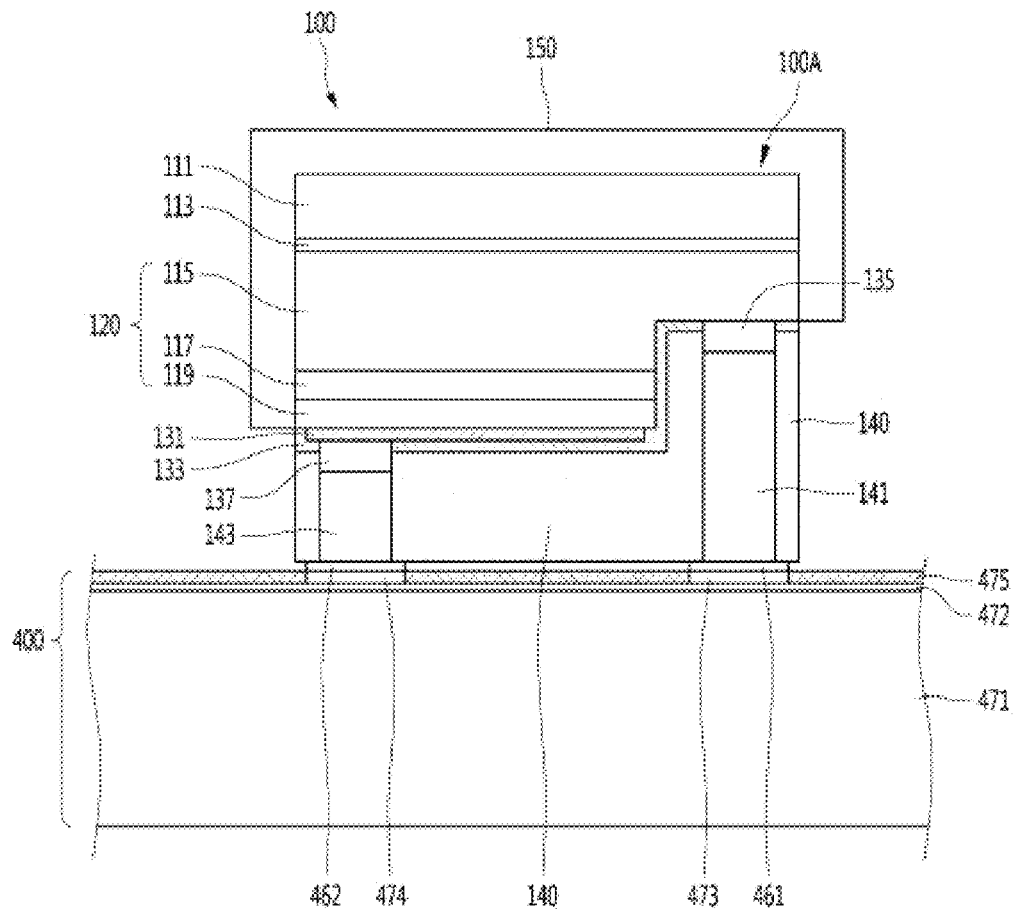
FIG. 61 is a detailed view of a light emitting device according to an embodiment.

Embodiments of a light emitting device may be described with reference to FIGS. 61 to 63. FIG. 61 is a view illustrating a first example of a light emitting device according to an embodiment. An example of the light emitting device and the circuit board may be described with reference to FIG. 61. Referring to FIG. 61, the light emitting device 100 may include a light emitting chip 100A. The light emitting device 100 may include the light emitting chip 100A and a fluorescent material layer 150 provided on the light emitting chip 100A. The fluorescent material layer 150 may include one or more of blue, green, yellow, and red fluorescent materials, and may be provided as a single layer or multiple layers. In the fluorescent material layer 150, a fluorescent material may be added to a light transmittable resin material. The light transmittable resin material may include materials such as silicone or epoxy resin, and the fluorescent material may be selectively formed of YAG-based, TAG-based, silicate-based, nitride-based, and oxynitride-based materials.

The fluorescent material layer 150 may be provided at an upper surface of the light emitting chip 100A, or provided at upper and side surfaces of the light emitting chip 100A. The fluorescent material layer 150 may be provided on a region from which light is emitted among surfaces of the light emitting chip 100A to convert wavelengths of light. The fluorescent material layer 150 may include a single layer or different fluorescent material layers, wherein the different fluorescent material layers may include a first layer having at least one type of fluorescent material among red, yellow, and green fluorescent materials, and a second layer formed on the first layer and having different fluorescent materials from the first layer among the red, yellow, and green fluorescent materials. The different fluorescent material layers may include three or more fluorescent material layers, but embodiments are not limited thereto. The fluorescent material layer 150 may include a film type fluorescent material layer. The film type fluorescent material layer provides a uniform thickness, such that color distribution in accordance with the wavelength conversion may be uniform.

In terms of the light emitting chip 100A, the light emitting chip 100A may include a substrate 111, a first semiconductor layer 113, a light emitting structure 120, an electrode layer 131, an insulating layer 133, a first electrode 135, a second electrode 137, a first connection electrode 141, a second connection electrode 143, and a support layer 140. The substrate 111 may use a light transmittable, insulating, or conductive substrate. For example, the substrate 111 may use at least one of sapphire ($Al_2O_3$), SiC, Si, GaAs, GaN, ZnO, GaP, InP, Ge, and $Ga_2O_3$. A plurality of convex portions may be formed on at least one or all of a top surface and a bottom surface of the substrate 111 to improve light extraction efficiency. A side cross-sectional shape of each convex portion may include at least one of a hemispherical shape, a half-oval shape, or a polygonal shape. The substrate 111 may be removed in the light emitting chip 100A, and in this case, the first semiconductor layer 113 or a first conductive semiconductor layer 115 may be provided as a top layer of the light emitting chip 100A.

The first semiconductor layer 113 may be formed below the substrate 111. The first semiconductor layer 113 may be formed using II-V compound semiconductors. The first semiconductor layer 113 may be formed as at least one layer or a plurality of layers using the II-V compound semiconductors. The first semiconductor layer 113 may have the semiconductor layer using III-V compound semiconductors that include at least one of GaN, InN, AlN, InGaN, AlGaN, InAlGaN, AlInN, AlGaAs, GaAs, GaAsP, AlGaInP, and GaP. The first semiconductor layer 113 may have an empirical formula, $In_xAl_yGa_{1-x-y}N$ ($0 \le x \le 1$, $0 \le y \le 1$, $0 \le x+y \le 1$), and may be formed of at least one of a buffer layer and an undoped semiconductor layer. The buffer layer may reduce a difference of lattice constants between the substrate and a nitride semiconductor layer, and the undoped semiconductor layer may improve a crystal quality of a semiconductor. The first semiconductor layer 113 may not be formed.

The light emitting structure 120 may be formed below the first semiconductor layer 113. The light emitting structure 120 may be selectively formed from II-V and III-V compound semiconductors, and emit a predetermined peak wavelength within a wavelength range from an ultraviolet band to a visible ray band.

The light emitting structure 120 may include the first conductive semiconductor layer 115, a second conductive semiconductor layer 119, and an active layer 117 formed between the first conductive semiconductor layer 115 and the second conductive semiconductor layer 119. Another semiconductor layer may be further provided on at least one of above or below each of the layers 115, 117, and 119, but embodiments are not limited thereto.

The first conductive semiconductor layer 115 may be provided below the first semiconductor layer 113, and be implemented with a semiconductor to which a first conductive dopant is doped, e.g. an n-type semiconductor layer. The first conductive semiconductor layer 115 may include the empirical formula, $In_xAl_yGa_{1-x-y}N$ ($0 \le x \le 1$, $0 \le y \le 1$, $0 \le x+y \le 1$). A material of the first conductive semiconductor layer 115 may be selected from III-V compound semiconductors such as GaN, AlN, AlGaN, InGaN, InN, InAlGaN, AlInN, AlGaAs, GaP, GaAs, GaAsP, and AlGaInP. The first conductive dopant may be an n-type dopant that includes dopants such as Si, Ge, Sn, Se, and Te.

The active layer 117 may be provided below the first conductive semiconductor layer 115, selectively include a single quantum well, a multiple quantum well (MQW), a quantum wire structure, or a quantum dot structure, and include periods of a well layer and a barrier layer. The periods of the well layer/barrier layer may include at least one among pairs of InGaN/GaN, GaN/AlGaN, AlGaN/AlGaN, InGaN/AlGaN, InGaN/InGaN, AlGaAs/GaA, InGaAs/GaAs, InGaP/GaP, AlInGaP/InGaP, and InP/GaAs.

The second conductive semiconductor layer 119 may be provided below the active layer 117. The second conductive semiconductor layer 119 may include, for example, the empirical formula, $In_xAl_yGa_{1-x-y}N$ ($0 \le x \le 1$, $0 \le y \le 1$, $0 \le x+y \le 1$). The second conductive semiconductor layer 119 may be formed of at least one compound semiconductor of GaN, InN, AlN, InGaN, AlGaN, InAlGaN, AlInN, AlGaAs, GaP, GaAs, GaAsP, and AlGaInP. The second conductive semiconductor layer 119 may be a p-type semiconductor layer, and the first conductive dopant may a p-type dopant, which may include Mg, Zn, Ca, Sr, and Ba.

In another embodiment, in the light emitting structure 120, the first conductive semiconductor layer 115 may be implemented using a p-type semiconductor layer, and the second conductive semiconductor layer 119 may be implemented using an n-type semiconductor layer. A third conductive semiconductor layer having opposite polarity from the second conductive semiconductor layer 119 may be formed on the second conductive semiconductor layer 119. Also, the light emitting structure 120 may be implemented using any one structure among an n-p binding structure, a p-n binding structure, an n-p-n binding structure, and a p-n-p binding structure.

The electrode layer 131 may be formed below the second conductive semiconductor layer 119. The electrode layer 131 may include a reflective layer. The electrode layer 131 may include an ohmic contact layer coming in contact with the second conductive semiconductor layer 119 of the light emitting structure 120. A material of the reflective layer may be selected from a material with a reflection rate of 70% or greater, e.g. metals of Al, Ag, Ru, Pd, Rh, Pt, Ir and alloys of two or more of the above metals. The metal of the reflective layer may be in contact below the second conductive semiconductor layer 119. A material of the ohmic contact layer may be selected from a light transmittable material, and a metal or nonmetal material.

The electrode layer 131 may include a stacked structure of a light transmittable electrode layer/reflective layer, and the light transmittable electrode layer may be formed of indium tin oxide (ITO), indium zinc oxide (IZO), indium zinc tin oxide (IZTO), indium aluminum zinc oxide (IAZO), indium gallium zinc oxide (IGZO), indium gallium tin oxide (IGTO), AZO, antimony tin oxide (ATO), GZO, Ag, Ni, Al, Rh, Pd, Ir, Ru, Mg, Zn, Pt, Au, Hf and materials formed of selective combinations of the above. A metallic reflective layer may be provided below the light transmittable electrode layer, and may be formed of Ag, Ni, Al, Rh, Pd, Ir, Ru, Mg, Zn, Pt, Au, Hf, and materials formed of selective combinations of the above. As another example, the reflective layer may be formed of a distributed Bragg reflection (DBR) structure in which two layers having different refraction rates are alternately provided.

A light extraction structure such as roughness may be formed at a surface of at least one layer of the second conductive semiconductor layer 119 and the electrode layer 131, and the light extraction structure may change a critical angle of incident light to improve the light extraction efficiency.

The insulating layer 133 may be provided below the electrode layer 131, and may be provided at a lower surface of the second conductive semiconductor layer 119, side surfaces of the second conductive semiconductor layer 119 and the active layer 117, and a partial region of the first conductive semiconductor layer 115. The insulating layer 133 may be formed at the lower region of the light emitting structure 120 except the electrode layer 131, the first electrode 135, and the second electrode 137 to electrically protect the lower portion of the light emitting structure 120.

The insulating layer 133 may include an insulating material or an insulating resin formed with at least one of an oxide, a nitride, a fluoride, and a sulfide having at least one of Al, Cr, Si, Ti, Zn, and Zr. For example, the insulating layer 133 may be selectively formed of $SiO_2$, $Si_3N_4$, $Al_2O_3$, or $TiO_2$. The insulating layer 133 may be formed as a single layer or multiple layers, but embodiments are not limited thereto. The insulating layer 133 may be formed to prevent an interlayer shortage in the light emitting structure 120 when forming a metallic structure for bonding below the light emitting structure 120. The insulating layer 133 may be formed of a DBR structure in which a first layer and a second layer having different refraction rates are alternately provided. The first layer may be formed with any one of $SiO_2$, $Si_3N_4$, $Al_2O_3$, and $TiO_2$, and the second layer may be formed with any one material other than the material of the first layer, but embodiments are not limited thereto. Also, the first layer and the second layer may be formed with the same material or formed of a pair having three or more layers. In this case, the electrode layer may not be formed.

The first electrode 135 may be provided below the partial region of the first conductive semiconductor layer 115, and the second electrode 137 may be provided below a portion of the electrode layer 131. The first connection electrode 141 may be provided below the first electrode 135, and the second connection electrode 143 may be provided below the second electrode 137. The first electrode 135 may be electrically connected to the first conductive semiconductor layer 115 and the first connection electrode 141, and the second electrode 137 may be electrically connected to the second conductive semiconductor layer 119 and the second connection electrode 143.

The first electrode 135 and the second electrode 137 may be formed with at least one of Cr, Ti, Co, Ni, V, Hf, Ag, Al, Ru, Rh, Pt, Pd, Ta, Mo, W or alloys thereof, and may be formed as a single layer or multiple layers. The first electrode 135 and the second electrode 137 may be formed with the same stacked structure or different staked structures. A current spreading pattern such as an arm or finger structure may be further formed on at least one of the first electrode 135 and the second electrode 137. Also, one or a plurality of the first electrodes 135 and the second electrodes 137 may be formed, and the numbers of the first electrodes 135 and the second electrodes 137 are not limited. At least one of the first and second connection electrodes 141 and 143 may be provided in a plurality, but embodiments are not limited thereto.

The first connection electrode 141 and the second connection electrode 143 may provide a lead function of supplying power and a radiation path. Shapes of the first connection electrode 141 and the second connection electrode 143 may include at least one of a circular shape, a polygonal shape, a cylindrical shape, and a polygonal prism shape. The first connection electrode 141 and the second connection electrode 143 may be formed with any one of Ag, Al, Au, Cr, Co, Cu, Fe, Hf, In, Mo, Ni, Si, Sn, Ta, Ti, W, and selective alloys of the above metals. The first connection electrode 141 and the second connection electrode 143 may be plated with any one metal of In, Sn, Ni, Cu, and selective alloys thereof to improve an adhesive force with the first electrode 135 and the second electrode 137.

The support layer 140 may include a thermally conductive material, and be provided at circumferences of the first electrode 135, the second electrode 137, the first connection electrode 141, and the second connection electrode 143. Lower surfaces of the first and second connection electrodes 141 and 143 may be exposed at a lower surface of the support layer 140. The support layer 140 may be used as a layer for supporting the light emitting device 100. The support layer 140 may be formed of an insulating material, and the insulating material is formed with a resin layer such as silicone resin or epoxy resin. As another example, the insulating material may include a paste or an insulating ink. The insulating material may be formed with a resin including polyacrylate resin, epoxy resin, phenolic resin, polyamides resin, polyimides resin, unsaturated polyesters resin, polyphenylene ether resin (PPE), polyphenilene oxide (PPO) resin, polyphenylenesulfides resin, cyanate ester resin, benzocyclobutene (BCB), polyamido-amine (PA- MAM) dendrimers, and polypropylene-imine (PPI) dendrimers, and PAMAM inner structures and PAMAM-organosilicon (OS) having an organic silicon outer surface solely or in combinations thereof. The support layer 140 may be formed with a different material from the insulating layer 133.

At least one of compounds such as an oxide, a nitride, a fluoride, and a sulfide having at least one of Al, Cr, Si, Ti, Zn, and Zr may be added into the support layer 140. The compound added into the support layer 140 may be a heat diffusing agent, and the heat diffusing agent may be used as powder particles of a predetermined size, a grain, filler, and an additive. The heat diffusing agent may include a ceramic material, and the ceramic material may include at least one of low temperature co-fired ceramic (LTCC), high temperature co-fired ceramic (HTCC), alumina, quartz, calcium zirconate, forsterite, SiC, graphite, fused silica, mullite, cordierite, zirconia, beryllia, and aluminum nitride. The ceramic material may be formed with a metal nitride, which has higher thermal conductivity than a nitride or an oxide, among insulating materials such as the nitride or the oxide, and the metal nitride may include, for example, a material with the thermal conductivity of 140 W/mK or greater. The ceramic material may be ceramic series such as $SiO_2$, $Si_xO_y$, $Si_3N_4$, $Si_xN_y$, $SiO_xN_y$, $Al_2O_3$, BN, $Si_3N_4$, SiC(SiC—BeO), BeO, CeO, and AlN. The thermal conductive material may include a C component (diamond, carbon nanotube (CNT)).

The light emitting chip 100A may be mounted on the circuit board 400 in a flip method. The circuit board 400 may include a metal layer 471, an insulating layer 472 on the metal layer 471, a circuit layer having a plurality of lead electrodes 473 and 474 on the insulating layer 472, and a protective layer 475 for protecting the circuit layer. The metal layer 471 may be a heat dissipation layer, and include a metal, such as, e.g. Cu or Cu-alloy, with high thermal conductivity, and may be formed as a single layer or multiple layers.

The insulating layer 472 may insulate a portion between the metal layer 471 and the circuit layer. The insulating layer 472 may include at least one of resin materials such as prepreg, polyphthalamide (PPA), liquid crystal polymer (LCP), and polyamide 9T (PA9T). Also, a metal oxide, e.g. $TiO_2$, $SiO_2$, and $Al_2O_3$, may be added into the insulating layer 472, but embodiments are not limited thereto. As another example, materials such as graphene may be used in the insulating layer 472 by being added into an insulating material such as silicone resin or epoxy resin. The insulating layer 472 may be an anodized region that is formed by an anodizing process of the metal layer 471. The metal layer 471 may be formed with an aluminum material, and the anodized region may be formed with a material such as $Al_2O_3$.

The first and second lead electrodes 473 and 474 may be electrically connected to the first and second connection electrodes 141 and 143 of the light emitting chip 100A. Conductive adhesive agents 461 and 462 may be provided between the first and second lead electrodes 473 and 474 and the connection electrodes 141 and 143 of the light emitting chip 100A. The conductive adhesive agents 461 and 462 may include a metal material such as a solder material. The first lead electrode 473 and the second lead electrode 474 may be circuit patterns that supply power.

The protective layer 475 may be provided on the circuit layer. The protective layer 475 may include a reflective material and may be formed with a resist material, e.g. a white resist material, but embodiments are not limited thereto. The protective layer 475 may function as a reflective layer and may be formed of a material in which a reflection rate is higher than an absorption rate. As another example, the protective layer 475 may be formed with a material that absorbs light, and the light absorption material may include a black resist material.

Figure 62:
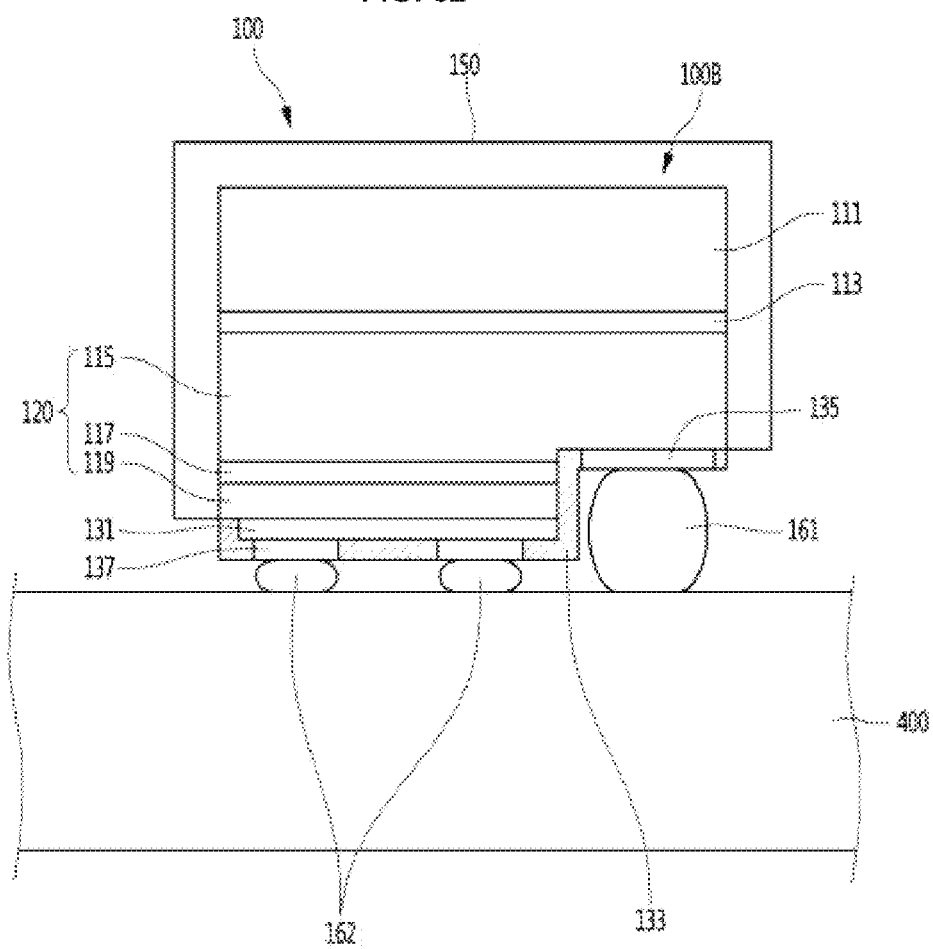
FIG. 62 is a detailed view of a light emitting device according to another embodiment.

Referring to FIG. 62, a second example of the light emitting device 100 may include a light emitting chip 100B. The light emitting device 100 may include the light emitting chip 100B and the fluorescent material layer 150 provided on the light emitting chip 100B. The fluorescent material layer 150 may include one or more of blue, green, yellow, and red fluorescent materials, and may be provided as a single layer or multiple layers. In the fluorescent material layer 150, a fluorescent material may be added to a light transmittable resin material. The light transmittable resin material may include materials such as silicone or epoxy resin, and the fluorescent material may be selectively formed of YAG-based, TAG-based, silicate-based, nitride-based, and oxynitride-based materials. The fluorescent material layer 150 may be provided at an upper surface of the light emitting chip 100B, or provided at upper and side surfaces of the light emitting chip 100B. The fluorescent material layer 150 may be provided on a region from which light is emitted among surfaces of the light emitting chip 100B to convert wavelengths of light.

The light emitting chip 100B may include the substrate 111, the first semiconductor layer 113, the light emitting structure 120, the electrode layer 131, the insulating layer 133, the first electrode 135, the second electrode 137, the first connection electrode 141, the second connection electrode 143, and the support layer 140. The substrate 111 and the first semiconductor layer 113 may be removed. The light emitting chip 100B of the light emitting device 100 may be connected to the circuit board 400 using connection electrodes 161 and 162, and the connection electrodes 161 and 162 may include a conductive bump, for example, a solder bump. One or a plurality of the conductive bumps may be arranged below each of the electrodes 135 and 137, but embodiments are not limited thereto. The insulating layer 133 may expose the first and second electrodes 135 and 137, and the first and second electrodes 135 and 137 may be electrically connected to the connection electrodes 161 and 162.

Figure 63:
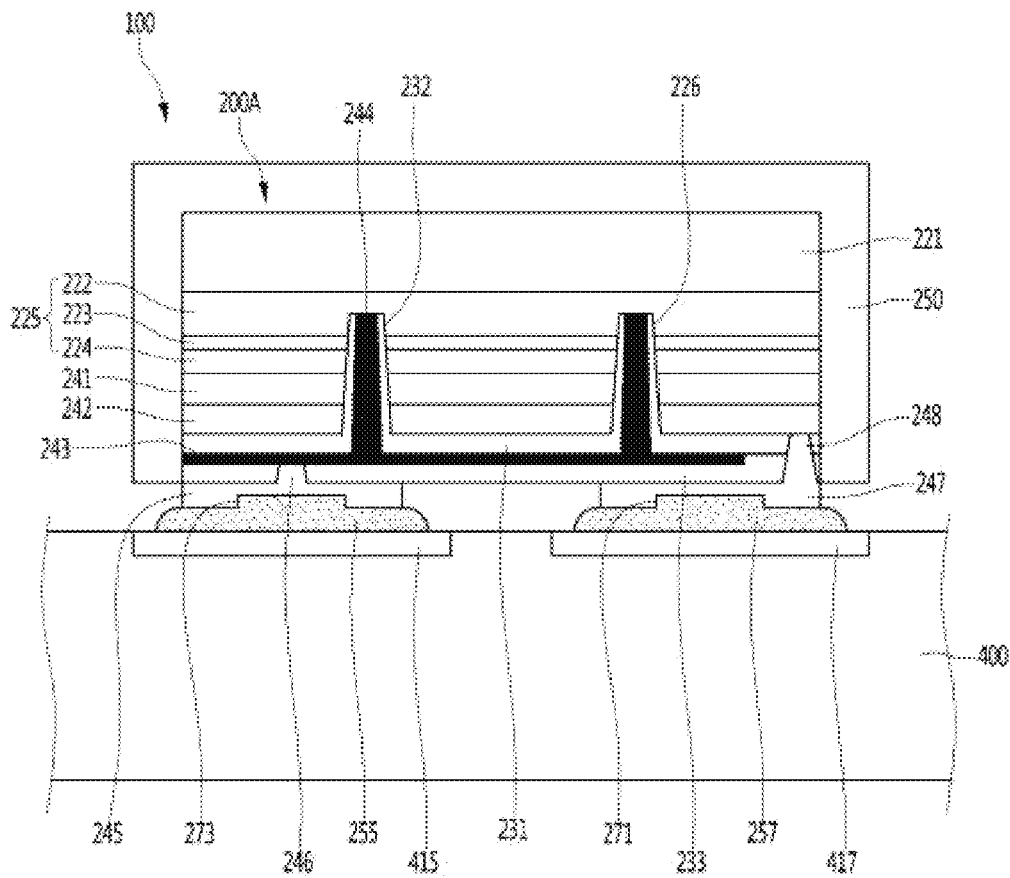
FIG. 63 is a detailed view of a light emitting device according to another embodiment.

Referring to FIG. 63, a third example of the light emitting device 100 may include a light emitting chip 200A connected to the circuit board 400. The light emitting device 100 may include a fluorescent material layer 250 provided on a surface of the light emitting chip 200A. The fluorescent material layer 250 may convert a wavelength of incident light. The optical lens (300 of FIG. 4) may be provided on the light emitting device 100 to control beam spread characteristics of light emitted from the light emitting chip 200A. The light emitting chip 200A may include a light emitting structure 225 and a plurality of pads 245 and 247. The light emitting structure 225 may be formed with II-VI compound semiconductor layers, for example, III-V compound semiconductor layers or II-VI compound semiconductor layers. The plurality of pads 245 and 247 may be selectively connected to the semiconductor layer of the light emitting structure 225 to supply power.

The light emitting structure 225 may include a first conductive semiconductor layer 222, an active layer 223, and a second conductive semiconductor layer 224. The light emitting chip 200A may include a substrate 221. The substrate 221 may be provided on the light emitting structure 225. The substrate 221 may be, for example, a light transmittable, insulating substrate, or a conductive substrate. The configuration will be referenced to the description of the light emitting structure and the substrate of FIG. 4.

The pads 245 and 247 may be provided at a lower portion of the light emitting chip 200A, the pads 245 and 247 may include first and second pads 245 and 247. The first and second pads 245 and 247 may be provided apart from each other below the light emitting chip 200A. The first pad 245 may be electrically connected to the first conductive semiconductor layer 222, and the second pad 247 may be electrically connected to the second conductive semiconductor layer 224. Shapes of bottoms of the first and second pads 245 and 247 may be polygonal or circular shapes, or formed to correspond to the shapes of first and second lead electrodes 415 and 417 of the circuit board 400. A lower surface area of each of the first and second pads 245 and 247 may be formed in sizes corresponding to those of an upper surface of each of the first and second lead electrodes 415 and 417.

The light emitting chip 200A may include at least one of a buffer layer and an undoped semiconductor layer between the substrate 221 and the light emitting structure 225. The buffer layer may be a layer for mitigating a difference between lattice constants of the substrate 221 and the semiconductor layer, and may be selectively formed of II-VI compound semiconductors. An undoped III-V compound semiconductor layer may be further formed below the buffer layer, but embodiments are not limited thereto. The substrate 221 may be removed. When the substrate 221 is removed, the fluorescent material layer 250 may come in contact with an upper surface of the first conductive semiconductor layer 222 or an upper surface of another semiconductor layer.

The light emitting chip 200A may include first and second electrode layers 241 and 242, a third electrode layer 243, and insulating layers 231 and 233. Each of the first and second electrode layers 241 and 242 may be formed as a single layer or multiple layers, and may function as a current spreading layer. The first and second electrode layers 241 and 242 may include a first electrode layer 241 provided below the light emitting structure 225 and a second electrode layer 242 provided below the first electrode layer 241. The first electrode layer 241 may spread current such that the second electrode layer 242 reflects incident light.

The first and second electrode layers 241 and 242 may be formed with different materials. The first electrode layer 241 may be formed of light transmittable material, for example, a metal oxide or a metal nitride. The first electrode layer may be selectively formed from ITO, ITO nitride (ITON), IZO, IZO nitride (IZON), IZTO, IAZO, IGZO, IFTO, AZO, ATO, and GZO. The second electrode layer 242 may come in contact with a lower surface of the first electrode layer 241 and function as a reflective electrode layer. The second electrode layer 242 may include, for example, Ag, Au, or Al. When a partial region of the first electrode layer 241 is removed, the second electrode layer 242 may partially come in contact with the lower surface of the light emitting structure 225.

The first and second electrode layers 241 and 242 may be stacked with an omni-directional reflector (ODR) layer. The ODR structure may be formed with a stacked structure of the first electrode layer 241 having a low refraction rate and the second electrode layer 242 which is a highly reflective metal material coming in contact with the first electrode layer 241. The first and second electrode layers 241 and 242 may be formed with a stacked structure of ITO/Ag. An omni-directional reflection angle may be improved at an interface between the first electrode layer 241 and the second electrode layer 242.

The second electrode layer 242 may be removed, and may be formed as a reflective layer of another material. The reflective layer may be formed using the DBR structure. The DBR structure may include a structure in which two dielectric layers having different refraction rates are alternately provided, and may include, for example, any different one among an $SiO_2$ layer, an $Si_3N_4$ layer, a $TiO_2$ layer, an $Al_2O_3$ layer, and an MgO layer. As still another example, the electrode layers 241 and 242 may include both the DBR structure and the ODR structure, and in this case, the light emitting chip 200A having a light reflection rate of 98% or greater may be provided. As light reflected from the second electrode layer 242 is emitted through the substrate 221 in the light emitting chip 200A mounted using the flip method, most light may be emitted vertically upward. Also, light emitted to side surfaces of the light emitting chip 200A may be reflected to a light input surface region of the optical lens using a reflective sheet 600.

The third electrode layer 243 may be provided below the second electrode layer 242, and may be electrically insulated with the first and second electrode layers 241 and 242. The third electrode layer 243 may include at least one metal of Ti, Cu, Ni, Au, Cr, Ta, Pt, Sn, Ag, and P. The first pad 245 and the second pad 247 may be provided below the third electrode layer 243. The insulating layers 231 and 233 may block unnecessary contacts between the first and second electrode layers 241 and 242, the third electrode layer 243, the first and second pads 245 and 247, and the light emitting structure 225. The insulating layers 231 and 233 may include first and second insulating layers 231 and 233. The first insulating layer 231 may be provided between the third electrode layer 243 and the second electrode layer 242. The second insulating layer 233 may be provided between the third electrode layer 243 and the first pad 245 or the second pad 247. The first and second pads 245 and 247 may include the same material as the first and second lead electrodes 415 and 417.

The third electrode layer 243 may be connected to the first conductive semiconductor layer 222. A connection portion 244 of the third electrode layer 243 may protrude as a via structure through the lower portion of the light emitting structure 225, and may come in contact with the first conductive semiconductor layer 222. The connection portion 244 may be provided in a plurality. A portion 232 of the first insulating layer 231 may extend along a circumference of the connection portion 244 to block electrical connections between the third electrode layer 243 and the first and second electrode layers 241 and 242, and the second conductive semiconductor layer 224 and the active layer 223. An insulating layer may be provided at a side surface of the light emitting structure 225 for side surface protection, but embodiments are not limited thereto.

The second pad 247 may be provided below the second insulating layer 233, and may come in contact or is connected to at least one of the first and second electrode layers 241 and 242 through an open region of the second insulating layer 233. The first pad 245 may be provided below the second insulating layer 233 and connected to the third electrode layer 243 through the open region of the second insulating layer 233. Thus, a protrusion 248 of the first pad 247 may be electrically connected to the second conductive semiconductor layer 224 through the first and second electrode layers 241 and 242, and a protrusion 246 of the second pad 248 may be electrically connected to the first conductive semiconductor layer 222 through the third electrode layer 243.

The first and second pads 245 and 247 may be spaced apart from each other at the lower portion of the light emitting chip 200A, and face the first and second lead electrodes 415 and 417 of the circuit board 400. The first and second pads 245 and 247 may include recesses 271 and 273 of polygonal shapes, and the recesses 271 and 273 are convexly formed toward the light emitting structure 225. The recesses 271 and 273 may be formed with depths which are the same or smaller than the thicknesses of the first and second pads 245 and 247, and the depths of the recesses 271 and 273 may increase surface areas of the first and second pads 245 and 247.

Binding members 255 and 257 may be respectively provided at a region between the first pad 245 and the first lead electrode 415 and a region between the second pad 247 and the second lead electrode 417. The binding members 255 and 257 may include an electrical conductive material, and have a portion provided at the recesses 271 and 273. As the binding members 255 and 257 are provided at the recesses 271 and 273, contact areas between the binding members 255 and 257 and the first and second pads 245 and 247 may increase. Thus, since the first and second pads 245 and 247 and the first and second lead electrodes 415 and 417 are bound, electrical reliability and radiation efficiency of the light emitting chip 200A may be improved.

The binding members 255 and 257 may include a solder paste material. The solder paste material may include at least one of Au, Sn, Pb, Cu, Bi, In, and Ag. As the binding members 255 and 257 directly conduct heat to the circuit board 400, the thermal conduction efficiency may be improved compared to a structure using a package. Also, since the binding members 255 and 257 are materials having small differences in thermal expansion coefficients with the first and second pads 245 and 247, the thermal conduction efficiency may be improved.

The binding members 255 and 257 may include a conductive film, and the conductive film may include one or more conductive particles within an insulating film. The conductive particles may include at least one of a metal, a metal alloy, or carbon, for example. The conductive particles may include at least one of Ni, Ag, Au, Al, Cr, Cu, and C. The conductive film may include an anisotropic conductive film or an anisotropic conductive adhesive agent.

An adhesive member, for example, a thermally conductive film, may be included between the light emitting chip 200A and the circuit board 400. The thermally conductive film may use a polyester resin such as polyethylene terephthalate, polybutylene terephthalate, polyethylene naphthalate, and polybutylene naphthalate, a polyimide resin, an acrylic resin, a styrene-based resin such as polystyrene resin and acrylonitrile-styrene resin, a polycarbonate resin, a polylactic resin, and a polyurethane resin. Also, the thermally conductive film may include at least one of a polyolefin resin such as polyethylene, polypropylene, and ethylene-propylene copolymers, a vinyl resin such as polyvinyl chloride resin and polyvinylidene chloride resin, a polyamide resin, a sulfon-based resin, a polyether-ether ketone based resin, an arylate-based resin, or blends of the above resins.

The light emitting chip 200A may emit light through a surface of the circuit board 400 and side surfaces and an upper surface of the light emitting structure 225 to improve the light extraction efficiency. The light emitting chip 200A may be directly bonded on the circuit board 400, thereby simplifying the process. Also, as the radiation of the light emitting chip 200A is improved, the light emitting chip 200A may be usefully used in the lighting field.

Figure 64:
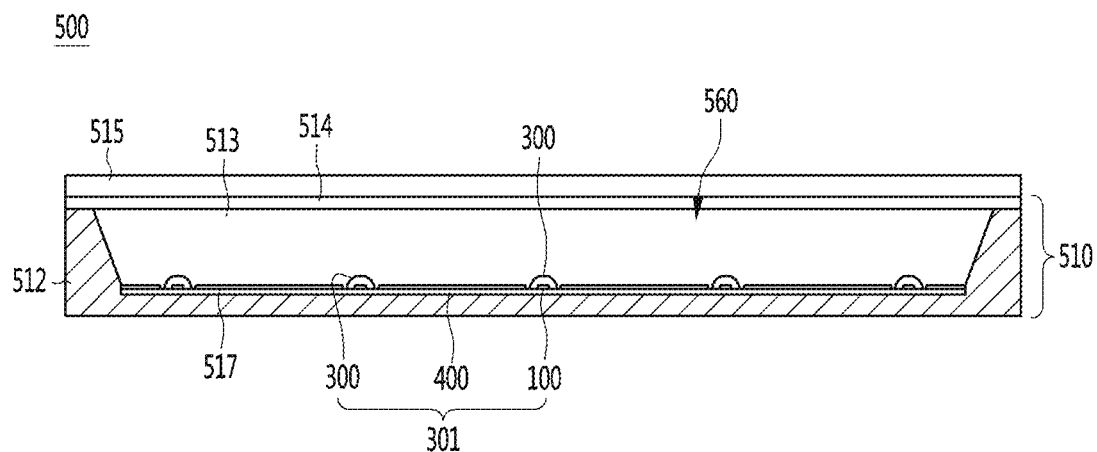
FIG. 64 is a view of a display apparatus having an optical lens and a light emitting module having the same.

FIG. 64 is side cross-sectional view of a display apparatus having an optical lens and a light emitting module having the same according to an embodiment. Referring to FIG. 64, a display apparatus 500 may include a light emitting module 301 provided on a bottom cover 512, and the optical sheet 514 and a display panel 515 provided on the light emitting module 301. The bottom cover 512 may include a metal or thermal conductive resin material for heat dissipation. The bottom cover 512 may include a storage unit 560, and a side cover may be provided along a circumference of the storage unit 560.

The light emitting module 301 may be provided as one or a plurality of rows on the bottom cover 512. The light emitting module 301 may emit white light by the light emitting device 100, but embodiments are not limited thereto. The light emitting module 301 may include the light emitting devices 100, the optical lens 300 on each of the light emitting devices 100, and the circuit board 400 in which the plurality of light emitting devices 100 are mounted. The circuit board 400 may be a PCB including a circuit pattern, and may include a resin PCB, MCPCB, FPCB, and the like, but embodiments are not limited thereto.

A reflective sheet 517 may be provided on the circuit board 400, the reflective sheet 517 may include an open region, and the optical lens 300 may be coupled to the open region of the reflective sheet 517. As the optical lens 300 protrudes through the open region of the reflective sheet 517, emitted light of the optical lens 300 may transmit through or be reflected by the optical sheet 514, and the reflected light may be reflected again by the reflective sheet 517. Thus, uniformity of a luminance distribution of a backlight unit 510 may be improved. The reflective sheet 517 may be formed of, for example, PET, PC, and PVC resins, but embodiments are not limited thereto.

The optical sheet 514 may include at least one of prism sheets that gather scattered light, luminance reinforcing sheets, and diffusion sheets that re-diffuse light. A light guide layer may be provided at a region between the optical sheet 514 and the light emitting module 301, but embodiments are not limited thereto. The display panel 515 may be provided on the optical sheet 514. The display panel 51 may display an image by incident light. The display panel 515 may be, for example, an LCD panel, and includes first and second transparent substrates facing each other, and a liquid crystal layer interposed between the first and second substrates. A polarizing plate may be attached on at least one surface of the display panel 515, but an attachment structure of the polarizing plate is not limited. The display panel 51 may display information using light that has passed through the optical sheet 514. The display apparatus 500 may be applied to various types of portable terminals, such as, e.g., monitors of laptop computers, and televisions.

The light emitting module according to an embodiment may be applied to a light unit. The light unit may include a structure having one or a plurality of light emitting modules, and may include three-dimensional displays, various types of lightings, traffic lights, headlights of vehicles, and electronic display boards.

According to an embodiment, a path of light emitted to a side surface of a light emitting device provided below an optical lens may be controlled to improve a luminance distribution of the optical lens. Noises such as a hot spot due to light extracted from an optical lens may be reduced. An interference between optical lenses on different circuit boards may be reduced. Intervals between light emitting devices may be widely provided due to optical lenses, thereby reducing the interference between the optical lenses.

An absorption layer may be provided on a circuit board to absorb light reflected to a first light output surface formed with a curved surface, thereby controlling the luminance distribution. A number of light emitting devices provided within a backlight unit may be reduced. Reliability of a light emitting module having optical lenses may be improved. The interference between adjacent optical lenses may be minimized to improve an image. Reliability of a light unit such as an optical lens may be improved. Reliability of a lighting system having a light emitting module may be improved.

Embodiments disclosed herein provide an optical lens having different light output surfaces. An embodiment provides an optical lens in which vertexes of a light input surface and a first light output surface may be convex in the same axis direction. An embodiment provides an optical lens having a curved first light output surface and a flat second light output surface at a circumference of the light input surface. An embodiment provides an optical lens in which the vertex of the light input surface is more adjacent to the vertex of the first light output surface than a light source. An embodiment provides an optical lens having an inclined bottom surface provided at a circumference of a light emitting device. An embodiment provides an optical lens that may change an output angle of light incident from a light emitting device that emits light to at least five surfaces.

Embodiments disclosed herein provide a light emitting module that may be capable of making light emitted from upper and side surfaces of a light emitting device incident on the light input surface of the optical lens. An embodiment provides a light emitting module that may be capable of controlling a luminance distribution by changing an emission angle of light output to the different light output surfaces of the optical lens. An embodiment provides a light emitting module that may be capable of preventing optical loss due to the bottom surface of the optical lens provided at the circumference of the light emitting device. An embodiment provides a light emitting module with an improved luminance distribution at a central portion due to the bottom surface of the optical lens being inclined or curved.

Embodiments disclosed herein provide an optical lens and a light emitting module having the same that may be capable of controlling the luminance distribution of output light. An embodiment provides an optical lens and a light emitting module having the same, in which an output angle of light being emitted to a region deviating from a beam spread angle may be smaller than an incidence angle thereof. An embodiment provides a light emitting module provided with an absorption layer on a region of a circuit board where an amount of light reflected from the optical lens is the maximum.

Embodiments disclosed herein provide a lighting module which has a layer for absorbing unnecessary light traveling toward the bottom surface of the optical lens provided on a circuit board. An embodiment provides a lighting module which has a supporting protrusion of the optical lens provided at the layer for absorbing unnecessary light traveling toward the bottom surface of the optical lens on the circuit board. An embodiment provides a lighting module which has the supporting protrusion of the optical lens and a hole for the supporting protrusion at the layer for absorbing unnecessary light traveling toward the bottom surface of the optical lens provided on the circuit board. An embodiment provides a lighting module in which a side protruding portion of the optical lens provided on the circuit board is provided more outward than a side surface of the circuit board. An embodiment provides a lighting module in which a side protruding portion of each of a plurality of optical lenses provided on the circuit board is provided more outward than at least one side surface or both side surfaces of the circuit board. An embodiment provides a lighting module in which cut surfaces of the side protruding portions of the plurality of optical lenses provided on the circuit board are provided in parallel with side surfaces in a first axis direction of the circuit board. An embodiment provides a lighting module in which the side protruding portion of each of the plurality of optical lenses is provided in a wider direction of intervals at which the plurality of optical lenses are arranged. An embodiment provides a lighting module in which an interval between an optical lens on a first circuit board and an optical lens on a second circuit board is wider than an interval between optical lenses provided on the first circuit board. An embodiment provides a lighting module in which a direction of a side protruding portion of an optical lens is a direction orthogonal to a line segment connecting two supporting protrusions adjacent to the side protruding portion, or is provided within 30° from an axis orthogonal thereto. An embodiment provides a lighting module in which a side protruding portion of an optical lens protrudes outward past an output surface of the optical lens.

According to an embodiment disclosed herein, an optical lens may include a bottom surface, a recess that is upwardly convex at a central region of the bottom surface, a light input surface at a circumference of the recess, a first light output surface having a convexly curved surface at opposite sides of the bottom surface and the light input surface, and a second light output surface having a flat surface at a lower circumference of the first light output surface. The bottom surface may include a first edge adjacent to the recess and a second edge adjacent to the second light output surface, a region of the bottom surface more adjacent to the first edge gradually approaches a first axis that is horizontal to a center of a bottom of the recess, a lower region of the light input surface is provided lower than a straight horizontal line passing through the second edge, and the first light output surface has a curved surface that vertically overlaps with the recess and has a convex central region.

According to an embodiment disclosed herein, an optical lens may include a bottom surface, a recess that is upwardly convex at a central region of the bottom surface, a light input surface at a circumference of the recess, a first light output surface having a convexly curved surface at opposite sides of the bottom surface and the light input surface, and a second light output surface having a flat surface at a lower circumference of the first light output surface. The bottom surface may include a first edge adjacent to the recess and a second edge adjacent to the second light output surface, a region of the bottom surface more adjacent to the first edge gradually approaches a first axis that is horizontal to a center of a bottom of the recess, a lower region of the light input surface is provided lower than a straight horizontal line passing through the second edge, the first light output surface has a curved surface that vertically overlaps with the recess and has a convex central region, the second light output surface includes a third edge adjacent to the first light output surface, a first vertex of the light input surface is closer to a second vertex of the first light output surface than a straight horizontal line passing through the third edge of the second light output surface, a diameter of the recess gradually decreases toward the first vertex of the light input surface, and a depth of the recess is greater than a width of the bottom of the recess.

According to an embodiment disclosed herein, a light emitting module may include a light emitting device to emit light through an upper surface and a plurality of side surfaces, an optical lens provided on the light emitting device, and a circuit board provided below the optical lens and the light emitting device. The optical lens may include a bottom surface, a recess that is upwardly convex at a central region of the bottom surface and has the light emitting device provided therein, a light input surface formed at a circumference of the recess, a first light output surface having a convexly curved surface formed at opposite sides of the bottom surface and the light input surface, and a second light output surface having a flat surface at a lower portion of the first light output surface, the bottom surface of the optical lens includes a first edge adjacent to the recess and a second edge adjacent to the second light output surface, a region of the bottom surface of the optical lens more adjacent to the first edge gradually approaches a first axis that is horizontal to a center of a bottom of the recess, a lower region of the light input surface protrudes more downward past a straight horizontal line passing through the second edge and corresponds to a side surface of the light emitting device, the first light output surface has a curved surface that vertically overlaps with the recess and has a convex central region, and, out of light emitted from the light emitting device, an output angle of first light emitted through the second light output surface is smaller than an incidence angle of the first light incident on the light input surface.

In the description of the embodiments, when it is described that each layer (film), region, pattern, or structure is formed "above/on" or "below/under" a substrate, each layer (film), region, pad or pattern, includes being formed both "directly" or "indirectly (by interposing another layer)" "above/on" and "below/under". Also, a standard of above/on or below/under of each layer is described with respect to the drawings. In the description of the embodiments, like reference numbers represent like elements through description of the drawings.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical lens comprising:
   a bottom surface;
   a recess that is upwardly convex at a central region of the bottom surface;
   a light input surface at a circumference of the recess;
   a first light output surface having a convexly curved surface at opposite sides of the bottom surface and the light input surface; and
   a second light output surface having a flat surface at a circumference of the first light output surface, wherein:
      the bottom surface includes a first edge adjacent to the recess and a second edge adjacent to the second light output surface;
      a region of the bottom surface more adjacent to the first edge gradually approaches a first axis horizontal to a center of a bottom of the recess;
      a lower region of the light input surface provided lower than a straight horizontal line passing through the second edge; and
      the first light output surface includes a curved surface that vertically overlaps the recess and the bottom surface,
   wherein the first light output surface includes a convex central region that vertically overlaps the recess,
   the second light output surface includes a third edge adjacent to the first light output surface,
   a first distance from a first vertex of the light input surface to a second vertex of the first light output surface is shorter than a second distance from the first vertex of the light input surface to a straight horizontal line passing through the third edge,
   wherein the first vertex is a vertex of the light input surface,
   wherein the second vertex is disposed at the convex central region of the first light output surface,
   wherein the second vertex is a highest point of a lens body,
   wherein the first vertex of the light input surface and the second vertex of the first light output surface are provided at a central axis perpendicular to a center of a bottom of the recess,
   wherein an interval between the second edge of the bottom surface and the first axis is smaller than a vertical width of the second light output surface, and
   wherein the third edge of the second light output surface is located at a lower position than a position of the first vertex from the first axis.

2. The optical lens according to claim 1, wherein a straight line that connects the first edge and the second edge of the bottom surface is inclined at an angle of 5° or smaller with respect to the first axis.

3. The optical lens according to claim 1, wherein the bottom surface is provided above a straight line connecting the first edge and the second edge, and includes a curved surface having a negative curvature.

4. The optical lens according to claim 1, wherein the bottom surface includes an inclined surface.

5. The optical lens according to claim 1, wherein a depth of the recess is 80% or more of a thickness of the optical lens.

6. The optical lens according to claim 1, wherein:
   an interval between the second edge of the bottom surface and the first axis is smaller than a distance between the first vertex of the light input surface and the second vertex of the first light output surface.

7. The optical lens according to claim 5, wherein:
   a diameter of the recess gradually decreases toward the first vertex of the light input surface; and
   the depth of the recess is greater than a horizontal width of the bottom of the recess, wherein a radius of curvature of the convex central region of the first light output surface is greater than a radius of curvature of the light input surface.

8. The optical lens according to claim 6, wherein:
a center region of the first light output surface has an angle of 20° or smaller from the central axis with respect to the center of the bottom of the recess; and
the second light output surface has an angle of 20° or smaller from the first axis with respect to the center of the bottom of the recess.

9. An optical lens comprising:
a bottom surface;
a recess that is upwardly convex at a central region of the bottom surface;
a light input surface at a circumference of the recess;
a first light output surface having a convexly curved surface at opposite sides of the bottom surface and the light input surface; and
a second light output surface having a flat surface at a circumference of the first light output surface, wherein:
the bottom surface includes a first edge adjacent to the recess and a second edge adjacent to the second light output surface;
a region of the bottom surface more adjacent to the first edge gradually approaches a first axis horizontal to a center of a bottom of the recess;
a lower region of the light input surface provided lower than a straight horizontal line passing through the second edge;
the first light output surface includes a curved surface that vertically overlaps the recess and the bottom surface;
wherein the first light output surface includes a convex central region that vertically overlaps the recess;
the second light output surface includes a third edge adjacent to the first light output surface;
a first vertex of the light input surface is closer to a second vertex of the first light output surface than a straight horizontal line passing through the third edge of the second light output surface;
a horizontal width of the recess gradually decreases toward a vertex of the recess; and
a depth of the recess is greater than a horizontal width of the bottom of the recess,
wherein the first vertex is a vertex of the light input surface,
wherein the second vertex is disposed at a convex central region of the first light output surface,
wherein the second vertex is a highest point of a lens body,
wherein a distance between the first light output surface and a bottom center of the recess gradually increases from the second vertex toward the third edge with respect to the bottom center of the recess, and
wherein the first vertex of the light input surface and the second vertex of the first light output surface are provided at a central axis perpendicular to the bottom center of the recess.

10. The optical lens according to claim 9, wherein:
a straight line connecting the first edge and the second edge of the bottom surface is inclined at an angle of 5° or smaller with respect to the first axis; and
the bottom surface includes at least one of a curved surface having a negative curvature and an inclined surface.

11. The optical lens according to claim 9, wherein:
the depth of the recess is 80% or more of a thickness of the optical lens;
an interval between the second edge of the bottom surface and the first axis is smaller than a distance between the first vertex of the light input surface and the second vertex of the first light output surface, and
wherein regions between the second vertex and the second light output surface in the second light output surface have radii of curvatures of different magnitudes.

12. The optical lens according to claim 11, wherein:
the bottom surface includes a plurality of supporting protrusions; and
the plurality of supporting protrusions are provided in the same intervals from the center of the bottom of the recess.

13. The optical lens according to claim 11, wherein:
the interval between the second edge of the bottom surface and the first axis is smaller than an interval between the third edge of the second light output surface and the second edge; and
a portion of the second light output surface includes a side protruding portion that protrudes outward.

14. A light emitting module comprising:
a light emitting device configured to emit light through an upper surface and a plurality of side surfaces;
an optical lens provided on the light emitting device; and
a circuit board provided below the optical lens and the light emitting device, wherein:
the optical lens includes a bottom surface, a recess that is upwardly convex at a central region of the bottom surface having the light emitting device provided therein, a light input surface formed at a circumference of the recess, a first light output surface having a convexly curved surface formed at opposite sides of the bottom surface and the light input surface, and a second light output surface having a flat surface at a portion of the first light output surface;
the bottom surface of the optical lens includes a first edge adjacent to the recess and a second edge adjacent to the second light output surface;
a region of the bottom surface of the optical lens more adjacent to the first edge gradually approaches a first axis horizontal to a center of a bottom of the recess;
a lower region of the light input surface protrudes downward past a straight horizontal line passing through the second edge and corresponds to a side surface of the light emitting device;
the first light output surface includes a curved surface that vertically overlaps the recess and a convex central region; and
out of light emitted from the light emitting device, an output angle of first light emitted through the second light output surface is smaller than an incidence angle of the first light incident on the light input surface,
the second light output surface includes a third edge adjacent to the first light output surface,
wherein a first vertex of the light input surface is closer to a second vertex of the first light output surface than a straight horizontal line passing through the third edge of the second light output surface,
wherein a first vertex is a vertex of the light input surface,
wherein the second vertex is disposed at the convex central region of the first light output surface, wherein the second vertex is a highest point of a lens body, and wherein the first vertex of the light input surface and the second vertex of the first light output surface are provided at a central axis perpendicular to a center of the bottom surface of the recess.

15. The light emitting module according to claim 14, wherein an angle formed by two straight lines passing through a third edge of the optical lens is greater than a beam spread angle of the light emitting device and smaller than a beam spread angle of the optical lens.

16. The light emitting module according to claim 14, wherein the light emitting device is provided above the first axis of the optical lens and provided below a straight line at a level with the second edge of the bottom surface of the optical lens.

17. The light emitting module according to claim 14, wherein the bottom surface of the optical lens includes at least one of an inclined surface and a curved surface, and reflects light emitted to the side surfaces of the light emitting device to the second light output surface.

18. The light emitting module according to claim 14, wherein the first edge of the bottom surface of the optical lens contacts an upper portion of the circuit board.

19. The light emitting module according to claim 14, wherein:

the bottom surface of the optical lens includes a plurality of supporting protrusions;

the plurality of supporting protrusions are provided in the same intervals from the center of the bottom of the recess; and the circuit board has a plurality of absorption layers spaced apart from each other along the circumference of the recess of the optical lens.

* * * * *